United States Patent
Verstraete et al.

(10) Patent No.: US 12,303,819 B2
(45) Date of Patent: May 20, 2025

(54) FILTER ELEMENT FOR FILTERING A FLUID

(71) Applicant: Donaldson Company, Inc., Minneapolis, MN (US)

(72) Inventors: Mathijs Verstraete, Tienen (BE); Bart Catoor, Kessel-lo (BE); Michael J. Van Arsdale, Apple Valley, MN (US); Michael D. Carlson, Lakeville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 542 days.

(21) Appl. No.: 17/428,549

(22) PCT Filed: Feb. 3, 2020

(86) PCT No.: PCT/US2020/016408
§ 371 (c)(1),
(2) Date: Aug. 4, 2021

(87) PCT Pub. No.: WO2020/163231
PCT Pub. Date: Aug. 13, 2020

(65) Prior Publication Data
US 2022/0134270 A1    May 5, 2022

Related U.S. Application Data

(60) Provisional application No. 62/800,913, filed on Feb. 4, 2019.

(51) Int. Cl.
*B01D 46/52* (2006.01)
*B01D 46/00* (2022.01)
(Continued)

(52) U.S. Cl.
CPC ....... *B01D 46/527* (2013.01); *B01D 46/0001* (2013.01); *B01D 46/0004* (2013.01);
(Continued)

(58) Field of Classification Search
CPC .. B01D 46/527; B01D 46/64; B01D 46/0001; B01D 46/0004; B01D 46/4236; B01D 46/446; B01D 2271/02
(Continued)

(56) References Cited

U.S. PATENT DOCUMENTS 2,599,604 A   6/1952   Jordan, V et al.
3,025,963 A   3/1962   Jordan, V
(Continued)

FOREIGN PATENT DOCUMENTS

DE   202008017059 U1   5/2010
EP      1936179 A2      6/2008
(Continued)

OTHER PUBLICATIONS

International Search Report and Written Opinion for PCT/US2020/016408, mailed Jul. 1, 2020.
(Continued)

*Primary Examiner* — Robert A Hopkins
(74) *Attorney, Agent, or Firm* — Merchant & Gould P.C.

(57) ABSTRACT

A filter element for filtering a fluid passing through the filter element, the filter element having a fluid entry face and a fluid exit face and is provided with a group of first channels and a group of second channels, through which the fluid to be filtered can flow from the respective first channel into the second channel, that is arranged next to it, wherein a through-channel leads through a filter pack from the fluid entry face to the fluid exit face, which through-channel has an opening at the fluid entry face and/or has an opening at the fluid exit face, wherein an element closes the flow of (Continued)

SECTION A-A fluid through through-channel, while leaving a volume open inside the through-channel that is at least 10% of the volume that the through-channel would have without the element, or the element allows the flow of fluid through the through-channel and interacts with the flow of fluid through the through-channel and/or the sidewalls of the through-channel deviate at least in some areas from a cylindrical wall in order to thereby create an element that interacts with a flow of fluid through the through-channel.

17 Claims, 38 Drawing Sheets

(51) Int. Cl.
  *B01D 46/42* (2006.01)
  *B01D 46/44* (2006.01)
  *B01D 46/64* (2022.01)
(52) U.S. Cl.
  CPC ....... *B01D 46/4236* (2013.01); *B01D 46/446* (2013.01); *B01D 46/64* (2022.01); *B01D 2271/02* (2013.01)
(58) Field of Classification Search
  USPC .......................................... 96/421; 210/493.2
  See application file for complete search history.

(56) References Cited

U.S. PATENT DOCUMENTS

| | | |
|---|---|---|
| 3,112,262 A | 11/1963 | Parkinson |
| 4,925,561 A | 5/1990 | Ishii et al. |
| 5,049,326 A | 9/1991 | Matsumoto et al. |
| 5,106,397 A | 4/1992 | Jaroszczyk et al. |
| 5,562,825 A | 10/1996 | Yamada et al. |
| 5,613,992 A | 3/1997 | Engel |
| 5,772,883 A | 6/1998 | Rothman et al. |
| D396,098 S | 7/1998 | Gillingham et al. |
| 5,792,247 A * | 8/1998 | Gillingham ............ F02M 35/14 181/231 |
| D398,046 S | 9/1998 | Gillingham et al. |
| D399,944 S | 10/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| 6,039,778 A | 3/2000 | Coulonvaux |
| D428,128 S | 7/2000 | Gillingham et al. |
| 6,179,890 B1 | 1/2001 | Ramos et al. |
| D437,401 S | 2/2001 | Ramos et al. |
| 6,190,432 B1 | 2/2001 | Gieseke et al. |
| 6,210,469 B1 | 4/2001 | Tokar |
| 6,235,195 B1 | 5/2001 | Tokar |
| 6,350,291 B1 | 2/2002 | Gieseke et al. |
| 6,419,718 B1 | 7/2002 | Klug et al. |
| 6,673,136 B2 | 1/2004 | Gillingham et al. |
| 7,625,419 B2 | 12/2009 | Nelson et al. |
| 8,479,924 B2 | 7/2013 | Mbadinga-Mouanda et al. |
| 9,636,615 B2 | 5/2017 | Osendorf et al. |
| 9,919,256 B2 | 3/2018 | Mbadinga-Mouanda et al. |
| 2002/0150806 A1 * | 10/2002 | Stenersen .......... B01D 46/0036 429/410 |
| 2002/0184864 A1 * | 12/2002 | Bishop ................. B01D 46/527 55/498 |
| 2002/0185008 A1 | 12/2002 | Anderson et al. |
| 2003/0226793 A1 * | 12/2003 | Merritt ................... B01D 29/58 210/450 |
| 2004/0187689 A1 | 9/2004 | Sporre et al. |
| 2005/0130508 A1 | 6/2005 | Yeh |
| 2008/0000826 A1 * | 1/2008 | Harder ................. B01D 25/001 210/321.74 |
| 2008/0282890 A1 | 11/2008 | Rocklitz et al. |
| 2009/0127211 A1 | 5/2009 | Rocklitz et al. |
| 2010/0032365 A1 | 2/2010 | Moe et al. |
| 2010/0186353 A1 | 7/2010 | Ackermann et al. |
| 2011/0197556 A1 | 8/2011 | Brown et al. |
| 2012/0018358 A1 * | 1/2012 | Sann ...................... B01D 29/15 210/109 |
| 2013/0168310 A1 * | 7/2013 | Mandt .................. B01D 35/147 210/439 |
| 2014/0208705 A1 | 7/2014 | Krull |
| 2015/0101298 A1 * | 4/2015 | Osendorf ........... B01D 46/0005 55/502 |
| 2015/0204282 A1 * | 7/2015 | Merritt ............... B01D 46/0002 55/482 |
| 2017/0106323 A1 * | 4/2017 | Payyappilly ........... B01D 46/60 |
| 2018/0207566 A1 | 7/2018 | Stanhope et al. |

FOREIGN PATENT DOCUMENTS

| | | |
|---|---|---|
| FR | 2733009 A1 | 10/1996 |
| JP | S59-119318 U | 8/1984 |
| JP | 07194909 A | 8/1995 |
| JP | 2004060597 A | 2/2004 |
| WO | 8803432 A1 | 5/1988 |
| WO | 97/40918 A1 | 11/1997 |
| WO | 03/047722 A2 | 6/2003 |
| WO | 2004/007054 A1 | 1/2004 |
| WO | 2004/082795 A2 | 9/2004 |
| WO | 2005/077487 A1 | 8/2005 |
| WO | 2010/025385 A1 | 3/2010 |
| WO | 2016/077377 A1 | 5/2016 |
| WO | 2017/174199 A1 | 10/2017 |

OTHER PUBLICATIONS

European Examination Report for Application No. 20709829.4 dated Nov. 29, 2023, 4 pages.

* cited by examiner

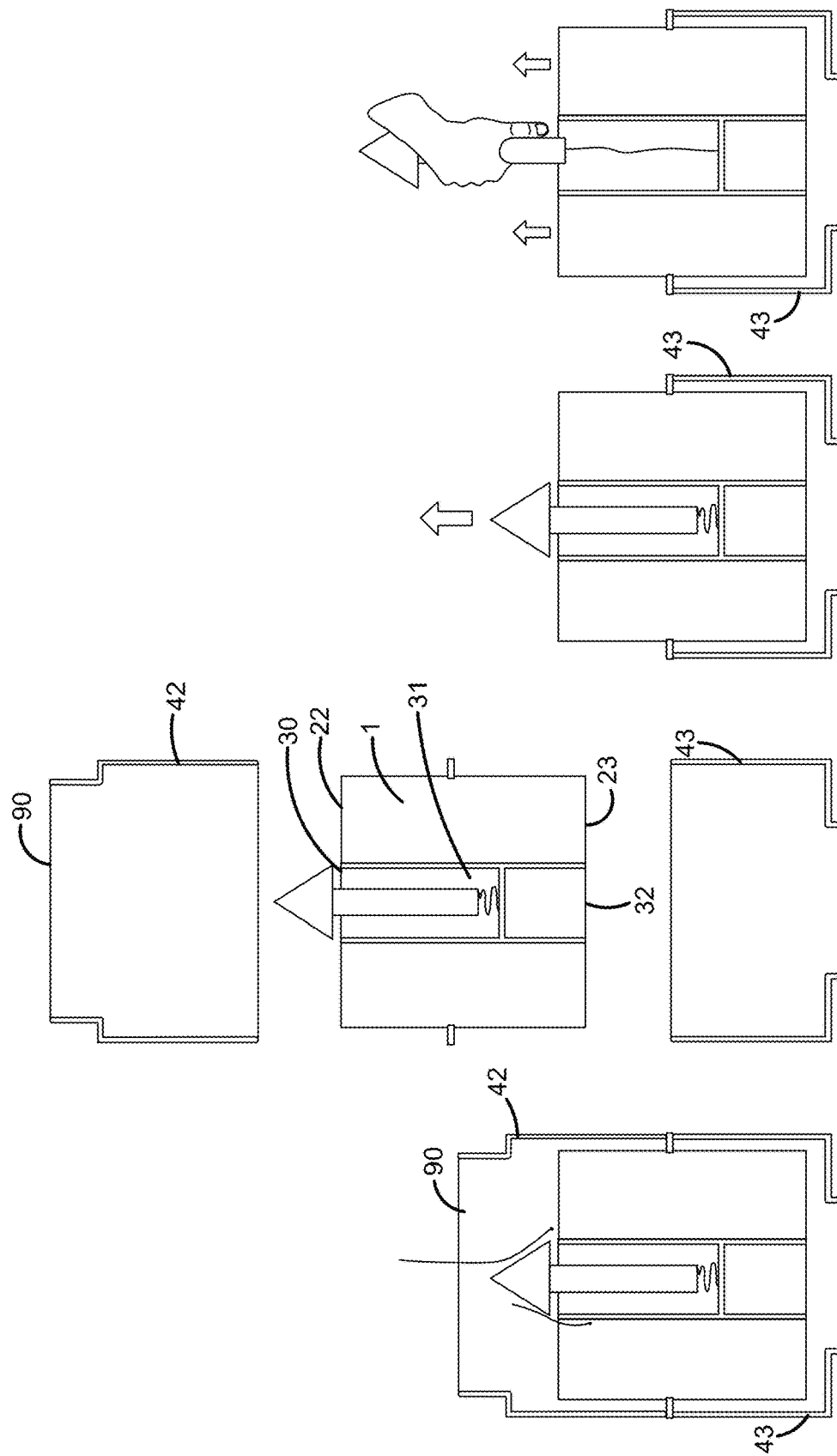

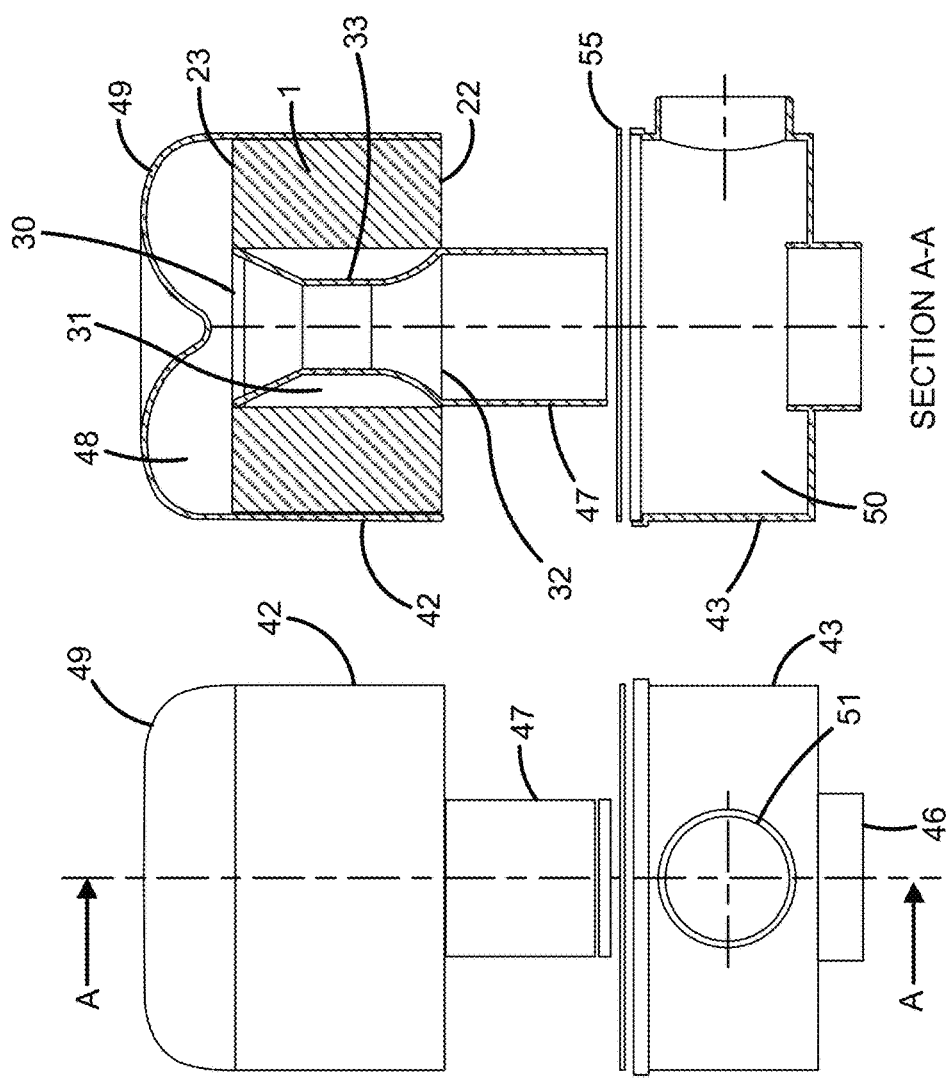
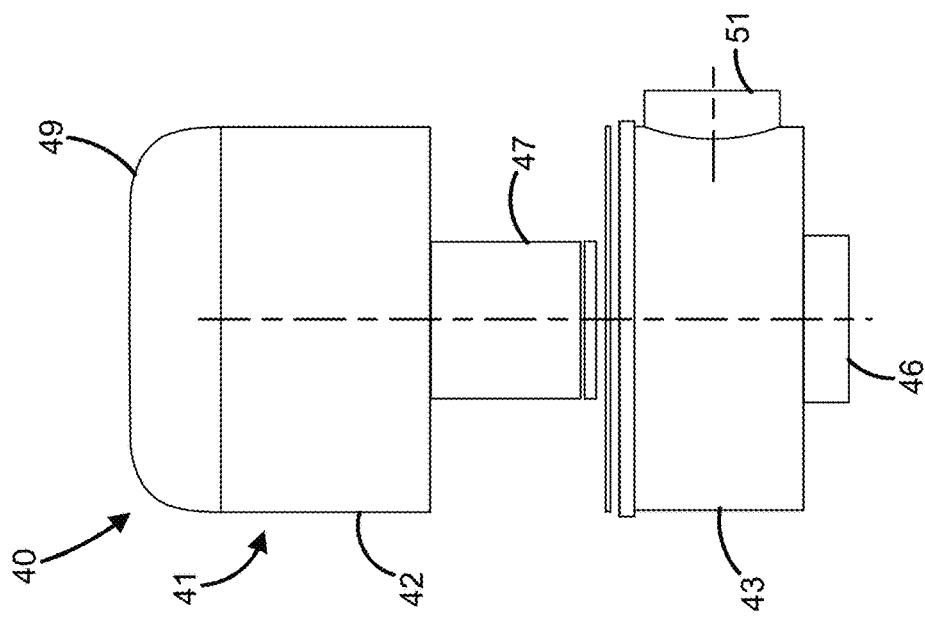

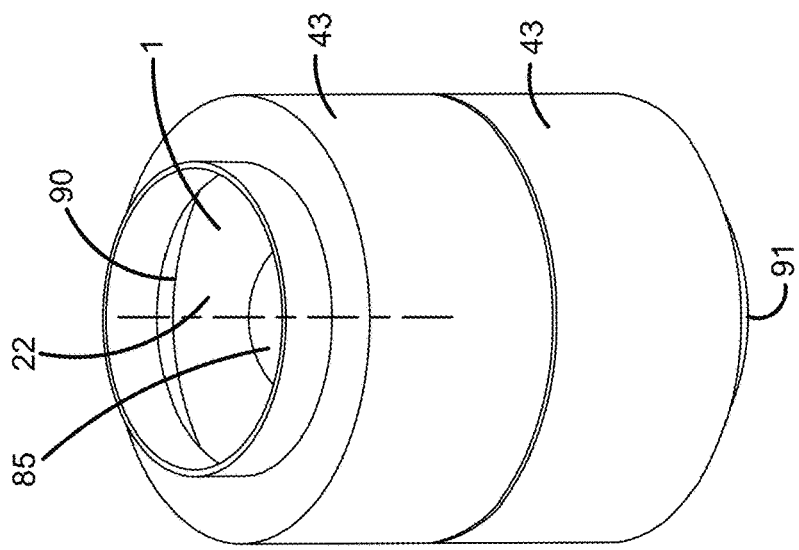
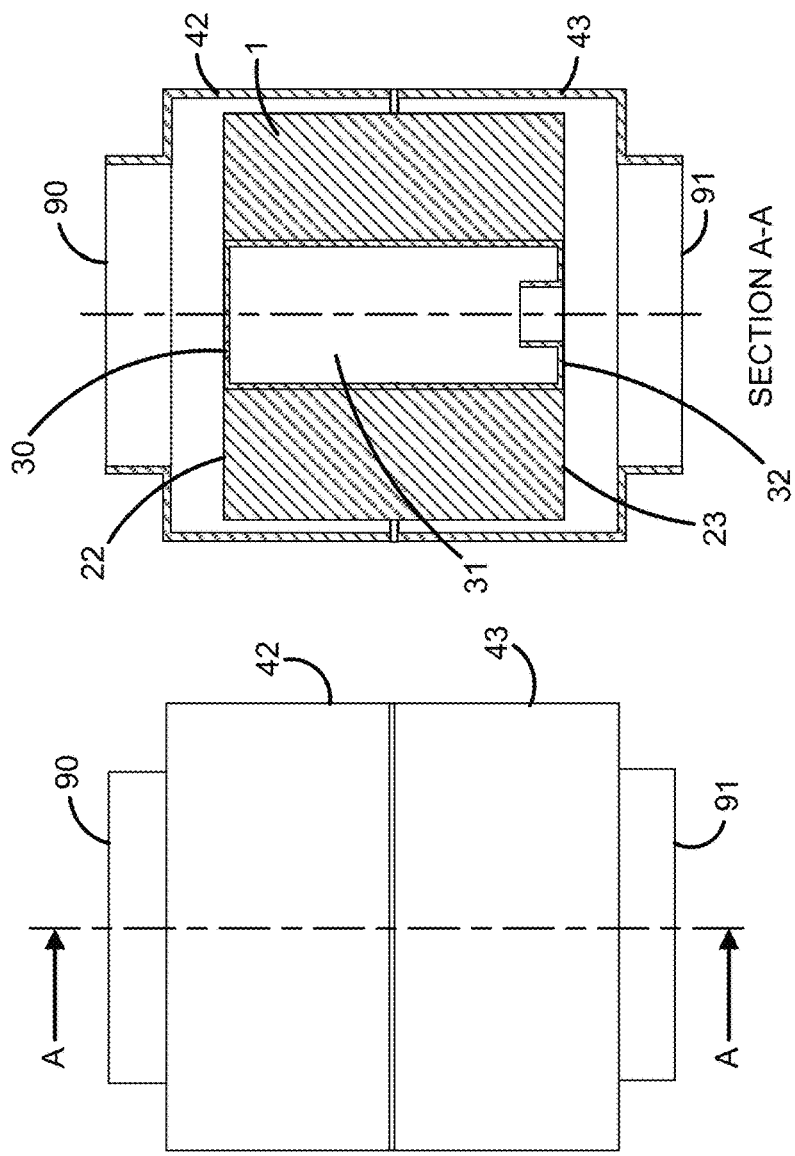
FIG. 41
FIG. 40
FIG. 39

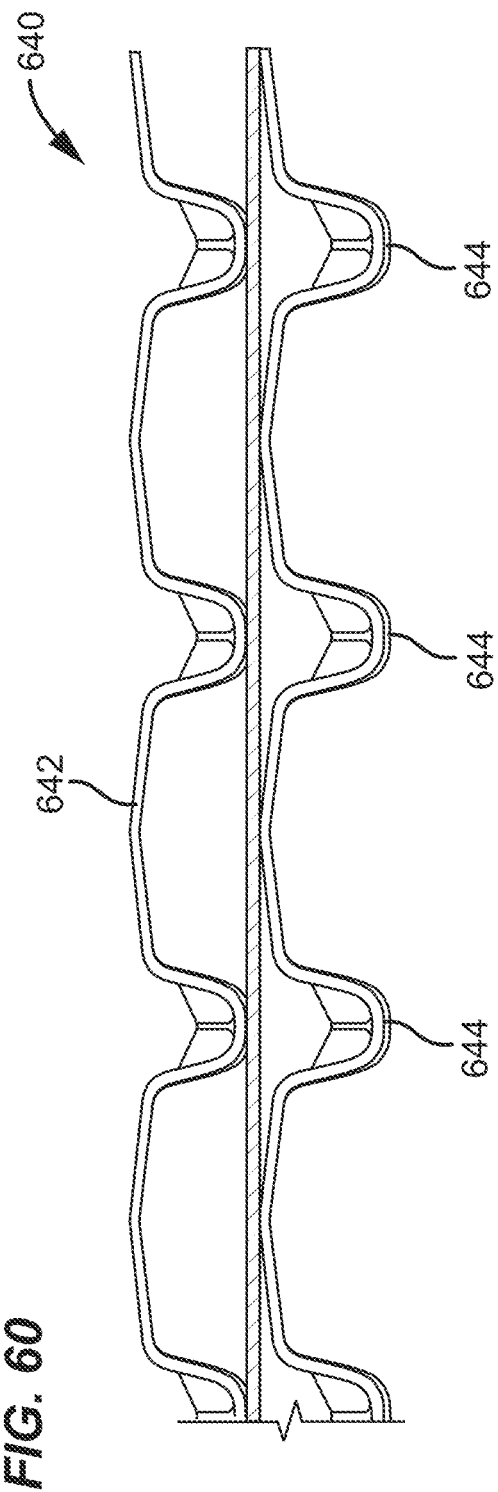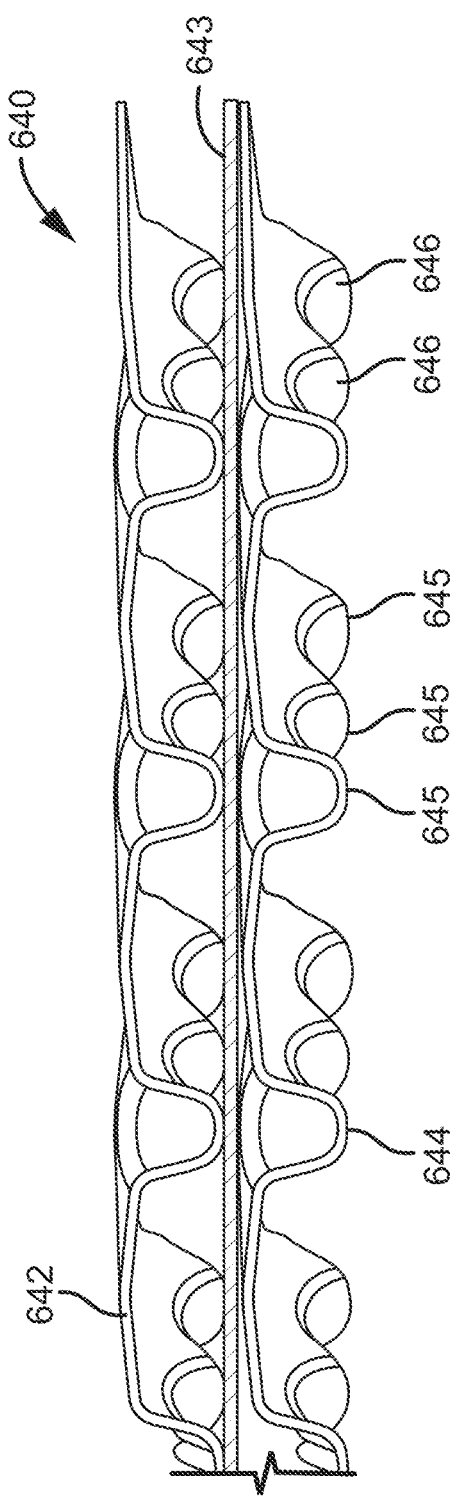

FILTER ELEMENT FOR FILTERING A FLUID

This application is a US National Stage application of PCT International Patent application No. PCT/US2020/016408, filed Feb. 3, 2020, which and claims the benefit of priority to U.S. Provisional patent application Ser. No. 62/800,913, filed Feb. 4, 2019, which applications are incorporated herein by reference. To the extent appropriate, a claim of priority is made to each of the above disclosed applications.

FIELD OF THE DISCLOSURE

The disclosure relates to a filter element for filtering a fluid passing through the filter element. The disclosure also relates to a filter arrangement for filtering a fluid. The disclosure also relates to a method for filtering a fluid. The disclosure also relates to a use of a filter element. The disclosure also relates to a method for producing a filter arrangement and a method for producing a filter element.

BACKGROUND

From WO 2017/174199 A1 a filter element for filtering a fluid passing through the filter element is known. The filter element forms a filter pack. The filter pack has a fluid entry face, namely a top face and a fluid exit face, namely a bottom face. The filter pack is provided with a group of first channels in which each first channel extends from a first end arranged at the top face toward a second end. Each first channel has at its first end an inlet opening through which the fluid to be filtered can flow into the respective first channel. Each first channel is closed at its second end. The filter element also has a group of second channels, in which each second channel extends from a second end at the bottom face toward a first end. Each second channel has as its second end an outlet opening through which the filtered fluid can flow out of the respective second channel. Each second channel is closed at its first end. The respective first channel is separated from the second channel, that is arranged next to it, by a partition wall. The partition wall is formed of a filter element, through which the fluid to be filtered can flow from the respective first channel into the second channel, that is arranged next to it.

Given this background, it is the object of the disclosure to provide a filter element that has further applications of use.

SUMMARY

This object is solved by the subject matter of the claims. Preferred embodiments are described in the subordinate claims and the description following hereafter.

The disclosure is based on the idea to provide a through-channel that leads through the filter element from the fluid entry face to the fluid exit face, which through-channel has an opening at fluid entry face and/or has an opening at the fluid exit face and to use such a through-channel in the filter pack to place an element that closes the flow of fluid through through-channel, while leaving a volume open inside the through-channel that is at least 10% of the volume that the through-channel would have without the element, or an element that allows the flow of fluid through the through-channel but interacts with the flow of fluid through the through-channel inside the through-channel or have the through-channel sidewalls deviate at least in some areas from a cylindrical wall in order to thereby create an element that interacts with a flow of fluid through the through-channel.

Providing a through-channel that leads through the filter element and that according to one embodiment has an opening at the fluid entry face and an opening at the fluid exit face means providing a leakage in a filter element that was previously used for a pure axial through-flow. In the filter pack known from WO 2017/174199 A1 there is no possible passage for the fluid from the fluid entry face to the fluid exit face of the filter pack that does not lead through the filter medium. In the filter pack known from WO 2017/174199 A1 the fluid can only flow from the top face through the filter pack to the bottom face by way of flowing through the filter medium at some point. Providing a through-channel that leads through the filter pack and has an opening at the top face and an opening at the bottom face constitutes a leakage for the type of uses propagated in WO 2017/174199 A1, as it allows for a flow path for the fluid to flow from the top face of the filter pack through the filter pack to the bottom face of the filter pack without flowing through the filter medium. The disclosure accepts this disadvantage in favour of the advantages that can be gained by providing an element that interacts with a flow of fluid through the through-channel inside the through-channel or by having the through-channel sidewalls deviate at least in some areas from a cylindrical wall in order to thereby create an element that interacts with a flow of fluid through the through-channel.

Providing a through-channel that leads through the filter pack and that according to one embodiment has an opening at the fluid entry face or has an opening at the fluid exit face does not mean providing a leakage in the filter element, but realises that the volume of the through channel inside the filter element can be used for the arrangement of elements. Sensors can, for example, be arranged that measure the differential pressure between the fluid entry face and the fluid exit face without leaving a bypass for fluid to bypass the filter media. Resonators can be provided that by way of the opening at the fluid entry face or by way of the opening at the fluid exit face allow for sound waves to enter into the volume of the through channel, but that by way of the through-channel being closed by the element do not continue to travel further.

Providing an element that interacts with a flow of fluid through the through-channel inside the through-channel provides several advantages. The element that interacts with the flow of fluid through the through-channel is protected by the filter pack. The filter pack surrounds the through-channel and hence protects the element that interacts with the flow of fluid that is arranged inside the through-channel. Arranging an element that interacts with the flow of fluid through the through-channel inside the through-channel also provides opportunities for making a filter arrangement that has such a filter element more compact. Elements that in filters according to the prior art might have been arranged before or after the filter element in the flow direction of the fluid can by way of making use of the disclosure be incorporated in the filter pack itself. This gives the designers of filters more opportunities to reduce the length of the filter arrangement itself. Arranging an element that interacts with a flow of fluid through the through-channel inside the through-channel also allows the possibility to have the element interact with a conditioned flow of fluid. If the through-channel in a preferred embodiment is, for example, provided with cylindrical sidewalls, the cylindrical sidewalls can assist a conditioning of the flow of fluid, for example lead to a laminar flow or at least reduce the amount of turbulences in the flow of fluid. Hence, if in a preferred embodiment, the element that is to be interacting with the flow of fluid is arranged towards that opening of the through-channel through which the fluid exists the through-channel, the opportunity arises to have the element interact with a conditioned flow of fluid that has been conditioned along its travel through the through-channel until it reaches the element.

The disclosure of the filter element will be made predominately on the embodiment of a filter element that has a filter pack, whereby the filter pack has a fluid entry face by way of a top face and a fluid exit face by way of a bottom face. Using this particular embodiment for the disclosure is made to facilitate the reading of the disclosure, but is not made to limit the enclosure to a filter element that has a filter pack, whereby the filter pack has a fluid entry face by way of a top face and a fluid exit face by way of a bottom face.

According to the disclosure, the filter element has a through-channel that leads through the filter pack. The through-channel has an opening at the top face and/or an opening at the bottom face. The through-channel can be obtained by simply leaving a certain area of the filter element free from channels that belong to the group of first channels and free from channels that belong to the second group of second channels and free from any other type of channel that has an opening at either the top face or the bottom face, but has no further opening. Embodiments hence are feasible, where the through-channel must not necessarily have a cross section of a circle or an ellipse, but can for example also have a polygonal cross section. In a preferred embodiment, the opening of the through-channel at the top face and the opening of the through-channel at the bottom face are of the same geometric shape, for example a circle or for example an ellipse, most preferably of the same geometric shape and same size. Most preferably the opening of the through-channel at the top face and the opening of the through-channel at the bottom face are congruent. Embodiments are also feasible, where the through-channel is cone-shaped, whereby the opening of the through-channel at the top face has a different size than the opening of the through-channel at the bottom face.

The through-channel in a preferred embodiment extends through the filter pack along a line. In a preferred embodiment, the through-channel extends along a line that is perpendicular to the top face and/or the bottom face of the filter pack. In a preferred embodiment, especially for those embodiments, where a separate element is introduced into the through-channel that is different to the elements that make up the through-channel, especially is different to the sidewalls that delimit the through-channel, the geometric shape of the majority, preferably of all cross-sections of the through-channel perpendicular to the line along which the through-channel extends are of the same geometric shape and most preferably of the same geometric shape and same size. The cross-sections can be circular, elliptical or even polygonal or even of a free form.

The sidewalls that delimit the through-channel can be provided by a separate element that is inserted into the filter pack. For example, the through-channel can be the inside of a tube that is arranged inside the filter pack and leads from the top face to the bottom face. The sidewalls that delimit the through-channel can, however, also be sidewalls that are provided by other elements of the filter pack, like for example by backing papers. Backing papers being understood to be media, typically sheet-type media that form part of the filter pack and preferably are attached to other parts of the filter pack, for example filter media, but are distinguished from filter media in that they do not allow the passage of fluid through them. Typical types of backing papers can be a hard carton, a plastic wrap, impregnated papers or plastic tubes.

According to the disclosure, in one embodiment an element that interacts with a flow of fluid through the through-channel is arranged inside the through-channel. Embodiments are possible, where the element is supported against a wall that delimits the through-channel. The element can, for example, be directly fixed to a sidewall of the through-channel. Other embodiments are feasible, where by way of struts or rips or other supporting or connecting elements, the element that interacts with the flow of fluid is positioned at a certain distance from the sidewall of the through-channel. Such a design is feasible, for example, for elements that are to be arranged in the middle of the through-channel and are to interact with that part of the flow of fluid through the through-channel that flows through the middle of the through-channel.

According to this aspect of the disclosure, a separate element is introduced into the through-channel that is different to the elements that make up the through-channel, especially is different to the sidewalls that delimit the through-channel. In a preferred embodiment the element that interacts with a flow of fluid through the through-channel is distinguished from the elements that make up the through-channel by way of not being connected to the sidewalls of the through-channel. In such an embodiment, the element would be supported by an element that is arranged outside the channel, for example an element of the filter pack that is arranged outside of the channel, for example elements that define the top face or the bottom face of the filter pack, or for example is supported by an element that forms part of the filter arrangement that contains the filter pack, for example is supported by an element that forms part of the housing of the filter. For those embodiments, where the element that interacts with a flow of fluid through the through-channel is connected to an element that forms the through-channel, for example the sidewalls of the through-channel, one possible way of distinguishing the element introduced into the through-channel from the through-channel is by way of identifying the connection between the element that interacts with a flow of fluid through the through-channel and the element that forms the through-channel, for example the glue or welding that has been used to attach the separate element to an element that forms the through channel. A further or alternative way to distinguish the element that interacts with a flow of fluid through the through-channel from an element that forms the through-channel is by way of being made from a different material than the elements that make up the through-channel, preferably from a different material than the material of the sidewalls of the through-channel. Hence, even for the embodiments that work with the element that interacts with a flow of fluid through the through-channel that is directly attached to the sidewalls in a surface-to-surface attachment, the element could be distinguished from the sidewalls of the through-channel by way of being made from a different material. In other embodiments, the element might be of the same material or might be of a different material to the elements that make up the through-channel, but can be differentiated from the elements that make up the through-channel and particularly can be differentiated from the sidewalls of the through-channel by way of the element being placed distanced from the sidewalls and either being entirely without connecting element to the sidewalls, for example in embodiments, where the element is connected to a part of the filter pack outside the through-channel or where the element is connected to a filter arrangement that contains the filter pack, or being connected to the sidewalls by connecting elements like struts.

In a preferred embodiment, the sidewalls that delimit the through-channel form a continuous surface, whereby a continuous surface is understood to be a surface without steps, a step being the arrangement of two surfaces that abut against each other, the free angle between the two surfaces being smaller than 150°, preferably smaller than 130°, preferably smaller than 110°. The zone of abutment of the two surfaces can be rounded, for example by providing a fillet or a chamfer.

In a further aspect of the disclosure, the sidewalls of the through-channel deviate at least in some areas from a cylindrical wall in order to thereby create an element that interacts with a flow of fluid through the through-channel. This aspect correlates with the aspect of placing an element that interacts with a flow of fluid through the through-channel in the through-channel, but anticipates that modern manufacturing techniques allow for this element to be produced as one piece with the elements that form the through-channel, especially as one piece with the sidewalls of the through-channel. If in a preferred embodiment the sidewalls of the through-channel are provided by a tube that is placed in the filter pack, the element that interacts with a flow of fluid through the through-channel, like for example vanes that influence the flow of fluid can be manufactured as one piece with the tube, for example by way of casting or molding, preferably injection-molding.

In a preferred embodiment, the sidewalls of the through-channel deviate at least in some areas from a cylindrical wall in order to thereby create an element that interacts with a flow of fluid through the through-channel in such a sense that the sidewalls of the through-channel can have the form of a truncated cone or can have a step. The sidewalls in this embodiment also can have the shape of a nozzle or a jet. In a preferred embodiment, the sidewalls of the through-channel have an area, where the sidewall is a cylindrical or elliptical or polygonal wall, and have an area, where the sidewalls of the through-channel deviate from a cylindrical wall or a polygonal wall or an elliptical wall in order to thereby create an element that interacts with a flow of fluid through the through-channel. In a preferred embodiment, the area of the sidewalls that is cylindrical or elliptical or polygonal is placed above and/or below the area, where the sidewalls of the through-channel deviate from a cylindrical wall or a polygonal wall or an elliptical wall in order to thereby create an element that interacts with a flow of fluid through the through-channel. Placing areas with sidewalls of cylindrical or elliptical or polygonal form above or below the area, where the sidewalls of the through-channel deviates from a cylindrical wall or a polygonal wall or an elliptical wall allows for a conditioning of the flow of fluid, for example a stratifying of the fluid before the fluid enters the area, where the sidewalls of the through-channel deviates from a cylindrical wall or a polygonal wall or an elliptical wall. In an alternative embodiment, the through-channel does not contain any area that has a cylindrical wall, but only has sidewalls that in shape deviate from a cylindrical shape.

According to the disclosure, in one embodiment an element that interacts with the flow of fluid through the through-channel is arranged inside the through-channel, either by way of placing a separate element in the through-channel or by giving the sidewalls of the through-channel a specific shape. The interaction between the flow of fluid and the element can be such that a property of the fluid is changed by way of the interaction. The element can for example influence the flow path of the fluid through the through-channel. Such elements can, for example, be vanes or cyclones that are arranged inside the through-channel. The interaction with the flow of fluid can also be for the purpose of noise reduction. For example, an acoustic resonator, for example an acoustic cone or a muffler can be arranged inside the through-channel. A different way of interaction with the flow of fluid is provided by an element that interacts with the flow of fluid in order to determine a property of the flow of fluid. Such an element that interacts with the flow of fluid to determine a property of the flow of fluid can be a sensor that senses a property of the fluid. Further elements that interact with the flow if fluid through the through-channel that are arranged inside the through-channel can be elements that disturb the flow of fluid through the through-channel, but that are arranged for other purposes. For example, a mass can be arranged in the through-channel and fixed to the sidewalls of the through-channel, which has the purpose of increasing the mass of the filter element and hence reduce the tendency to vibrate of the filter element or to tune the own frequency or resonance frequency of the element or the air cleaner assembly. Or a handle that protrudes out of the through-channel and allows the easy handling of the filter element can be arranged to be fixed to a sidewall of the through-channel inside the through-channel and to propagate out of the through-channel from this point of fixation.

In an alternative embodiment of the disclosure, an element closes the flow of fluid through the through-channel, while leaving a volume open inside the through-channel that is at least 10%, preferably at least 20%, preferably at least 30%, preferably at least 40%, preferably at least 50% of the volume that the through-channel would have without the element. Instead of closing the complete through-channel, this embodiment —while closing the flow of fluid through the through-channel—leaves a volume in the through channel. Compared to embodiments, where an element would fully close the through-channel, this arrangement allows the volume left in the through-channel to be used for further purposes. Additionally, such arrangement are more lightweight than arrangements, where an element would fully close the through-channel.

In the present disclosure the terms "fluid entry face" and "fluid exit face" are to be understood to describe the ability of the such designated face to function as a "fluid entry face" or "fluid exit face" respectively, but not to limit such faces to be solely used as a "fluid entry face" or "fluid exit face" respectively. As is well known to the skilled person, a filter element that is used to filter a fluid that flows through the filter element in one direction can also be used to filter a fluid by letting the fluid flow through the filter element in the opposite direction. The use of the terms "fluid entry face" and "fluid exit face" also is intended as means to consistently address one face of the filter element through-out the disclosure, namely the one addressed as "fluid entry face" and as means to consistently address one different face of the filter element that is not the one addressed to as "fluid entry face" through-out the disclosure.

In the present disclosure the terms "top face" and "bottom" are to be understood to describe the ability of the such designated face to function as a "top face" or "bottom face"" respectively, for example if the filter element is held in a certain orientation, but not to limit such faces to be solely used as a "top face" or "bottom face" respectively. The filter element might be held in a completely different orientation, for example with the face that is being called "top face" being pointing towards one side and the face that is being called "bottom face" being pointing towards a different side. The use of the terms "top face" and "bottom face" also is intended as means to consistently address one face of the filter element through-out the disclosure, namely the one addressed as "top face" and as means to consistently address one different face of the filter element that is not the one addressed to as "bottom face" through-out the disclosure.

In a preferred embodiment, the filter element has a longitudinal axis. In a preferred embodiment, the longitudinal axis connects the top face of the filter pack with the bottom face of the filter pack. In a preferred embodiment, the longitudinal axis runs perpendicular to the top face and/or perpendicular to the bottom face.

According to a preferred embodiment, the cross-sectional area of the opening of the through-channel at the top face and/or the cross-sectional area of the opening of the through-channel at the bottom face is larger than the cross sectional area of the inlet opening of any first channel and/or is larger than the outlet opening of any second channel. Preferably the cross sectional area of the opening of the through-channel at the top face and/or the cross sectional area of the opening of the through-channel at the bottom face is larger by a factor of 1.5, preferably by a factor of 2, preferably by a factor of 5, preferably by a factor of 10, preferably by a factor of 20, preferably by a factor of 50, preferably by a factor of 100, than the cross sectional area of the inlet opening of any first channel and/or is larger than the outlet opening of any second channel. In a preferred embodiment, the cross-sectional area of the opening of the through-channel at the top face and the cross-sectional area of the opening of the through-channel at the bottom face and the cross sectional area of the inlet opening and the cross sectional area of the outlet opening are measured in planes that are perpendicular to the longitudinal axis of the filter element. In a preferred embodiment, the cross-sectional area of the opening of the through-channel at the top face has the same cross-sectional area than the cross-sectional area of the opening of the through-channel at the bottom face. In a preferred embodiment, the cross sectional area of the opening of the through channel at the top face is larger than 0.5 mm2, preferably larger than 1 mm2, preferably larger than 5 mm2, preferably larger than 10 mm2, preferably larger than 20 mm2. In a preferred embodiment, the largest diameter of the opening of the through channel at the top face is larger than 0.5 mm, preferably larger than 1 mm, preferably larger than 5 mm, preferably larger than 10 mm, preferably larger than 20 mm. In a preferred embodiment, the cross sectional area of the opening of the through channel at the bottom face is larger than 0.5 $mm^2$, preferably larger than 1 $mm^2$, preferably larger than 5 $mm^2$, preferably larger than 10 $mm^2$, preferably larger than 20 $mm^2$. In a preferred embodiment, the largest diameter of the opening of the through channel at the bottom face is larger than 0.5 mm, preferably larger than 1 mm, preferably larger than 5 mm, preferably larger than 10 mm, preferably larger than 20 mm.

In a preferred embodiment the element that interacts with a flow of fluid through the through-channel and which is arranged inside the through-channel or is provided by the through-channel sidewalls deviating at least in some areas from a cylindrical wall is a noise reduction element. Such a noise reduction element can be an acoustic cone, a foam, a muffler or a resonator. A resonator interacts with the flow of fluid as it gives turbulence. The acoustic cone preferably has a portion that is nozzle-shaped. The noise reduction element can be adapted to specific frequencies. The adaptation can be obtained by changing the stiffness of elements of the noise reduction element, for example by way of having an elastic material form a nozzle or a jet and having elements that can change the elasticity of the elastic material. For example, a support plate can be arranged behind the elastic material and the position of the support plate can be changed. The further the support plate is moved into the elastic material, the stiffer the elastic material gets. Alternatively or in addition the adaptation can be obtained by the acoustic cone being designed as an elastic tube, where the diameter of the tube can be changed at least in some areas along the longitudinal propagation of the tube by having a clamp or a tie wrap round the tube, while changing the clamping force or the diameter of the tie wrap changes the diameter of thee acoustic cone at that area, where the clamp or the tie wrap is arranged. The acoustic element can also be provided by way of having at least two tubes through which the fluid flows placed one after the other, the one tube partially encompassing the other tube. By way of changing the overlap of the tubes, the attenuation frequency of the noise reduction element can be changed. In a preferred embodiment, the outer tube is closed at one end and reverses the flow. A resonator can also be achieved by placing an element inside the through-channel that closes the through-channel, for example closes the through-channel at the top face and which element leaves a volume open inside the through-channel that is at least 10% of the volume that the through-channel would have without the element. In such an embodiment, the sound would enter through the opening of the through-channel that is left open, for example if the through-channel is closed by the element at the top face, the through-channel could be open at the bottom face, and would be cancelled inside this volume by superposition.

In a preferred embodiment the element that interacts with a flow of fluid through the through-channel and which is arranged inside the through-channel or is provided by the through-channel sidewalls deviating at least in some areas from a cylindrical wall is an element that influences the flow paths of the fluid through the through-channel. Such elements can be vanes or cyclones. Also elements like collection tubes or separating baffle tubes can be arranged behind the vanes in order to make use of any specific flow pattern that is introduced to the fluid by the vanes or the cyclones, for example to collect heavier particles that in a swirl movement move to the outside. The vanes can be straight vanes that propagate parallel to the longitudinal axis of the through-channel. The vanes can be straight vanes that are arranged angled to the longitudinal axis of the through-channel or even perpendicular to the longitudinal axis of the through-channel. The vanes can be twisted vanes, for example helical vanes.

In a preferred embodiment the element that interacts with a flow of fluid through the through-channel and which is arranged inside the through-channel or is provided by the through-channel sidewalls deviating at least in some areas from a cylindrical wall is a sensor that senses a property of the fluid. The sensor can be a pressure sensor, a temperature sensor, a moisture sensor, a sensor that analysis the chemical composition of the fluid or a sensor that can determine the load of particles or droplets in the fluid. Also a mass air flow sensor can be arranged to interact with the fluid. The sensor can have a sensor surface, whereby the sensor surface is arranged flush with a sidewall of the through-channel. A sensor can also be provided by or placed on by an element inside the through-channel that closes the through-channel, for example closes the through-channel at the top face and which element leaves a volume open inside the through-channel that is at least 10% of the volume that the through-channel would have without the element. In such an embodiment, the sensor could measure a differential pressure between the top face and the bottom face. The sensor could be arranged to have a membrane that closes helps to close the through-channel, the membrane on its one side being facing a volume that is at the same pressure as the fluid above the top face and the membrane on its opposite side being facing a volume, that is at the same pressure as the fluid below the bottom face. One of these volumes could be the volume inside the through-channel. Or the sensor and hence the element that closes the through-channel is arranged somewhere between the top face and the bottom face, hence creating a volume of the through-channel that is above the sensor and has an opening at the top face and creating a volume below the sensor that has an opening at the bottom face, both volumes being sealed against each other by the sensor and possible elements that hold the sensor at this location.

In a preferred embodiment the element that interacts with a flow of fluid through the through-channel and which is arranged inside the through-channel or is provided by the through-channel sidewalls deviating at least in some areas from a cylindrical wall is a transponder, preferably an active or a passive RFID-chip.

In a preferred embodiment the element that interacts with a flow of fluid through the through-channel and which is arranged inside the through-channel or is provided by the through-channel sidewalls deviating at least in some areas from a cylindrical wall is a handle that allows ease of handling of the filter element. In a preferred embodiment, the handle protrudes beyond the opening of the through-channel at the top face and/or beyond the opening of the through-channel at the bottom face.

In a preferred embodiment the element that interacts with a flow of fluid through the through-channel and which is arranged inside the through-channel or is provided by the through-channel sidewalls deviating at least in some areas from a cylindrical wall is mass that reduces the vibration in the filter pack. Such a mass can for example be a block-shaped element attached to the side-wall of the through-channel.

In a preferred embodiment the element that interacts with a flow of fluid through the through-channel and which is arranged inside the through-channel or is provided by the through-channel sidewalls deviating at least in some areas from a cylindrical wall is a mass that by way of a spring is attached to the filter pack. Pulling the mass and hence loading the spring allows the mass to be pulled back towards the filter pack and to have the mass impinge against the filter pack, for example impinge against a sidewall of the cylinder with an impulse. This impulse can be used to knock or tab particles out of the filter medium arranged inside the filter pack and allows for cleaning of the filter pack.

In a preferred embodiment, the element that interacts with the flow of fluid is fixed to the filter pack. This allows the element to be maneuvered together with the filter element. In an embodiment, where filter elements are arranged inside a filter arrangement in such a manner that they can be exchanged, fixing the element to the filter pack allows to exchange the element at the same time as exchanging the filter pack.

In a preferred embodiment, the element that interacts with a flow of fluid can be removed from the through-channel. This can be either implemented by fixing the element to the filter pack in a way that the fixing can be loosened. The element can for example be screwed into the through-channel. Or a bayonet connection is feasible to fix the element to the through-channel in a way that the fixing can be loosened. Allowing for the filter element to be removed from the through-channel allows the re-use of elements. In an embodiment, where the filter element is arranged exchangeably in a filter, but where the element that interacts with the flow of fluid is to be reused after an exchange of the filter element, for example if the element is an expensive sensor, the ability to remove the element from the one filter element that is to be changed and to introduce it into the through-channel of a new filter element is advantageous. Sealings can be provided that act between an outside wall of the element that is to be placed in the through-channel and the sidewall that delimits the through-channel. These seals can avoid that any flow of fluid bypasses the element in the through-channel in a direction that is not intended. These seals can be used to stop leakages and to ensure that the fluid can only flow in a predefined flow path through the filter pack.

In a preferred embodiment a tube is arranged at least partially in the through-channel. The tube can be arranged in such a manner that it only partially is arranged in the through-channel. Hence an open end of the tube would be arranged inside the through-channel. Such an arrangement can be used to pre-clean the fluid as it flows through the through-channel. If a swirl is introduced into the fluid as it flows through the through-channel, it is to be expected that larger particles that are carried with the fluid, for example large dust particle or large droplets of a fluid are carried circumferentially outwards, while the fluid in the centre of the flow carries less particles or droplets or even only particles or droplets of smaller diameter or even no particles or droplets. Hence if in the preferred embodiment a tube is arranged that protrudes only into a part of the through-channel, this tube can pick up the cleaner central stream of the fluid, while part of the fluid that is more radially outward and carries the larger dust particles or larger droplets will not enter into the tube. If the tube is then made to carry the flow of fluid that has been picked up to one face of the filter pack and let this pre-cleaned fluid enter into the filter pack, the efficiency of the cleaning can be increased.

In a preferred embodiment, the filter element has a cap with a chamber being formed inside the cap and the top face of the filter pack bordering the chamber. The cap can be used to close off the area above the top face of the filter pack. Hence the cap can be used to make sure that any fluid that enters into the area above the top face of the filter pack, for example the chamber that the cap forms above the top face of the filter pack by way of flowing through the through-channel is made to leave this chamber again by way of flowing into the filter pack from the top face.

In a preferred embodiment, flow guides are arranged in the chamber. These flow guides can be used to guide the flow of fluid inside the chamber. For example, these flow guides can be used to guide a fluid that enters into the chamber by way of flowing through the through-channel towards the top face of the filter pack enter into the filter pack through the top face. Such flow guides can, however, also be used to condition the fluid in the chamber. If for certain application it is desired that the fluid is mixed before entering into the filter pack, flow guides can arrange for such a mixing. In other embodiments, it might be desired to introduce a swirl movement into the fluid inside the chamber. Such a swirl might be used to carry droplets or larger particles radially outwards. Such a mechanism can be used to pre-clean the fluid. The droplets and the larger particles will move towards the inside surface of the cap and in a preferred embodiment can be collected there by appropriate means, for example a scraper. The cap can have the shape of a torus that has been cut in half, for example cut along a plane that is perpendicular to the rotational axis of the torus. In a preferred embodiment, the torus is chosen such that the centre hole of the torus is closed.

In a preferred embodiment, the cap is attached to the filter pack. This attachment can be either a fixed attachment, for example by way of gluing the cap to the outer circumferential wall of the filter pack or by welding the cap to the outer circumferential wall of the filter pack. Alternatively, the attachment can be in such a way that it can be loosened. For example, the cap with an inner thread can be threaded onto the filter pack that has an outer thread. Preferably, the attachment is such that it seals the chamber towards the outside and prevents any fluid from flowing between the cap and the filter pack towards the outside. The attachment of the cap to the filter pack allows the filter pack and the cap to be handled as a unit. Hence, if the filter pack is used in an environment, where the filter pack of a filter arrangement is to be changed regularly, attaching the cap to the filter element allows the cap to be easily exchanged together with the filter pack. This can, for example, provide the advantage that during the exchange of the filter element, even if the filter element is turned upside down, no particles or no droplets that have been collected inside the filter pack and that will leave the filter pack, if the filter pack is turned upside down, will be discharged to the environment. Such particles or droplets that leave the filter pack when the filter pack is being turned upside down will be caught by the cap. Hence it is prevented, that the area around the filter arrangement that has such a filter pack is dirtied once the filter element is being exchanged.

In a preferred embodiment, an opening or a discharge tube is arranged on the cap. Such an opening or a discharge tube can be used to transport material out of the chamber of the cap. For example, if the cap is used to pre-clean the fluid and particles or droplets collect at the inside surface of the cap, an opening in the cap or a discharge tube in the cap can be used to bring such particles or droplets out of the chamber. In a preferred embodiment, the opening or tube is facing perpendicular to the longitudinal axis of the filter element and could be set to be pointing radially outward or could be set to be at least be facing partially radially outward (the term that the opening is facing perpendicular to the longitudinal axis is to be understood as the normal vector to the area of the opening being perpendicular to the longitudinal axis). Such openings or discharge tubes can be used to bring out droplets or particles that have a radial direction of motion. In an alternative embodiment, the opening or the discharge tube can be arranged to be facing axially and hence parallel to the longitudinal axis of the filter element. Such an arrangement can be used, if the cap is made dome-shaped and the particles or the droplets travel along the inner surface of the dome-shaped cap to the area, where the rim of the cap borders the filter pack. If the opening or the discharge tube is arranged in this area and is arranged to be facing axially downward, the particles or droplets can be removed from the chamber by way of travelling past the filter pack in an axial direction. In an alternative embodiment, actively turning elements, for example scrapers that are driven by a motor are arranged to scrape along the inner surface of the cap and hence clean the inner surface of the cap or remove any particles or droplets that are clinging to the inner surface of the cap. It is also feasible for the scrapers to be mechanically driven by the flow itself, for example by way of use of propellers and hence can be provided without a motor to drive them.

The opening or discharge tube could also be used to guide cables or hoses out of the chamber. If a sensor is arranged inside the through-channel or a sensor is arranged inside the chamber of the cap, a signal cable from the sensor can be led out of the filter element through an opening or discharge tube of the cap.

In a preferred embodiment, a filter medium is arranged inside the through-channel. In a preferred embodiment, the filter medium spans across the full cross-sectional area of the through-channel. Such a filter medium can, for example, be a foam. Such a filter medium can, for example, be used to pre-clean the fluid. The fluid would hence first pass through the filter medium arranged inside the through-channel and would then travel through the through-channel to then be reversed at the other side and be made to travel through the filter pack to be fully cleaned in the filter medium that is arranged between the group of first channels and in the group of second channels in the filter pack. In an alternative embodiment, the fluid could be made to first travel through the group of second channels and group of first channels in the filter pack in a first directional flow and can then be reversed to flow backwards through the through-channel and through the filter medium that is arranged inside the through-channel. In such an embodiment, the filter medium arranged in the inside of the through-channel can be used as a safety element. If for example the filter medium arranged inside the through-channel has finer pores than the filter medium between the channels of the group of first and the channels of the group of second channels, the filter medium arranged inside the through-channel will pick up particles or droplets of smaller diameter that passed through the filter medium arranged between the group of first channels and the group of second channels without being picked up by this filter medium arranged between the group of first channels and the group of second channels. The filter medium arranged inside the through-channel can hence be made to block very quickly, if particles or droplets of a certain size are not caught by the filter media between the group of first channels and the group of second channels. Such a filter media arranged inside the through-channel can hence prevent any droplets or particles above a certain size to leave the filter element and hence ensure, that any element arranged after the filter element, for example a turbo charger is kept safe from any such particles or droplets entering into the element arranged after the filter element. Also, the quick blocking of this filter medium arranged inside the through-channel leads to a quick rise in differential pressure between the pressure of the fluid at the top face and at the bottom face. This rise in differential pressure can be measured and can be used as an indicator of a failure of the filter medium, namely that certain particles were not picked up by the filter medium between the channels of the group of first and the channels of the group of second channels. In a preferred embodiment, the filter medium arranged inside the through-channel is of different built, design and/or material than the filter pack.

In a preferred embodiment, the filter pack has a closed circumferential surface. This could for example be achieved by gluing a sheet around the outer circumferential surface of the filter pack. Alternatively, a solid tube can be arranged and the filter pack can be inserted into the tube whereby the outer circumferential surface of the filter pack rests against the inner surface of the tube. In a preferred embodiment, the closed circumferential surface of the filter pack has a circumferential seal that is arranged on the circumferential surface. If a filter element of such a design is inserted into a housing, the circumferential seal can be used to seal against the inner wall of the housing. Hence such a circumferential seal can be used to prevent any fluid bypassing the filter pack by way of flowing around the filter pack. Any such flow would be prevented by the circumferential seal. Arranging the circumferential seal on the circumferential surface of the filter pack, especially affixing the circumferential seal to the circumferential surface allows the seal to be exchanged together with the filter pack. Hence any time a fresh filter element is inserted into the filter, a fresh seal would also be inserted.

In a preferred embodiment, the filter medium through which the fluid to be filtered can flow from the respective first channel into the respective second channel is a fluted medium.

In an alternative embodiment of the filter element according to the disclosure, the filter element according to the disclosure does not necessarily have an element that interacts with a flow of fluid through the through-channel that is arranged inside the through-channel or does not necessarily have the through-channel walls deviate at least in some areas from a cylindrical wall in order to thereby create an element that interacts with a flow of fluid through the through-channel, but is characterized in that the filter pack has a closed circumferential surface and has a circumferential seal that is arranged on the circumferential surface. The inventors have understood, that advantages can be obtained with a filter element according to the disclosure that has a through-channel that leads through the filter pack, which through-channel has an opening at the top face and an opening at the bottom face and which filter element at the same time has a closed circumferential surface and a circumferential seal that is arranged on the circumferential surface even without the necessity for such a filter element to have an element that interacts with a flow of fluid through the through-channel that is arranged inside the through-channel or for this filter element to have the through-channel walls deviate at least in some areas from a cylindrical wall in order to thereby create an element that interacts with a flow of fluid through the through-channel. Such advantages are, for example, that the filter element can be used in compact spaces, where the inlet for fluid and the outlet for cleaned fluid are to be arranged generally on the same side. The filter element of this embodiment of the disclosure allows a revers flow arrangement, where the fluid first passes through the through-channel and then is reversed and made to flow through the filter pack or to implement a reverse flow, whereby the fluid first flows through the filter pack and then is reversed to flow through the through-channel. Both design options allow the inlet and the outlet for the fluid and the clean fluid to be generally arranged close to each other or at least at the same side of the filter.

The filter element according to this embodiment of the disclosure can of course be combined with all features of the filter element according to the first embodiment of the disclosure, which is characterized by the element that interacts with a flow of fluid through the through-channel that is arranged inside the through-channel and/or to have the through-channel walls deviate at least in some areas from a cylindrical wall in order to thereby create an element that interacts with a flow of fluid through the through-channel.

In a preferred embodiment, the individual first channels of the group of first channels are arranged in rings around the through-channel, whereby the ring can be circular or elliptical or polygonal or free shaped and whereby the ring might be a closed ring or might be a ring, where due the winding of layers that make up the filter pack, the ring is a section of a helical progression of first channels. In a preferred embodiment, at least two rings, preferably at least five rings of first channels are arranged around the through-channel.

In a preferred embodiment, the individual second channels of the group of second channels are arranged in rings around the through-channel, whereby the ring can be circular or elliptical or polygonal or free shaped and whereby the ring might be a closed ring or might be a ring, where due the winding of layers that make up the filter pack, the ring is a section of a helical progression of second channels. In a preferred embodiment, at least two rings, preferably at least five rings of first channels are arranged around the through-channel.

The filter pack can have a cylindrical or elliptical cross section or a polygonal cross section. In a preferred embodiment the majority, preferably all of the cross-sections perpendicular to a longitudinal axis of the filter pack have the same geometric shape. Preferably they have the same geometric shape and same size. Possible designs can also be cone-shaped filter packs, where the cross-sections have the same geometric shape, but the size diminishes from one face of the filter pack to the opposite side of the filter pack.

In a preferred embodiment, the top face of the filter pack and the bottom face of the filter pack are plane. In a preferred embodiment, the angle between the top face of the filter pack and the bottom face of the filter pack is less than 45°, preferably less than 20°, preferably less than 10°. In a preferred embodiment the top face of the filter pack is parallel to the bottom face of the filter pack.

The filter element has a group of first channels in which each first channel extends from a first end toward a second end and each first channel has an inlet opening that opens into the fluid entry face and through which the fluid to be filtered can flow into the respective first channel. In a preferred embodiment, the first end of each first channel is arranged at the fluid entry face and each first channel has at its first end an inlet opening through which the fluid to be filtered can flow into the respective first channel and each first channels is closed at its second end. In alternative embodiments, for example in a pleated filter, which typically have a first end cap with a hole and a second, closed end cap with the pleated filter media of generally cylindrical arrangement being arranged between the first end cap and the second end cap, the individual pleats that open towards the inside of the generally cylindrical arrangement of the pleated filter media could be considered as first channels. These first channels would extend from a first end (at the first end cap) to a second end (at the second end cap). These first channels would have a large inlet opening that opens into a fluid entry face. The fluid entry face would be the generally cylindrical area surrounded by the generally cylindrical arrangement of the pleated filter media and the open space between two crests that delimit the one pleat against its neighbouring pleats would be the large inlet opening. The extension of the channel from first end toward second end would be generally perpendicular to the inflow of fluid through the large inlet opening; the inflow of fluid through the large inlet opening being predominantly radially in respect of the generally cylindrical arrangement of the pleated filter media, while the extension of the first channel from first end toward second end being axial in respect of the generally cylindrical arrangement of the pleated filter media. The second channels would be the pleats that face outwards and have their large opening facing radially outwards in respect to the generally cylindrical arrangement of the pleated filter media.

In some embodiments, the filter media or filter medium is pleated media.

The filter element or filter cartridge can include a media pack comprising media for straight-through flow.

The filter element, especially the filter cartridge may include a media pack comprising flutes.

The filter element, especially the filter cartridge may include a media pack comprising pleats.

The filter element, especially the filter cartridge may include a media pack comprising opposite first and second flow faces (also referred to as top face and bottom face, respectively) with flutes extending in a direction therebetween; and a sidewall extending between the first and second flow faces; at least some of the flutes having an upstream portion adjacent the first flow face being open and a downstream portion adjacent the second flow face being closed; and at least some of the flutes having an upstream portion adjacent the first flow face being closed and a downstream portion adjacent the second flow face being open.

In some implementations, the media pack in the filter element, especially the filter cartridge is coiled.

The filter element, especially the filter cartridge is made from z-filter media. The filter media can be used to form a "z-filter construction." The term "z-filter construction" as used herein, is meant to include (but not be limited) a type of filter construction in which individual ones of corrugated, folded or otherwise formed filter flutes are used to define (typically in combination with facing media) sets of longitudinal, typically parallel, inlet and outlet filter flutes for fluid flow through the media. Some examples of z-filter media are provided in U.S. Pat. Nos. 5,820,646; 5,772,883; 5,902,364; 5,792,247; 5,895,574; 6,210,469; 6,190,432; 6,350,291; 6,179,890; 6,235,195; Des. 399,944; Des. 428,128; Des. 396,098; Des. 398,046; and, Des. 437,401; each of these cited references being incorporated herein by reference.

One type of z-filter media, utilizes two specific media components joined together, to form the media construction. The two components are: (1) a fluted (typically corrugated) media sheet or sheet section, and, (2) a facing media sheet or sheet section. The facing media sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted media section and facing media section can comprise separate materials between one another. However, they can also be sections of the single media sheet folded to bring the facing media material into appropriate juxtaposition with the fluted media portion of the media.

The fluted (typically corrugated) media sheet and the facing media sheet or sheet section together, are typically used to define media having parallel flutes. In some instances, the fluted sheet and facing sheet are separate and then secured together and are then coiled, as a media strip, to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked with one another, to create a filter construction. An example of this is described in FIG. 11 of U.S. Pat. No. 5,820,646, incorporated herein by reference.

Herein, strips of material comprising fluted sheet (sheet of media with ridges) secured to corrugated sheet, which are then assembled into stacks to form media packs, are sometimes referred to as "single facer strips," "single faced strips," or as "single facer" or "single faced" media. The terms and variants thereof, are meant to refer to a fact that one face, i.e., a single face, of the fluted (typically corrugated) sheet is faced by the facing sheet, in each strip.

Typically, coiling of a strip of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is often used to refer to a flute structure resulting from passing the media between two corrugation rollers, i.e., into a nip or bite between two rollers, each of which has surface features appropriate to cause corrugations in the resulting media. The term "corrugation" is however, not meant to be limited to such flutes, unless it is stated that they result from flutes that are by techniques involving passage of media into a bite between corrugation rollers. The term "corrugated" is meant to apply even if the media is further modified or deformed after corrugation, for example by the folding techniques described in PCT WO 04/007054, and published Jan. 22, 2004, incorporated herein by reference.

Corrugated media is a specific form of fluted media. Fluted media is media which has individual flutes or ridges (for example formed by corrugating or folding) extending thereacross.

Serviceable filter element or filter cartridge configurations utilizing z-filter media are sometimes referred to as "straight through flow configurations" or by variants thereof.

In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a substantial turn as its passes into and out of the media. That is, in a U.S. Pat. No. 6,039,778 filter, the flow enters the cylindrical filter cartridge through a cylindrical side, and then turns to exit through an open end of the media (in forward-flow systems). In a typical reverse-flow system, the flow enters the serviceable cylindrical cartridge through an open end of the media and then turns to exit through a side of the cylindrical filter media. An example of such a reverse-flow system is shown in U.S. Pat. No. 5,613,992, incorporated by reference herein.

The term "z-filter media construction" and variants thereof as used herein, without more, is meant to include, but not necessarily be limited to, any or all of: a web of corrugated or otherwise fluted media (media having media ridges) secured to (facing) media, whether the sheets are separate or part of a single web, with appropriate sealing (closure) to allow for definition of inlet and outlet flutes; and/or a media pack constructed or formed from such media into a three dimensional network of inlet and outlet flutes; and/or, a filter element, especially the filter cartridge or construction including such a media pack.

In an example of media useable in z-filter media the media is formed from a corrugated (fluted) sheet and a facing sheet.

In general, the corrugated sheet is of a type generally characterized herein as having a regular, curved, wave pattern of flutes or corrugations. The term "wave pattern" in this context, is meant to refer to a flute or corrugated pattern of alternating troughs and ridges. The term "regular" in this context is meant to refer to the fact that the pairs of troughs and ridges alternate with generally the same repeating corrugation (or flute) shape and size. (Also, typically in a regular configuration each trough is substantially an inverse of each ridge.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet is flexible. With respect to the characterization of a repeating pattern, it is not meant that in any given filter construction, an equal number of ridges and troughs is necessarily present. The media could be terminated, for example, between a pair comprising a ridge and a trough, or partially along a pair comprising a ridge and a trough. Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex of each ridge and the bottom of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern, for the corrugated sheet, is that at approximately a midpoint between each trough and each adjacent ridge, along most of the length of the flutes, is located a transition region where the curvature inverts. For example, viewing back side or face, trough is a concave region, and ridge is a convex region. (In some instances, the region can be a straight segment, instead of a point, with curvature inverting at ends of the straight segment.)

A characteristic of the particular regular, curved, wave pattern corrugated sheet is that the individual corrugations are generally straight. By "straight" in this context, it is meant that through at least 70% (typically at least 80%) of the length between edges, the ridges and troughs do not change substantially in cross-section. The term "straight" in reference to corrugation pattern in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Z-filter constructions which do not utilize straight, regular curved wave pattern corrugation (flute) shapes are known. For example in Yamada et al. 5 U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation can be caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet, facing sheet or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

In the corrugated cardboard industry, various standard flutes have been defined. For example the standard E flute, standard X flute, standard B flute, standard C flute and standard A flute. FIG. 47, attached, in combination with Table A below provides definitions of these flutes.

Donaldson Company, Inc., (DCI) has used variations of the standard A and standard B flutes, in a variety of z-filter arrangements. These flutes are also defined in Table A and FIG. 47.

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and published as US 2009/0127211; U.S. Ser. No. 12/012,785, filed Feb. 4, 2008 and published as US 2008/0282890; and/or U.S. Ser. No. 12/537,069 published as US 2010/0032365 can be used, with air cleaner features as characterized herein below. The complete disclosures of each of US 2009/0127211, US 2008/0282890 and US 2010/0032365 are incorporated herein by reference.

Another media variation comprising fluted media with facing media secured thereto, can be used in arrangements according to the present disclosure, in either a stacked or coiled form, is described in US 2014/0208705 A1, owned by Baldwin Filters, Inc., published Jul. 31, 2014, and incorporated herein by reference.

Techniques described herein are particularly well adapted for use in media packs that result from a step of coiling a single sheet comprising a corrugated sheet/facing sheet combination, i.e., a "single facer" strip. However, they can also be made into stacked arrangements.

Coiled media or media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media or media pack. Typical shapes are circular as described in PCT WO 04/007054. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054, and PCT application US 04/07927, published as WO 04/082795, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media or media pack can be provided with a variety of different definitions. In many arrangements, the ends or end faces are generally flat (planer) and perpendicular to one another. In other arrangements, one or both of the end faces include tapered, for example, stepped, portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Many of the techniques characterized herein will preferably be applied when the media is oriented for filtering between opposite flow ends of the cartridge is media having flutes or pleat tips that extend in a direction between those opposite ends. However, alternatives are possible. The techniques characterized herein with respect to seal arrangement definition can be applied in filter element, especially the filter cartridges that have opposite flow ends, with media positioned to filter fluid flow between those ends, even when the media does not include flutes or pleat tips extending in a direction between those ends. The media, for example, can be depth media, can be pleated in an alternate direction, or it can be a non-pleated material.

It is indeed the case, however, that the techniques characterized herein are particularly advantageous for use with cartridges that are relatively deep in extension between flow ends, usually at least 100 mm, typically at least 150 mm, often at least 200 mm, sometimes at least 250 mm, and in some instances 300 mm or more, and are configured for large loading volume during use. These types of systems will typically be ones in which the media is configured with pleat tips or flutes extending in a direction between opposite flow ends.

It is also noted that while the techniques described herein were typically developed for advantageous application and arrangements involving media packs with straight through flow configurations, the techniques can be applied to advantage in other systems. For example, the techniques can be applied when the cartridge comprises media surrounding a central interior, in which the cartridge has an open end. Such arrangements can involve "forward flow" in which air to be filtered enters the central open interior by passage through the media, and the exits through the open end; or, with reverse flow in which air to be filtered enters the open end and then turns and passes through the media. A variety of such arrangements are possible, including pleated media and alternate types of media. Configurations usable would include cylindrical and conical, among others.

It is noted that there is no specific requirement that the same media be used for the fluted sheet section and the facing sheet section. A different media can be desirable in each, to obtain different effects. For example, one may be a cellulose media, while the other is a media containing some non-cellulose fiber. They may be provided with different porosity or different structural characteristics, to achieve desired results.

A variety of materials can be used. For example, the fluted sheet section or the facing sheet section can include a cellulose material, synthetic material, or a mixture thereof. In some embodiments, one of the fluted sheet section and the facing sheet section includes a cellulose material and the other of the fluted sheet section and facing sheet section includes a synthetic material.

Synthetic material(s) can include polymeric fibers, such as polyolefin, polyamide, polyester, polyvinyl chloride, polyvinyl alcohol (of various degrees of hydrolysis), and polyvinyl acetate fibers. Suitable synthetic fibers include, for example, polyethylene terephthalate, polyethylene, polypropylene, nylon, and rayon fibers. Other suitable synthetic fibers include those made from thermoplastic polymers, cellulosic and other fibers coated with thermoplastic polymers, and multi-component fibers in which at least one of the components includes a thermoplastic polymer. Single and multi-component fibers can be manufactured from polyester, polyethylene, polypropylene, and other conventional thermoplastic fibrous materials.

The filter arrangement according to the disclosure has a filter housing and a filter element according to the disclosure, which is arranged inside the filter housing.

The housing of the filter arrangement according to the disclosure in a preferred embodiment has a chamber, the chamber having a top end and a bottom end, wherein the filter element is arranged in the chamber and wherein the top face of the filter pack is arranged closer to the top and of the bottom. The bottom face of the filter pack is arranged closer to the bottom end and of the housing. The housing has a fluid inlet and a fluid outlet.

In a preferred embodiment, a fluid connection is arranged between the fluid inlet and the opening of the through-channel at the bottom face. In a preferred embodiment, sealings are arranged in such a way, that the fluid entering into the housing through the fluid inlet can only flow into the opening of the through-channel at the bottom face and can only flow through the through-channel. In such an embodiment, the fluid entering into the housing would first be made to flow through the through-channel. In this embodiment, means would be provided to reverse the flow of the fluid, once the fluid leaves the through-channel at the opening of the through-channel at the top face. The reversing of the fluid would make the fluid enter the filter pack through the top face. In a preferred embodiment, a further fluid connection would be provided that picks up the fluid that leaves the filter pack at the bottom face and guides the fluid to the fluid outlet without allowing the cleaned fluid to intermingle with the fluid that has entered through the fluid inlet. Such a fluid connection can be a collection chamber.

In a preferred embodiment, a fluid connection is arranged between the fluid inlet and the opening of the through-channel at the top face. In a preferred embodiment, sealings are arranged in such a way, that the fluid entering into the housing through the fluid inlet can only flow into the opening of the through-channel at the top face and can only flow through the through-channel. In such an embodiment, the fluid entering into the housing would first be made to flow through the through-channel. In this embodiment, means would be provided to reverse the flow of the fluid, once the fluid leaves the through-channel at the opening of the through-channel at the bottom face. The reversing of the fluid would make the fluid enter the filter pack through the bottom face. In a preferred embodiment, a further fluid connection would be provided that picks up the fluid that leaves the filter pack at the top face and guides the fluid to the fluid outlet without allowing the cleaned fluid to intermingle with the fluid that has entered through the fluid inlet.

In a preferred embodiment, a fluid connection is arranged between the fluid inlet and the bottom face of the filter pack. In a preferred embodiment, sealings are arranged in such a way, that the fluid entering into the housing through the fluid inlet can only flow into filter pack at the bottom face of the filter pack and can only flow through the filter pack, but does not enter the through-channel. In such an embodiment, the fluid entering into the housing would first be made to flow through the filter pack. In this embodiment, means would be provided to reverse the flow of the fluid, once the fluid leaves the filter pack at the top face. The reversing of the fluid would make the fluid enter the through channel through its opening at the top face. In a preferred embodiment, a further fluid connection would be provided that picks up the fluid that leaves the through-channel at the bottom face and guides the fluid to the fluid outlet without allowing the cleaned fluid to intermingle with the fluid that has entered through the fluid inlet.

In a preferred embodiment, a fluid connection is arranged between the fluid inlet and the top face of the filter pack. In a preferred embodiment, sealings are arranged in such a way, that the fluid entering into the housing through the fluid inlet can only flow into filter pack at the top face of the filter pack and can only flow through the filter pack, but does not enter the through-channel. In such an embodiment, the fluid entering into the housing would first be made to flow through the filter pack. In this embodiment, means would be provided to reverse the flow of the fluid, once the fluid leaves the filter pack at the bottom face. The reversing of the fluid would make the fluid enter the through channel through its opening at the bottom face. In a preferred embodiment, a further fluid connection would be provided that picks up the fluid that leaves the through-channel at the top face and guides the fluid to the fluid outlet without allowing the cleaned fluid to intermingle with the fluid that has entered through the fluid inlet.

In a preferred embodiment, the top end of the chamber has the form of a dissector torus.

The top end of the chamber can have the shape of a torus that has been cut in half, for example cut along a plane that is perpendicular to the rotational axis of the torus. In a preferred embodiment, the torus is chosen such that the centre hole of the torus is closed.

In a preferred embodiment, the housing can be opened. Opening the housing can allow for the filter element to be exchanged. The housing in a preferred embodiment can have a base element and can have a top element that is attached to the base element in a way that allows the top element to be separated from the base element in order to open the housing. Such an attachment can, for example be a screw connection or can be a bayonet connection. The parting line between the bottom part of the housing and the top part of the housing can be below the bottom face of the filter pack. The bottom part of the housing can, for example be a solid part, while the top part of the housing is a lightweight, dome-shaped part. If in such an embodiment, the top part is decoupled from the bottom part and set aside, the filter element arranged inside the housing could be accessed from all sides apart from those faces that are necessary to rest the filter element on the bottom part or elements of the bottom part that are sticking upwards from the bottom part. The parting line could also be anywhere between the bottom face and the top face of the filter pack. For example, the housing could have two halves of almost equal length. The parting line could also be above the top face of the filter pack. In such an embodiment, the top part would be more like a lid, while the bottom part would be more like a cylindrical element. If the filter element was to be exchanged in such an embodiment, the filter element would most preferably pulled out of the cylindrical shaped bottom part upwards through the opening that has been made available by detaching the lid-shaped upper part of the housing. Detachment can be provided by way of latches, clamps, twist locks or any other possible means.

In a preferred embodiment, parts of the housing are fixedly attached to the filter pack. As described above, the filter pack can have a cap that is attached to the filter pack. Such a cap could be used as the top part of the housing.

In a preferred embodiment, the filter element is arranged inside the housing in a way that allows the filter element to be exchanged. In a preferred embodiment, the housing and the filter element s have protruding and recessing elements that influence the positioning of the filter element inside the housing. Such elements can be used to ensure that the filter element is arranged inside the housing in a specific manner.

In a preferred embodiment, the element that interacts with the flow of fluid through the through-channel that is arranged inside the element according to the first embodiment of the filter element according to the disclosure is not attached to the filter element or only attached to the filter element in a manner that can be loosened, but is attached to a part of the housing, preferably also in a manner that can be loosened. Such a design allows for the element that interacts with the flow of fluid through the through-channel to stay with the housing, if an exchangeable filter pack is removed from the housing.

For example, the element could be attached to the bottom part of the housing by way of rods or supporting studs. The filter pack in such an embodiment could be pulled away from the bottom part of the housing, leaving the element that interacts with flow of fluid through the through-channel staying behind with the bottom part. A new filter pack would then be set over the element such that this element that interacts with the flow of fluid through the through-channel would be arranged inside the through-channel of the new filter pack.

In a preferred embodiment, the housing has an inlet, whereby the inlet is a tube or an opening. In a preferred embodiment, the inlet can be an opening that is closed by a mash. In a preferred embodiment, the housing is perforated in an area, the perforated area providing the inlet.

In a preferred embodiment, the housing has an outlet, whereby the outlet is a tube or an opening. In a preferred embodiment, the outlet can be an opening that is closed by a mash. In a preferred embodiment, the housing is perforated in an area, the perforated area providing the outlet.

In a preferred embodiment, the inlet and the outlet are arranged on the same side of a plane that includes the top face of the filter pack. In a preferred embodiment, the inlet and the outlet are arranged on the same side of a plane that is perpendicular to the longitudinal axis of the filter pack and is arranged in the middle between the top face and the bottom face of the filter pack. In a preferred embodiment, the inlet and the outlet of the housing are arranged at the same side of the housing.

The method for filtering a fluid according to the disclosure makes use of a filter element according to the disclosure or a filter arrangement according to the disclosure. According to a first alternative of the method, the fluid to be filtered first flows through the through-channel from the opening arranged at the bottom face to the opening at the top face and then enters into the first channels of the group of first channels. According to a second alternative of the method, the fluid to be filtered first flows through the through-channel from the opening arranged at the top face to the opening at the bottom face and then enters into the second channels of the group of second channels. According to a third alternative of the method, the fluid to be filtered first enters into the second channels of the group of second channels at the bottom face and flows out of the first channels of the group of first channels at the top face and then enters into the through-channel from the opening arranged at the top face and flows through the through-channel to the opening at the bottom face. According to a fourth alternative of the method, the fluid to be filtered first enters into the first channels of the group of first channels at the top face and flows out of the second channels of the group of second channels at the bottom face and then enters into the through-channel from the opening arranged at the bottom face and flows through the through-channel to the opening at the top face.

In a preferred embodiment, the filter element according to the disclosure and the filter arrangement according to the disclosure are used for filtering a fluid that is a gas. Preferably they are used for filtering air. Preferably they are used to filter a gas, preferably air, that carries particles and/or droplets and are used to filter out some of the particles and/or droplets.

The method according to the disclosure producing a filter arrangement is characterized by introducing a filter element according to the disclosure into the housing of a filter arrangement as well as closing the housing. In particular the filter element according to the disclosure has the advantage that in comparison with conventional filter element s it allows for easy handling of any element that is to be provided to interact with the flow of fluid. The advantages of the disclosure are put into practice each time such a filter element according to the disclosure is used in the manufacturing of a filter arrangement according to the disclosure The method according to the disclosure for producing a filter element according to the disclosure makes use of a tube that is to form the through-channel and uses this tube to wind the filter element around this tube. This facilitates the production of the filter element.

BRIEF DESCRIPTION OF THE DRAWINGS

The disclosure will be described below with the aid of only one drawing showing one example of embodiment of the disclosure in more detail. In this:

FIG. 20 shows schematic view of a cross-section through a further embodiment of a filter arrangement according to the disclosure;

FIG. 21 shows a schematic view of a cross-section through the filter arrangement of FIG. 20 in an open state;

FIG. 22 shows a schematic view of a cross-section through the filter arrangement of FIG. 20 in a different open state;

FIG. 23 shows a schematic view of a cross-section through the filter arrangement of FIG. 20 in a different open state;

FIG. 24 shows a schematic side view on a further embodiment of a filter arrangement according to the disclosure in an exploded view;

FIG. 25 shows a schematic front view on the filter arrangement of FIG. 24 in an exploded view;

FIG. 26 shows a schematic side view of a cross section of the filter arrangement of FIG. 24 in an exploded view;

FIG. 39 shows a schematic side view of the filter arrangement of FIG. 37;

FIG. 40 shows a schematic side view of the filter arrangement of FIG. 37 in cross section;

FIG. 41 shows a perspective view of the filter arrangement of FIG. 37;

FIG. 60 is a schematic depiction of another usable fluted sheet/facing sheet combination in accord with the present disclosure;

FIG. 61 is a perspective view of a portion of the usable fluted sheet/facing sheet combination depicted in FIG. 60;

DETAILED DESCRIPTION

Figure 1:
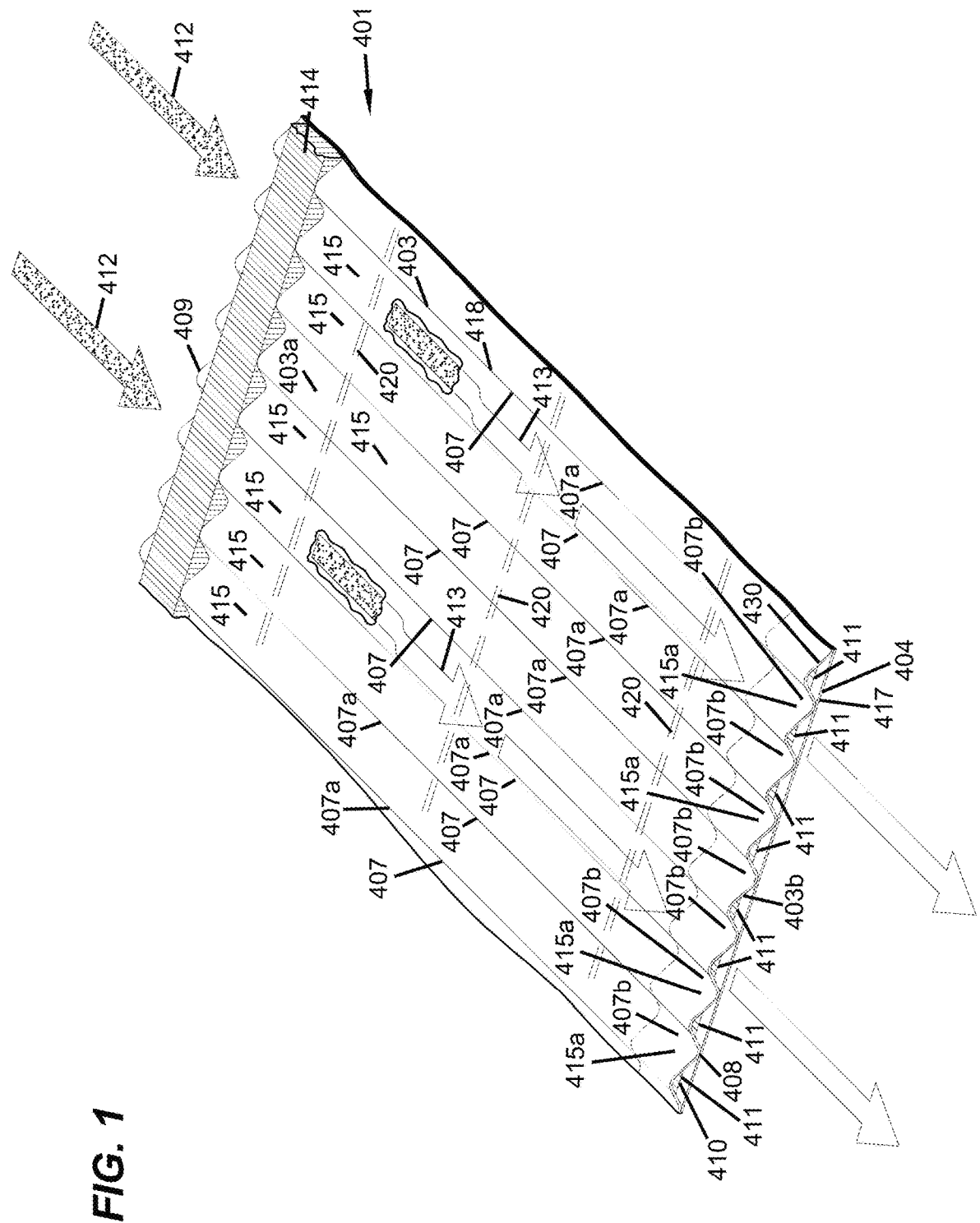
FIG. 1 is a schematic, perspective view of filter media used to produce a filter element according to the invention.

In FIG. 1, an example of media 401 useable in z-filter media is shown. The media 401 is formed from a corrugated (fluted) sheet 403 and a facing sheet 404.

In general, the corrugated sheet 403, FIG. 1, is of a type generally characterized herein as having a regular, curved, wave pattern of flutes or corrugations 407. The term "wave pattern" in this context, is meant to refer to a flute or corrugated pattern of alternating troughs 407b and ridges 407a. The term "regular" in this context is meant to refer to the fact that the pairs of troughs and ridges (407b, 407a) alternate with generally the same repeating corrugation (or flute) shape and size. (Also, typically in a regular configuration each trough 407b is substantially an inverse of each ridge 407a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 403 is flexible. With respect to the characterization of a repeating pattern, it is not meant that in any given filter construction, an equal number of ridges and troughs is necessarily present. The media 401 could be terminated, for example, between a pair comprising a ridge and a trough, or partially along a pair comprising a ridge and a trough. (For example, in FIG. 1 the media 401 depicted in fragmentary has eight complete ridges 407a and seven complete troughs 407b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 407a of each ridge and the bottom 407b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 1, for the corrugated sheet 403, is that at approximately a midpoint 430 between each trough and each adjacent ridge, along most of the length of the flutes 407, is located a transition region where the curvature inverts. For example, viewing back side or face 403a, FIG. 1, trough 407b is a concave region, and ridge 407a is a convex region. Of course when viewed toward front side or face 403b, trough 407b of side 403a forms a ridge; and, ridge 407a of face 403a, forms a trough. (In some instances, region 430 can be a straight segment, instead of a point, with curvature inverting at ends of the straight segment 430.)

A characteristic of the particular regular, curved, wave pattern corrugated sheet 403 shown in FIG. 1, is that the individual corrugations are generally straight. By "straight" in this context, it is meant that through at least 70% (typically at least 80%) of the length between edges 408 and 409, the ridges 407a and troughs 407b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 401 has first and second opposite edges 408 and 409. When the media 401 is coiled and formed into a media pack, in general edge 409 will form an inlet end for the media pack and edge 408 an outlet end, although an opposite orientation is possible as discussed below with respect to FIG. 24.

Adjacent edge 408 the sheets 403, 404 are sealed to one another, for example by sealant, in this instance in the form of a sealant bead 410, sealing the corrugated (fluted) sheet 403 and the facing sheet 404 together. Bead 410 will sometimes be referred to as a "single facer" bead, when it is applied as a bead between the corrugated sheet 403 and facing sheet 404, to form the single facer or media strip 401. Sealant bead 410 seals closed individual flutes 411 adjacent edge 408, to passage of air therefrom.

Adjacent edge 409, is provided sealant, in this instance in the form of a seal bead 414. Seal bead 414 generally closes flutes 415 to passage of unfiltered fluid therein, adjacent edge 409. Bead 414 would typically be applied as the media 401 is coiled about itself, with the corrugated sheet 403 directed to the inside. Thus, bead 414 will form a seal between a back side 417 of facing sheet 404, and side 418 of the corrugated sheet 403. The bead 414 will sometimes be referred to as a "winding bead" when it is applied as the strip 401 is coiled into a coiled media pack. If the media 401 were cut in strips and stacked, instead of coiled, bead 414 would be a "stacking bead."

In some applications, the corrugated sheet 403 is also tacked to the facing sheet 404 at various points along the flute length, as shown at lines 420.

Referring to FIG. 1, once the media 401 is incorporated into a media pack, for example by coiling or stacking, it can be operated as follows. First, air in the direction of arrows 412, would enter open flutes 411 adjacent end 409. Due to the closure at end 408, by bead 410, the air would pass through the media shown by arrows 413. It could then exit the media pack, by passage through open ends 415a of the flutes 415, adjacent end 408 of the media pack. Of course operation could be conducted with air flow in the opposite direction, as discussed for example with respect to FIG. 24. The point being that in typical air filter applications, at one end or face of the media pack unfiltered air flow goes in, and at an opposite end or face the filtered air flow goes out, with no unfiltered air flow through the pack or between the faces.

For the particular arrangement shown herein in FIG. 1, the parallel corrugations 407a, 407b are generally straight completely across the media, from edge 408 to edge 409. Straight flutes or corrugations can be deformed or folded at selected locations, especially at ends. Modifications at flute ends for closure are generally disregarded in the above definitions of "regular," "curved" and "wave pattern."

Figure 2:
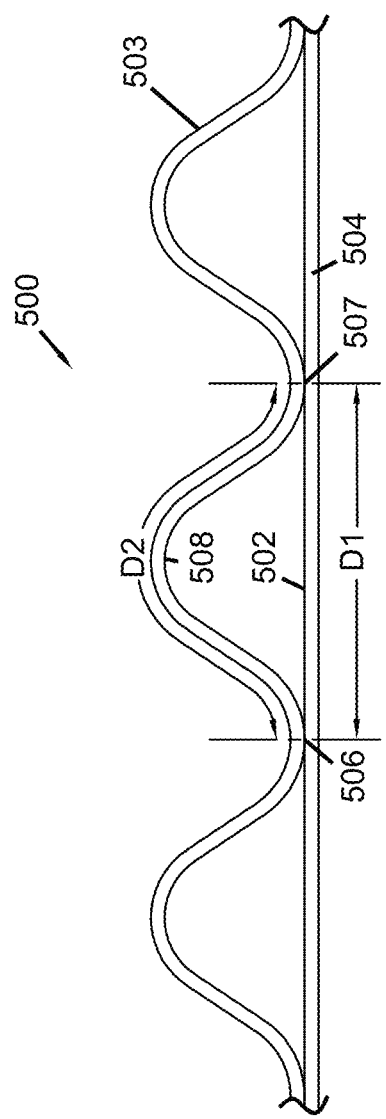
FIG. 2 is an enlarged, schematic, cross-sectional view of a portion of the media type depicted in FIG. 1.

Attention is now directed to FIG. 2, in which z-filter media; i.e., a z-filter media construction 500, utilizing a regular, curved, wave pattern corrugated sheet 503, and a non-corrugated flat sheet 504, i.e., a single facer strip is schematically depicted. The distance D1, between points 506 and 507, defines the extension of flat media 504 in region 502 underneath a given corrugated flute 508. The length D2 of the arcuate media for the corrugated flute 508, over the same distance D1 is of course larger than D1, due to the shape of the corrugated flute 508. For a typical regular shaped media used in fluted filter applications, the linear length D2 of the media 508 between points 506 and 507 will often be at least 1.2 times D1. Typically, D2 would be within a range of 1.2-2.0 times D1, inclusive. One particularly convenient arrangement for air filters has a configuration in which D2 is about 1.25-1.35×D1. Such media has, for example, been used commercially in Donaldson Powercore™ Z-filter arrangements. Another potentially convenient size would be one in which D2 is about 1.4-1.6 times D1. Herein the ratio D2/D1 will sometimes be characterized as the flute/flat ratio or media draw for the corrugated media.

Figure 3:
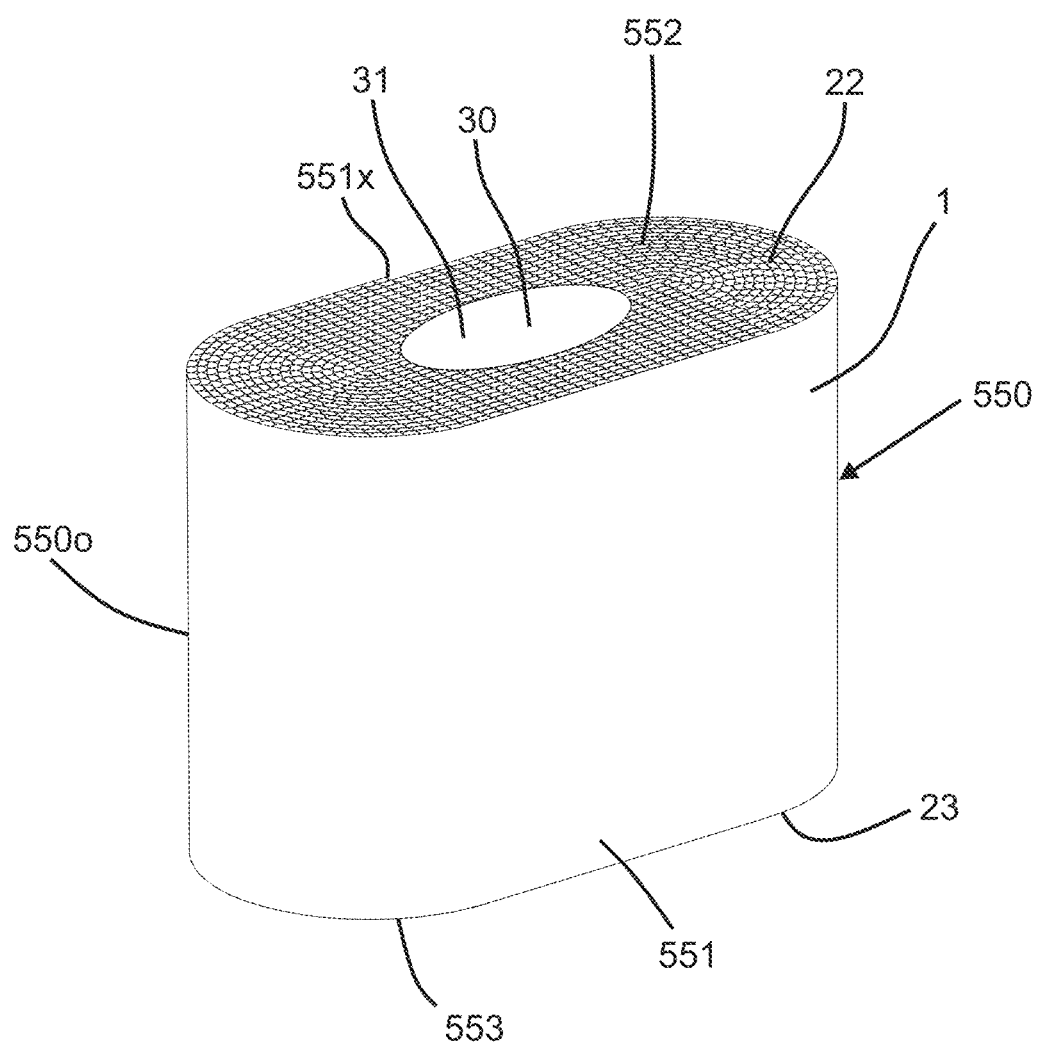
FIG. 3 is a schematic perspective view of a coiled filter arrangement (filter pack) usable in a filter cartridge having features in accord with the present disclosure, and made with a strip of media for example in accord with FIG. 1.

In FIG. 3, a coiled media pack (or coiled media) 550 constructed by coiling a single strip of single faced media is depicted, generally. The particular coiled media pack depicted is an oval media pack 550a, specifically a racetrack shaped media pack 551. The tail end of the media, at the outside of the media pack 550 is shown at 551x. It will be typical to terminate that tail end along straight section of the media pack 550 for convenience and sealing. Typically, a hot melt seal bead or seal bead is positioned along that tail end to ensure sealing. In the media pack 550, the opposite flow (end) faces are designated at 552, 553. One would be an inlet flow face, the other an outlet flow face.

A compact filter element (filter package) 1 of this type comprises a top face 22 towards which are directed the inlet openings of the first channels of the group of first channels.

Additionally, a filter package of this type comprises a bottom face 23 towards which the outlet openings of the second channels of the group of second channels open. FIG. 3 shows an opening 30 of a through-channel 31 at the top face 22. The through-channel 31 leads through the filter pack. The through-channel 31 also has an opening 32 at the bottom face 23.

Figure 4:
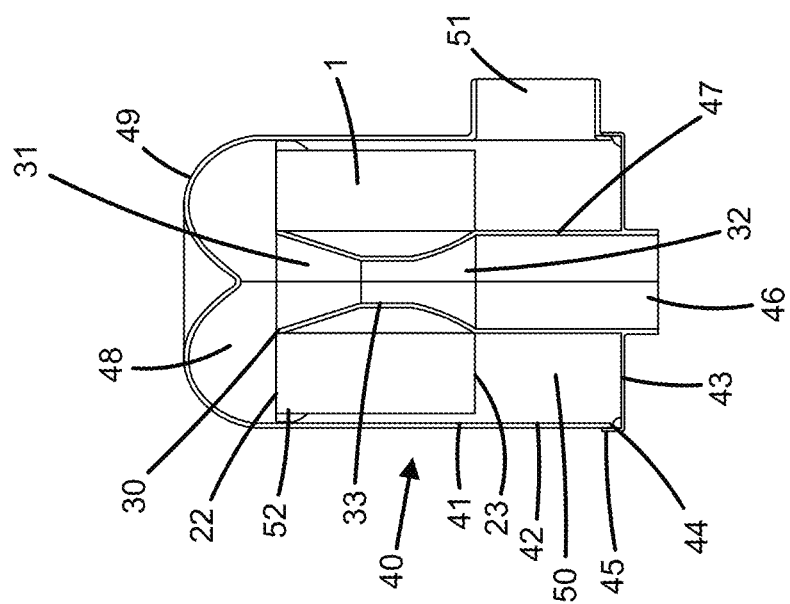
FIG. 4 shows schematic view of a cross-section through a filter arrangement according to the disclosure.

FIG. 4 shows a filter arrangement 40 according to the disclosure. The filter arrangement 40 has a housing 41. The housing 41 has a top part 42 and a bottom part 43. By way of threaded portions 44 and 45, the top part 42 can be screwed onto the bottom part 43 in a fluid-tight manner. A fluid inlet 46 is provided by an opening at the bottom of the bottom part 43. The fluid enters the filter arrangement 40 through this fluid inlet and by way of the tube-shaped fluid connection 47 is guided to the opening 32 of the through-channel 31 at the bottom face 23 of the filter element 1.

Inside the through-channel 31 an acoustic cone 33 is arranged as an element that interacts with a flow of fluid through the through-channel 31.

The fluid flows through the through-channel 31 from the opening 32 at the bottom face 23 to the opening 30 at the top face 22 and enters into the chamber 48. The top face 22 of the filter element 1 borders the chamber 48. The top 49 of the housing 41 has the shape of a torus that has been cut in half by being cut along a plane that is perpendicular to the rotational axis of the torus and which torus has the centre hole of the torus closed. This shape of the top 49 of the housing 41 helps the fluid that leaves the opening 30 of the through-channel 31 and that enters into the chamber 48 to be reversed in flow and to enter into the first channels of the group of first channels from the top face 22. The fluid flows through the first channels and enters into the second channels through the filter medium arranged between the first channels and the second channels and flows out of the second channels at the bottom face 23. A collection chamber 50 is arranged below the bottom face 23 that collects the fluid flowing out of the filter element 1 at the bottom face 23. The collection chamber 50 is connected to an outlet 51 of the filter arrangement 40.

A circumferential seal 52 is provided at the circumferential surface 53 of the filter element 1. The circumferential seal 52 prevents any flow of fluid to bypass the filter element 1 and prevents any fluid from flowing directly from the chamber 48 to the collection chamber 50. Furthermore an inner circumferential seal 54 is provided that seals the inside surface of the through-channel 30 against an outside wall of the acoustic cone 33.

As can be seen from FIG. 4, the acoustic cone 33 is arranged inside the through-channel 31, but is not attached to the filter element and only attached to the bottom part 43 of the filter housing 41. If the housing is opened, the top part 42 can be pulled away, exposing the filter element 1 (see FIG. 5). The filter pack can be pulled away from the acoustic cone 33 that stays in place. A replacement filter pack can be placed on the acoustic cone 33 and the housing can be closed.

Figure 5:
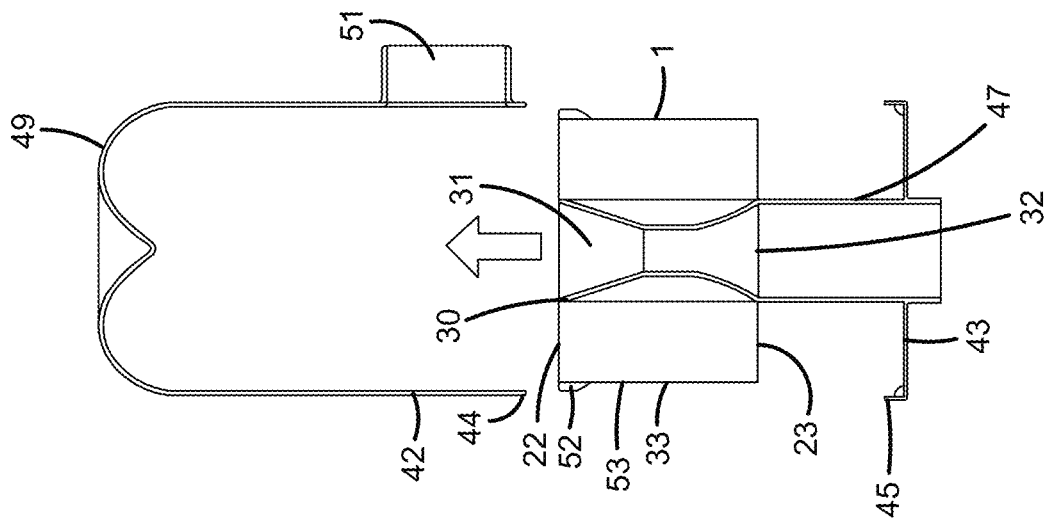
FIG. 5 shows a schematic view of a cross-section through the filter arrangement of FIG. 4 in an open state.
Figure 7:
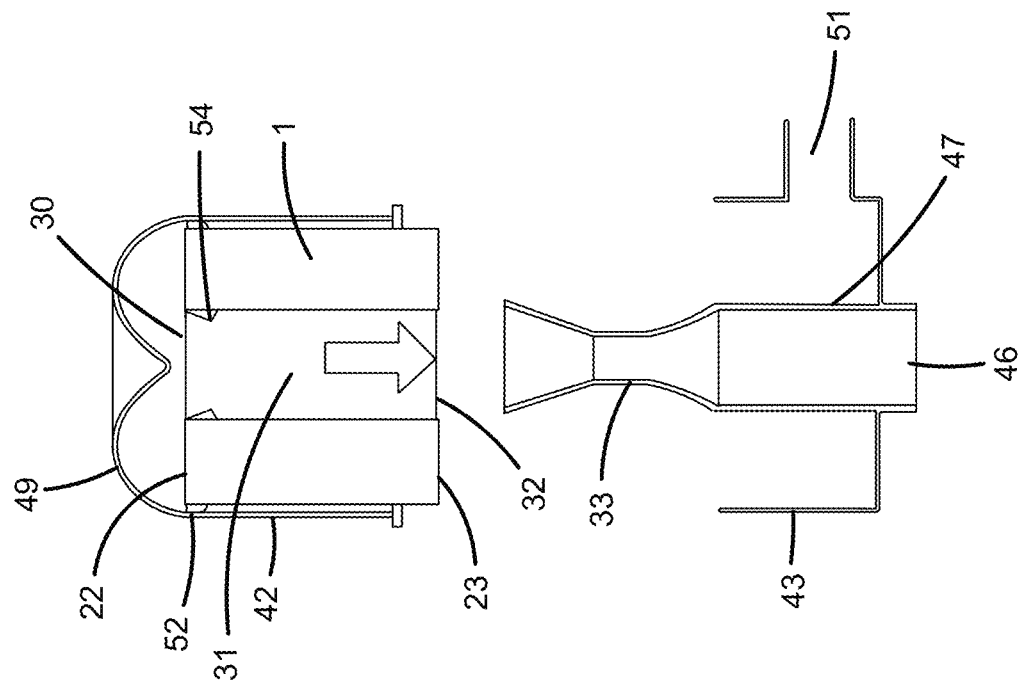
FIG. 7 shows a schematic view of a cross-section through the filter arrangement of FIG. 6 in an open state.
Figure 6:
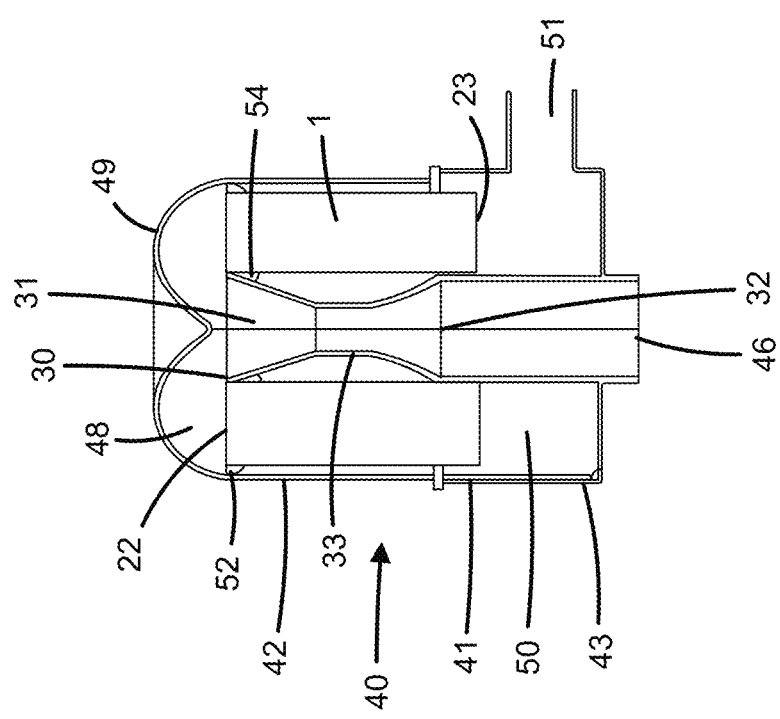
FIG. 6 shows schematic view of a cross-section through a further embodiment of a filter arrangement according to the disclosure.

The embodiment shown in FIGS. 6 and 7 only differs from the embodiment shown in FIGS. 4 and 5 in that the parting line between the top part 42 and the bottom part 43 of the housing 41 is higher in the embodiment in FIGS. 6 and 7 and in that the filter element 1 is attached to the top part 42 such that if the top part 42 is moved away from the bottom part 43, the filter pack is pulled away from the acoustic cone 33 that stays in place. A replacement filter pack can be placed on the acoustic cone 33 together with a new top part 42 of the housing.

Figure 9:
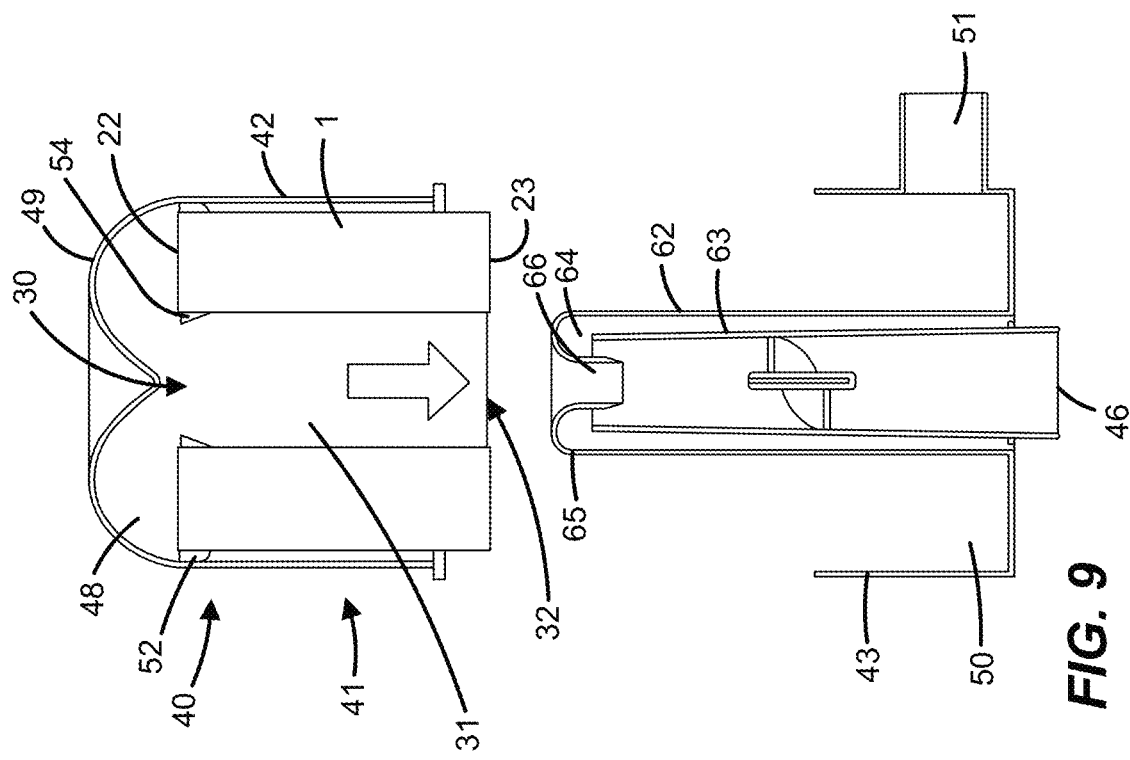
FIG. 9 shows a schematic view of a cross-section through the filter arrangement of FIG. 8 in an open state.
Figure 8:
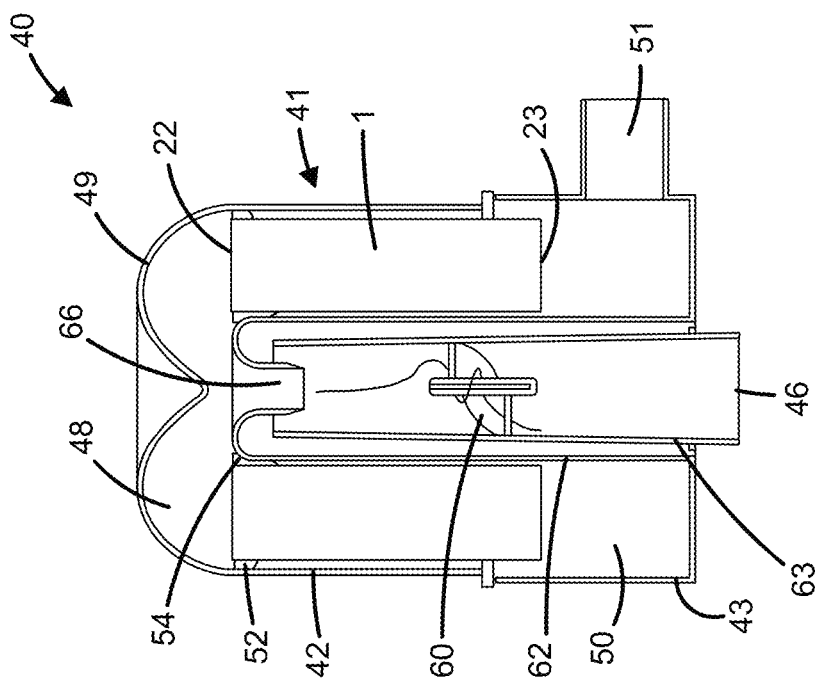
FIG. 8 shows schematic view of a cross-section through a further embodiment of a filter arrangement according to the disclosure.

The embodiment shown in FIGS. 8 and 9 differs from the embodiment shown in FIGS. 4, 5, 6 and 7 in that inside the through-channel 31 an element is arranged that interacts with the flow of fluid through the through-channel 31. This element consists of an outer tube 62, an inner tube 63 and a vane 60 arranged inside the inner tube 63. The bottom of the inner tube 63 forms the fluid inlet 46. The fluid to be filtered is entered into the filter arrangement 40 through fluid inlet 46. The top part of the inner tube 63 ends in a top chamber 64 formed by the outer wall 65 of the outer tube 62 being bend inwards as shown in FIGS. 8 and 9. The inner circumferential seal 54 seals against the outer wall 65. The vane 60 is of a helix shape and imparts a swirl-movement onto the fluid as the fluid flows through the vane 60 from the bottom to the top as indicated by the arrow 61 in FIG. 8. The swirl movement imparted to the fluid by the vane 60 leads to heavier particles moving towards the wall of the inner tube 63, while fluid that is not so laden with heavier particles flows as a central stream in the middle of inner tube 63. By way of the arrangement of the top part of the inner tube 63 ending in a top chamber 64 formed by the outer wall 65 of the outer tube 62 being bend inwards, the fluid flow that is laden with heavier particles can be diverted into the outer tube 62 and by way of the outer tube 62 can be led out of the housing 41 at the bottom part 43 of the housing 41. The fluid stream that is not so much laden with heavier particles flows through the central tube 66 formed by the outer wall 65 of the outer tube 62 being bend inwards and enters the chamber 48 to be then guided to enter into the filter pack via the fop face 22. The arrangement shown in FIGS. 8 and 9 can hence be used to pre-clean the fluid from heavier particles before the fluid enters into the filter pack. The bottom part of the outer wall 65 is attached to the bottom part 43 of the housing and hence helps to provide the collection chamber 50.

Figure 11:
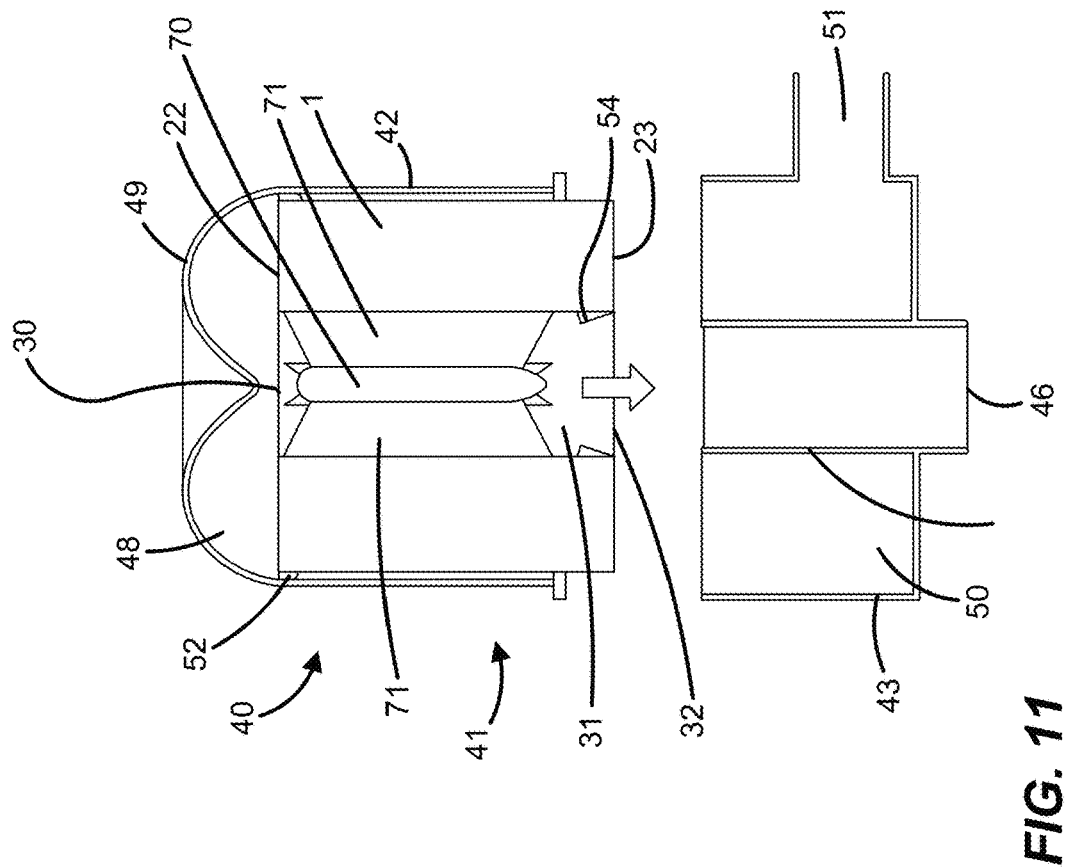
FIG. 11 shows a schematic view of a cross-section through the filter arrangement of FIG. 10 in an open state.
Figure 10:
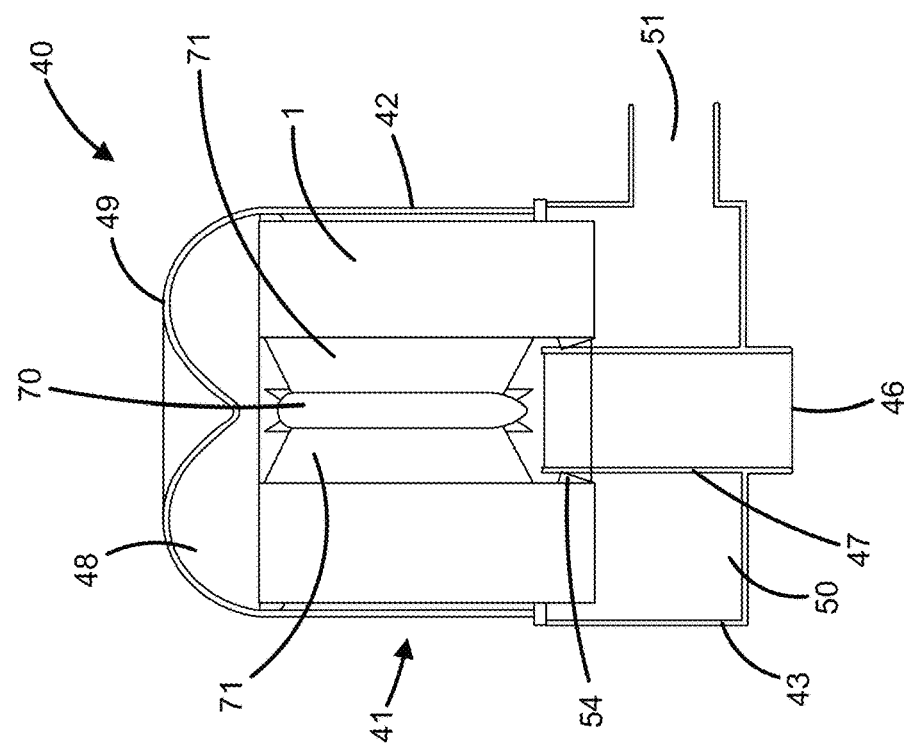
FIG. 10 shows schematic view of a cross-section through a further embodiment of a filter arrangement according to the disclosure.

The embodiment shown in FIGS. 10 and 11 differs from the embodiment shown in FIGS. 4, 5, 6 and 7 in that inside the through-channel 31 an element is arranged that interacts with the flow of fluid through the through-channel 31. This element consists of a weight 70. The weight 70 is connected to the sidewalls that delimit the through-channel 31 by way of radially facing support blades 71. The fluid can flow between the support blades 71 from bottom to top in the through-channel 31. The sealing 54 seals against the outer surface of the fluid connection 47.

Figure 14:
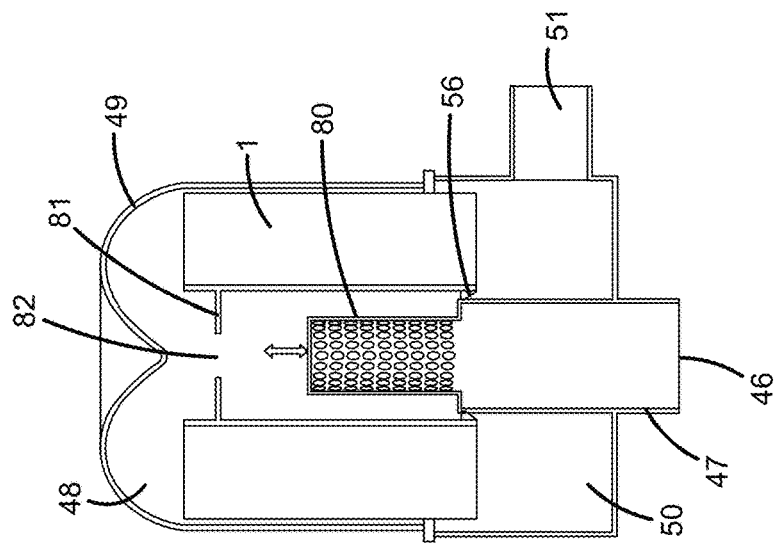
FIG. 14 shows schematic view of a cross-section through the filter arrangement of FIG. 12 indicating possible design changes to this filter.
Figure 13:
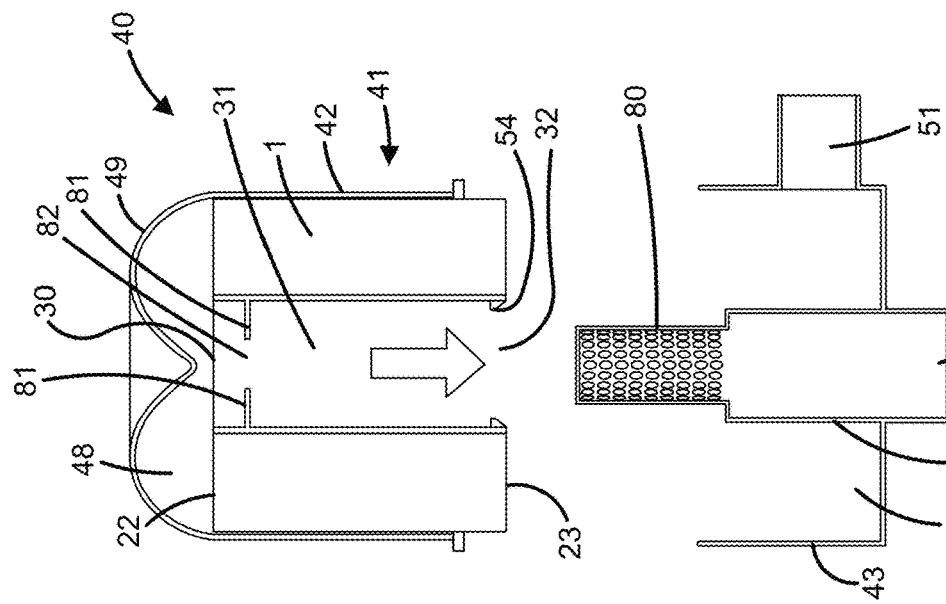
FIG. 13 shows a schematic view of a cross-section through the filter arrangement of FIG. 12 in an open state.
Figure 12:
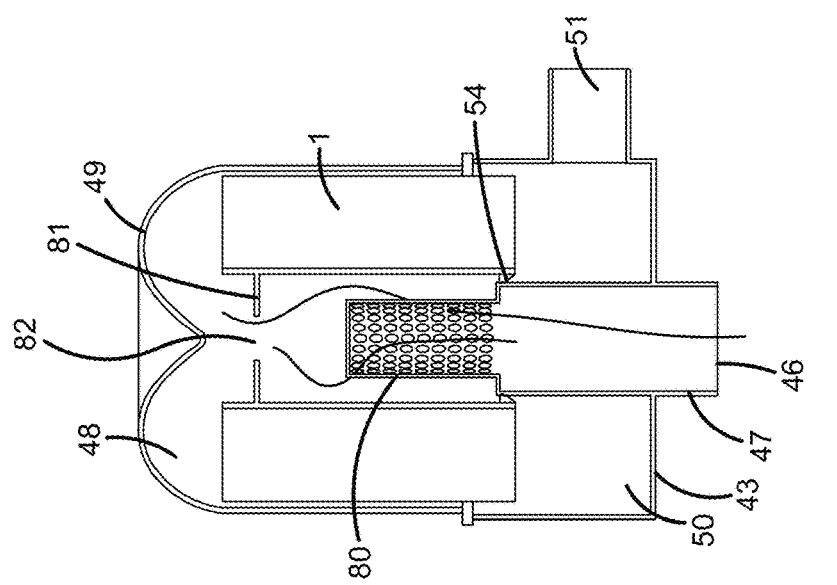
FIG. 12 shows schematic view of a cross-section through a further embodiment of a filter arrangement according to the disclosure.

The embodiment shown in FIGS. 12 to 14 differs from the embodiment shown in FIGS. 4, 5, 6 and 7 in that inside the through-channel 31 an element is arranged that interacts with the flow of fluid through the through-channel 31. This element consists of a distributor 80 and a baffle plate 81 with a central orifice 82. The distributor is arranged at the top of the fluid connection 47. The baffle plate 81 with the orifice 82 is attached to the sidewall of the through-channel 31. This embodiment shows that the element that is to interact with the flow of fluid can be made up of several elements, like the distributor 80 on the one hand and the baffle plate 81 on the other hand and that within the concept of the disclosure, these elements can be connected differently to parts of the filter, like the distributor 80 being connected to the fluid connection 47 and hence staying with the bottom part 43 of the housing 41 even during an exchange of the filter pack, while the baffle plate 81 is attached to the sidewall of the through-channel 31 and will hence be exchanged together with the filter pack. FIG. 14 is to indicate that for different embodiments of the distributor 80 can be designed and that depending on the desired effect, a taller distributor 80 or a shorted distributor 80 can be preferred.

Figure 16:
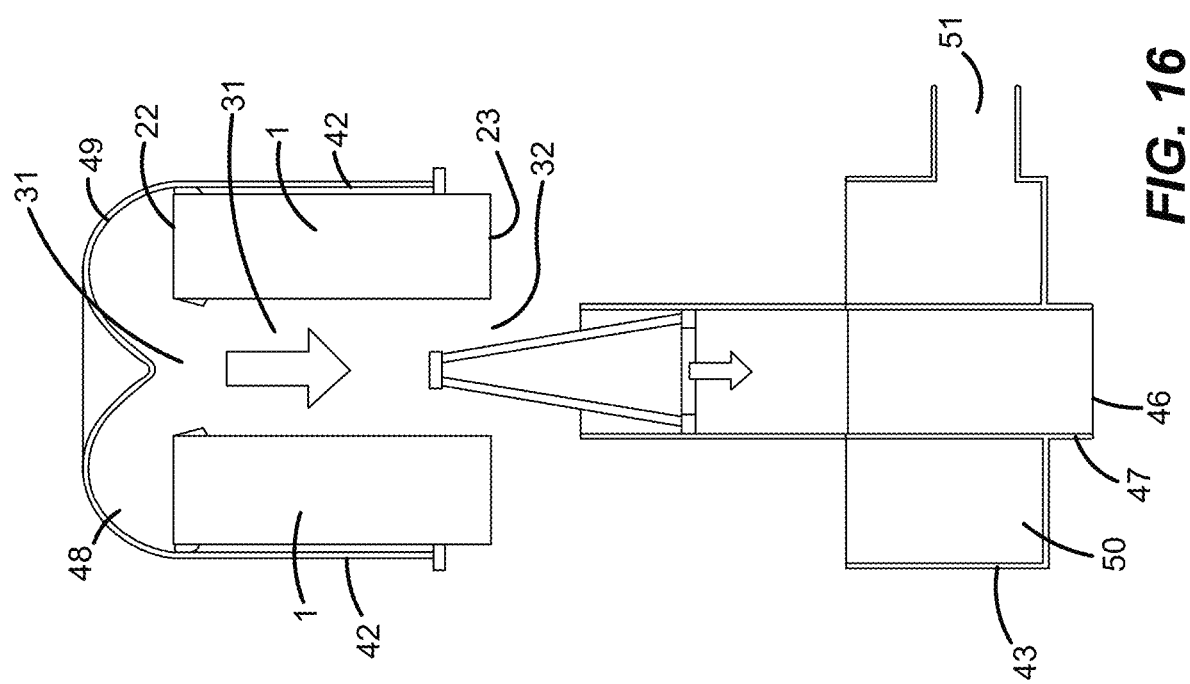
FIG. 16 shows a schematic view of a cross-section through the filter arrangement of FIG. 15 in an open state.
Figure 15:
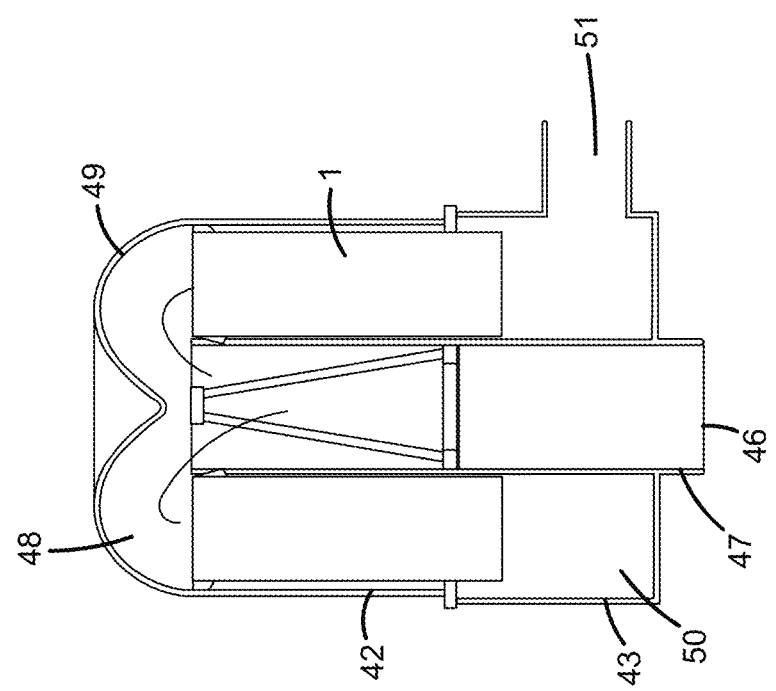
FIG. 15 shows schematic view of a cross-section through a further embodiment of a filter arrangement according to the disclosure.

The embodiment shown in FIGS. 15 and 16 differs from the embodiment shown in FIGS. 4, 5, 6 and 7 in that inside the through-channel 31 an element is arranged that interacts with the flow of fluid through the through-channel 31. The element is a filter medium 82, which can be used as a safety element. If for example the filter medium 82 arranged inside the through-channel 31 has finer pores than the filter medium 1, the filter medium 82 arranged inside the through-channel 31 will pick up particles or droplets of smaller diameter that passed through the filter medium 1 without being picked up by this filter medium 1. The filter medium 82 arranged inside the through-channel can hence be made to block very quickly, if particles or droplets of a certain size are not caught by the filter media 1.

The embodiment shown in FIGS. 17 to 19 and 42 to 46 differs from the embodiment shown in FIGS. 4 to 16 in that the flow of fluid through the filter arrangement is straight through, namely from a fluid inlet 90 arranged on the top part 42 of the housing 41 to a fluid outlet 91 arranged at the bottom part 43 of the housing 41. Also, inside the through-channel 31 an element is arranged that closes the flow of fluid through through-channel, while leaving a volume open inside the through-channel that is at least 10% of the volume that the through-channel would have without the element. The element is a support 93 for a sensor 92. The volume below the sensor 92 is open at the opening 32. Hence the sensor 92 can measure the differential pressure between the pressure of the fluid at the top face 22 and the pressure of the fluid at the bottom face 23 under the assumption that the pressure in the volume below the sensor 92 is the same as at the bottom face 23.

Figure 19:
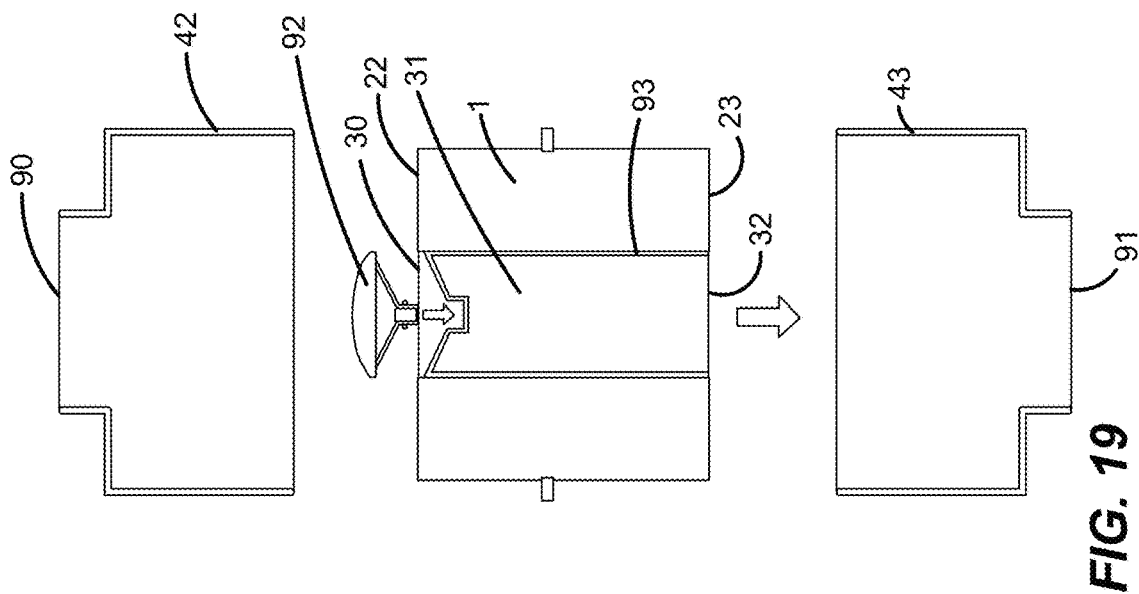
FIG. 19 shows a schematic view of a cross-section through the filter arrangement of FIG. 17 in a different open state.
Figure 18:
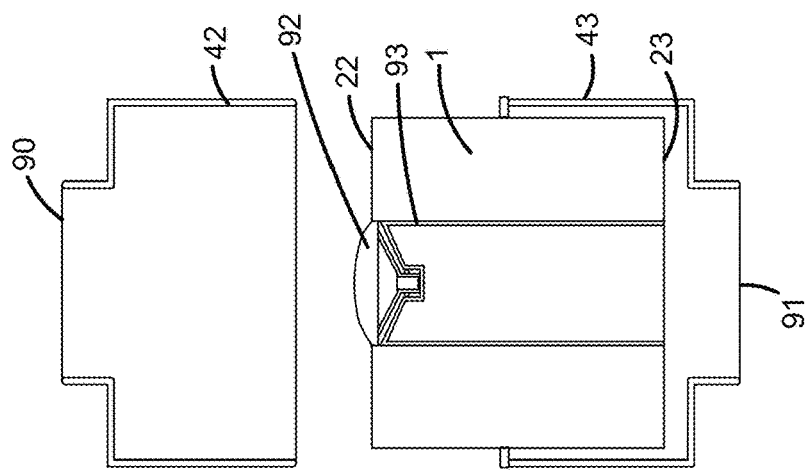
FIG. 18 shows a schematic view of a cross-section through the filter arrangement of FIG. 17 in an open state.
Figure 17:
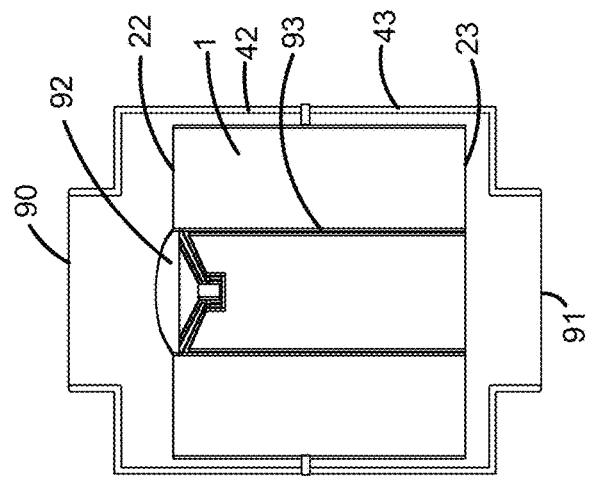
FIG. 17 shows schematic view of a cross-section through a further embodiment of a filter arrangement according to the disclosure.

Like the shown in FIGS. 17 and 19, the embodiment shown in FIGS. 20 to 23 differs from the embodiment shown in FIGS. 4 to 16 in that the flow of fluid through the filter arrangement is straight through, namely from a fluid inlet 90 arranged on the top part 42 of the housing 41 to a fluid outlet 91 arranged at the bottom part 43 of the housing 41. Also, inside the through-channel 31 an element is arranged that closes the flow of fluid through through-channel, while leaving a volume open inside the through-channel that is at least 10% of the volume that the through-channel would have without the element. This element is a handle 99. The handle 99 can be used to pull the filter pack out of the bottom part 43 of the housing 41 as shown in FIG. 23.

The embodiment of FIGS. 24 to 26 shows that a seal 55 can be used to seal the top part 42 of the housing against the bottom part 43 of the housing. This seal 55 can also use to block any fluid bypass between the outer circumferential surface of the filter pack and the inner wall of the top part 42 to enter into the bottom part 43. Hence seal 55 ensures that all fluid that enters into the collection chamber 50 flows through the filter pack and does not bypass the filter pack. A seal (not shown) seals the bottom of the fluid connection 47 that is inserted into the fluid inlet 46 against the inner wall of the fluid inlet 46 and hence prevents any bypass of fluid from the fluid inlet 46 into the collection chamber 50. The embodiment of FIGS. 24 to 26 shows the filter pack to be tightly arranged inside the top part 42 of the housing 41.

Figure 29:
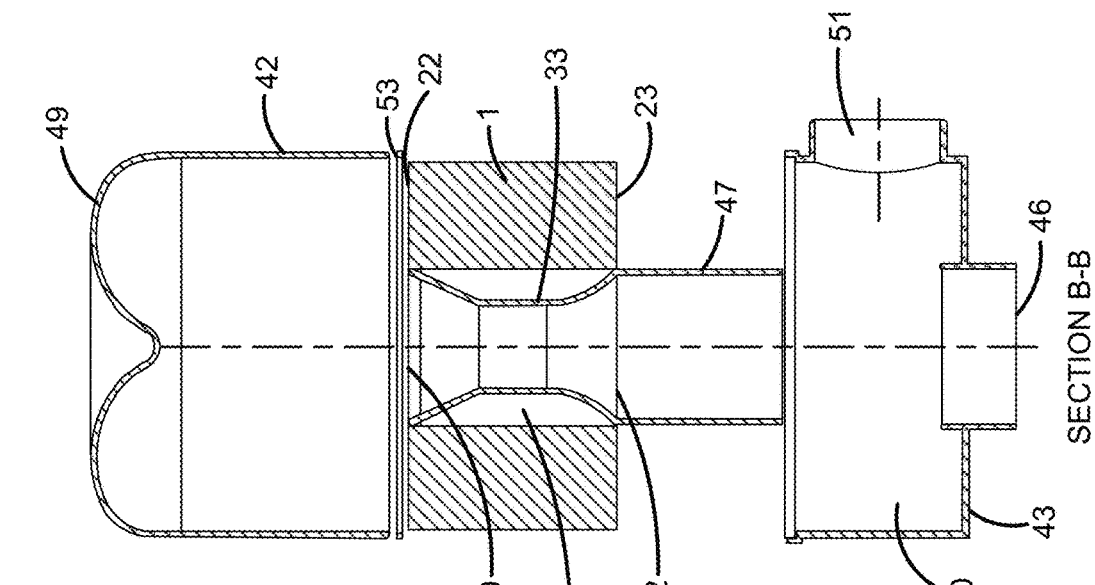
FIG. 29 shows a schematic side view of a cross section of the filter arrangement of FIG. 27 in an exploded view.
Figure 28:
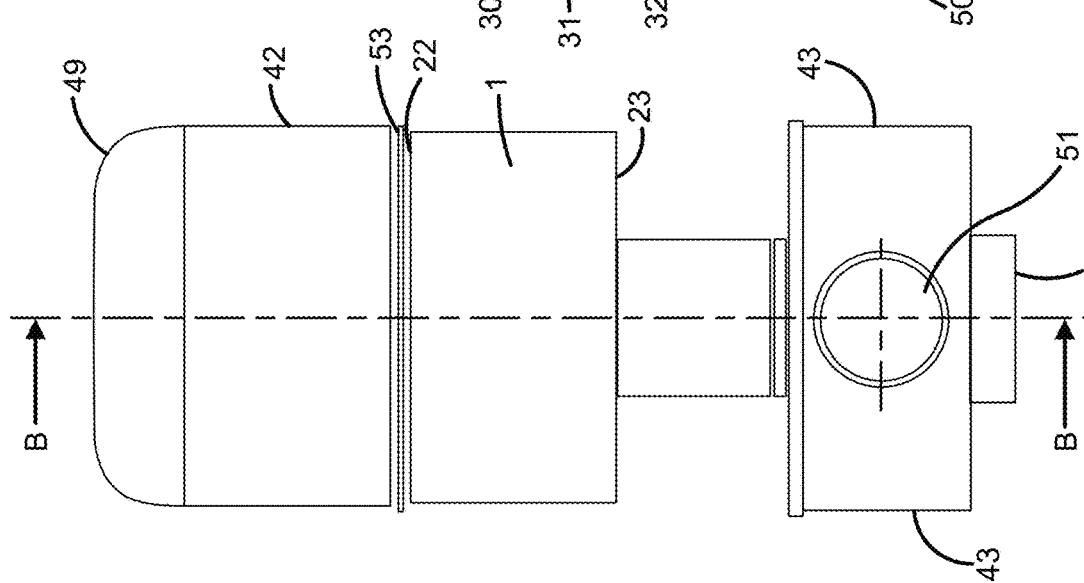
FIG. 28 shows a schematic front view on the filter arrangement of FIG. 27 in an exploded view.
Figure 27:
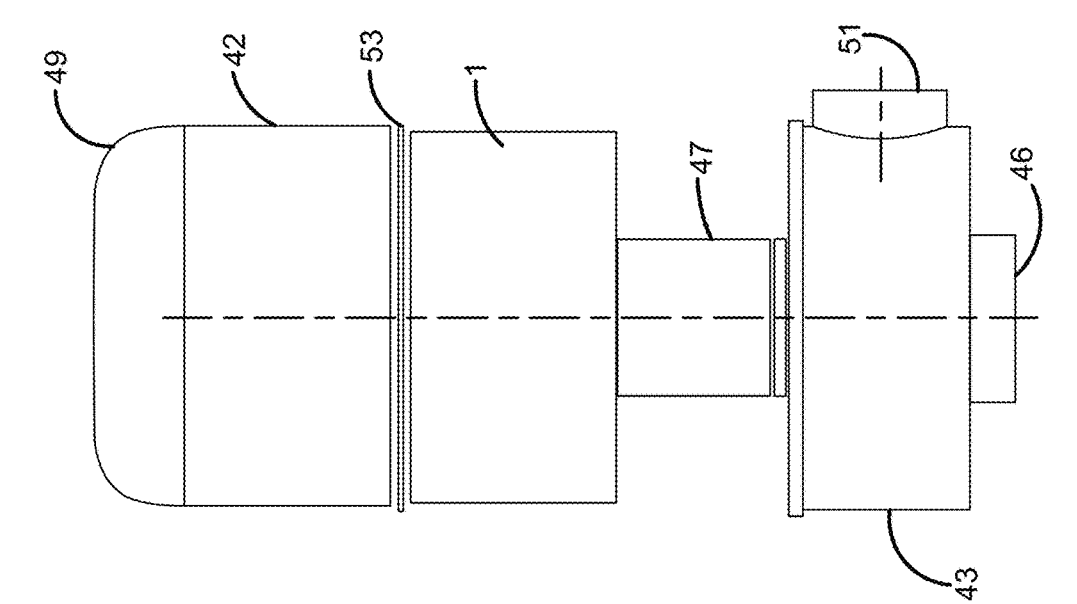
FIG. 27 shows a schematic side view on a further embodiment of a filter arrangement according to the disclosure in an exploded view.
Figure 32:
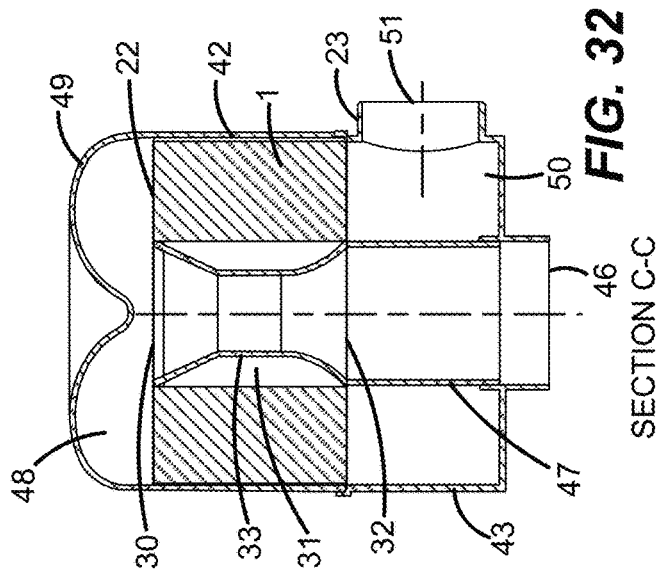
FIG. 32 shows a schematic side view of a cross section of the filter arrangement of FIG. 30.
Figure 31:
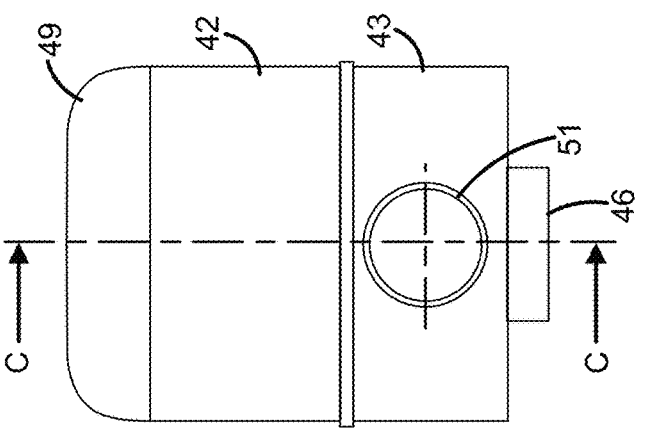
FIG. 31 shows a schematic front view on the filter arrangement of FIG. 30.
Figure 30:
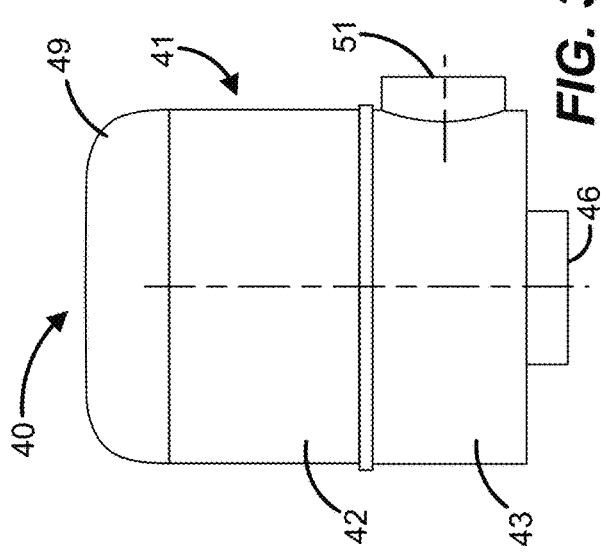
FIG. 30 shows a schematic side view on a further embodiment of a filter arrangement according to the disclosure.
Figure 33:
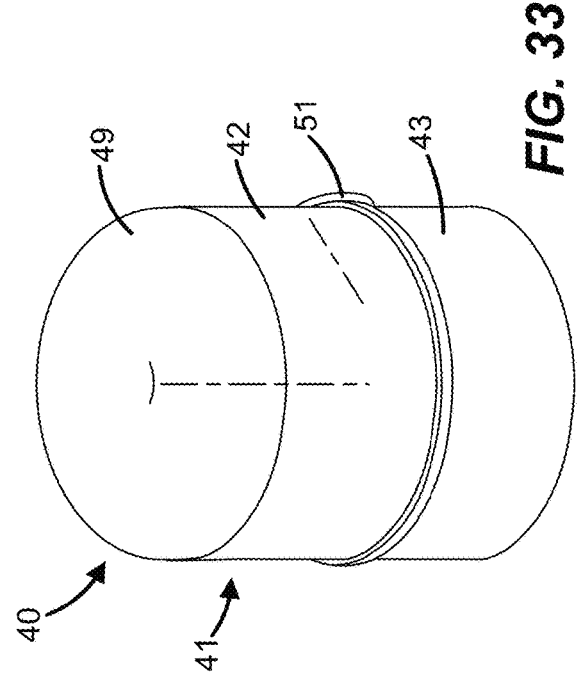
FIG. 33 shows a perspective view of the filter arrangement of FIG. 30.

The embodiment of FIGS. 27 to 29 differs from the one shown in FIGS. 24 to 26 in that the filter pack is not arranged tightly in the top part 42 of the housing 41, but loosely. The seal 53 in this arrangement is used to prevent any bypass of fluid past the filter-pack around the outer circumferential area of the filter pack.

The embodiments of FIGS. 24 to 26 and FIGS. 27 to 29 show the acoustic cone 33 to be fixedly attached to the through-channel 31.

The embodiment of FIGS. 30 to 33 shows the filter arrangement in a closed state.

Figure 36:
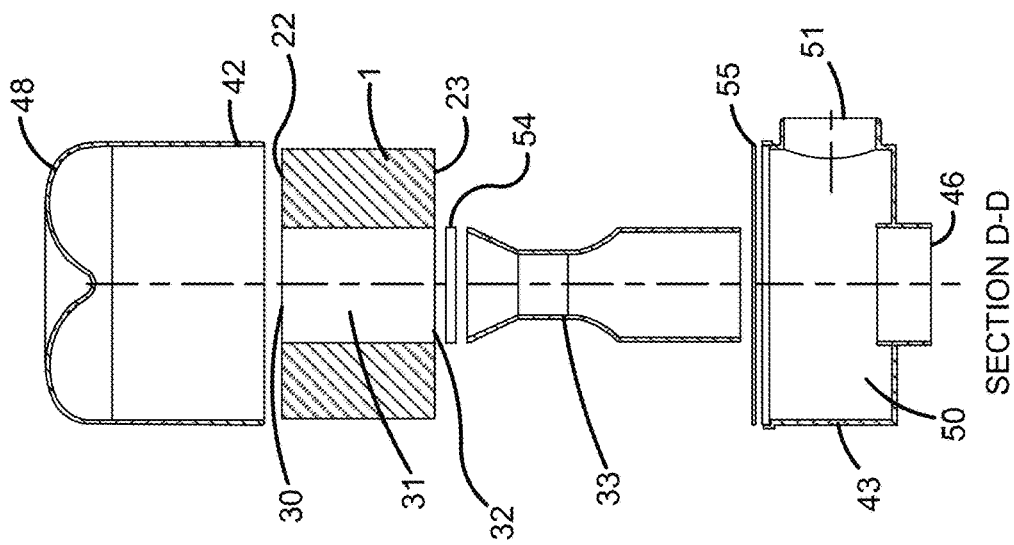
FIG. 36 shows a schematic side view of a cross section of the filter arrangement of FIG. 34 in an exploded view.
Figure 35:
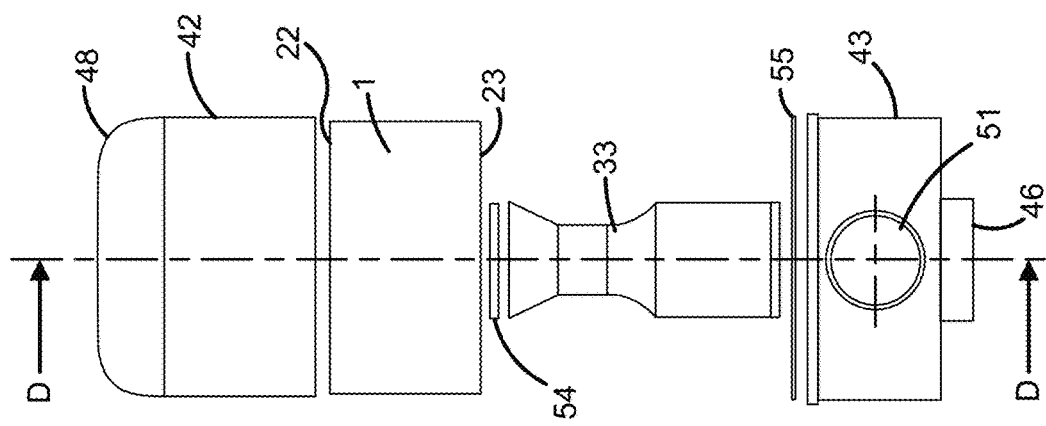
FIG. 35 shows a schematic front view on the filter arrangement of FIG. 34 in an exploded view.
Figure 34:
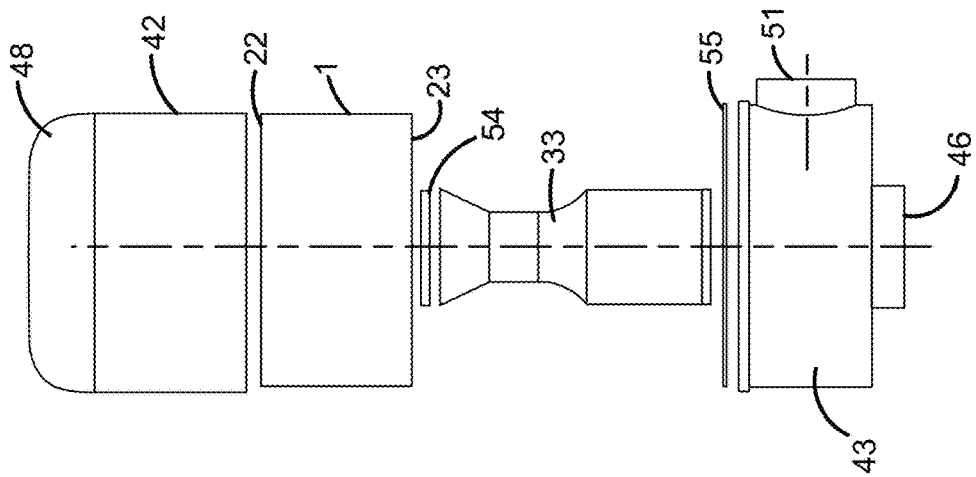
FIG. 34 shows a schematic side view on a further embodiment of a filter arrangement according to the disclosure in an exploded view.
Figure 38:
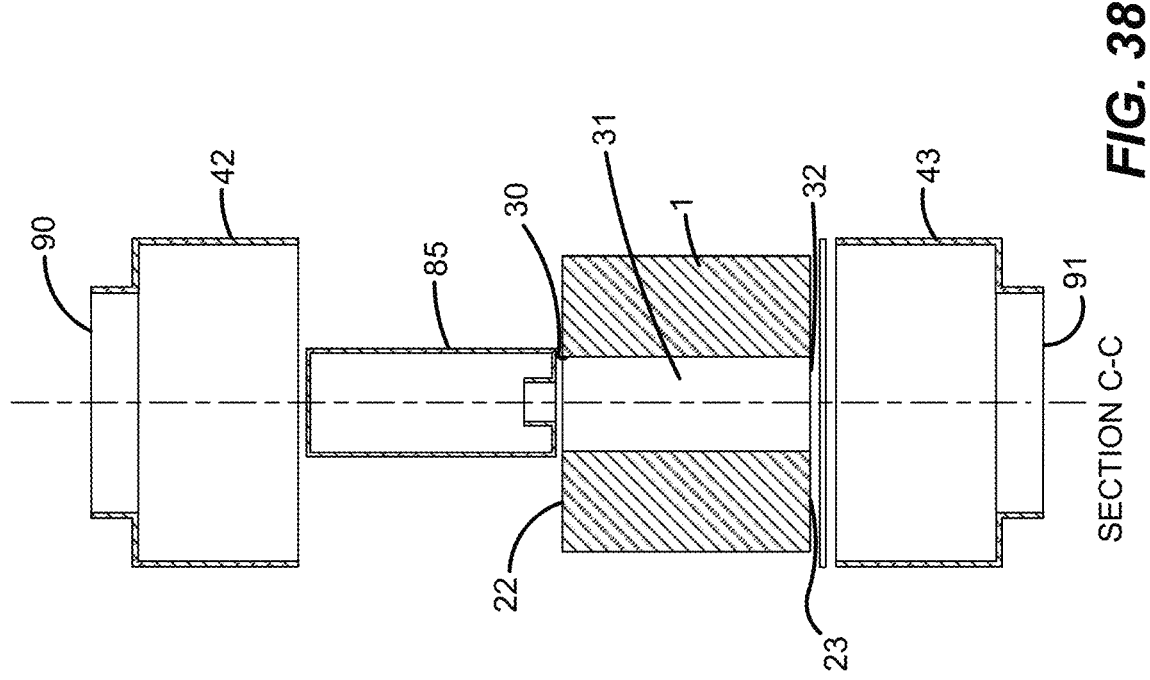
FIG. 38 shows a schematic side view of a cross section of the filter arrangement of FIG. 37 in an exploded view.
Figure 37:
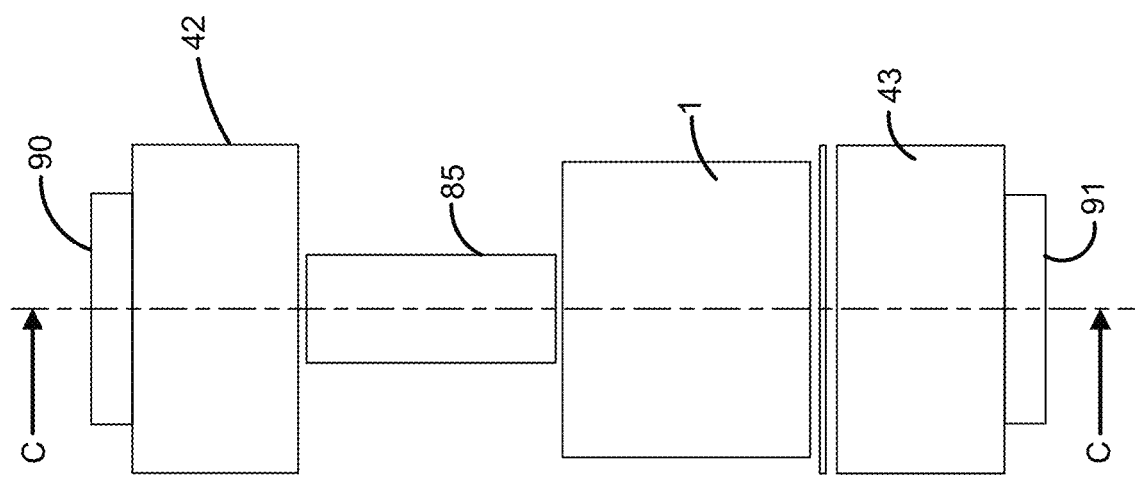
FIG. 37 shows a schematic side view on a further embodiment of a filter arrangement according to the disclosure in an exploded view.
Figure 43:
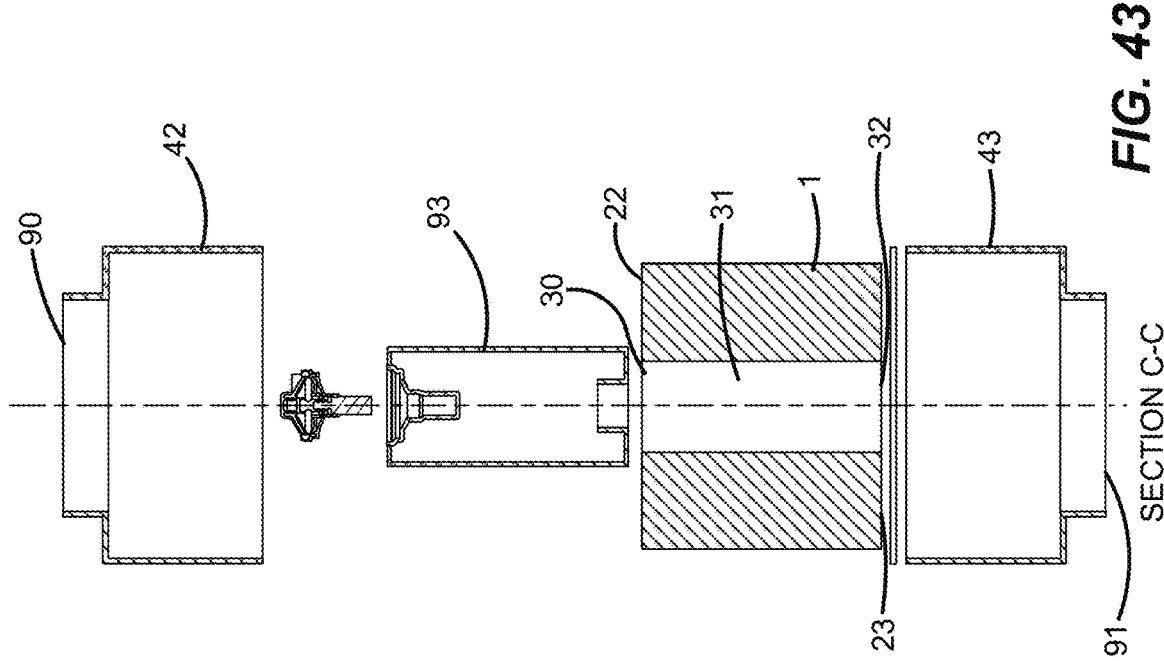
FIG. 43 shows a schematic side view of a cross section of the filter arrangement of FIG. 42 in an exploded view.
Figure 42:
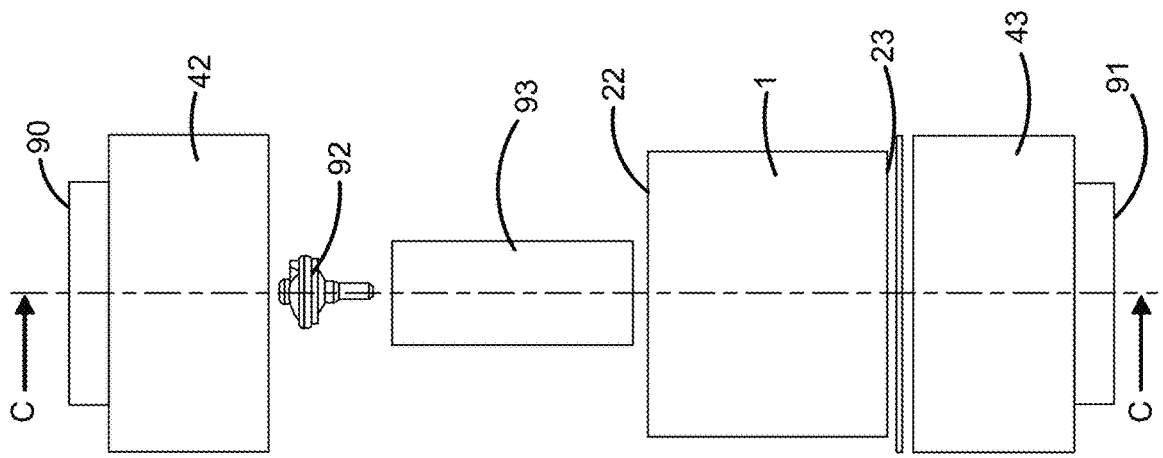
FIG. 42 shows a schematic side view on a further embodiment of a filter arrangement according to the disclosure in an exploded view.

The embodiment of FIGS. 34 to 36 differs from the one shown in FIGS. 24 to 26 in that the filter pack is not arranged tightly in the top part 42 of the housing 41 and in that the acoustic cone 33 is not attached to the filter pack, but a separate element.

The embodiment shown in FIGS. 37 to 41 differs from the embodiment shown in FIGS. 4 to 16 in that the flow of fluid through the filter arrangement is straight through, namely from a fluid inlet 90 arranged on the top part 42 of the housing 41 to a fluid outlet 91 arranged at the bottom part 43 of the housing 41. Also, inside the through-channel 31 an element is arranged that closes the flow of fluid through through-channel, while leaving a volume open inside the through-channel that is at least 10% of the volume that the through-channel would have without the element. The element is a resonator 85. The volume below the inside the resonator 85 is open at the opening 32. Hence sound waves that enter through the fluid outlet 91 can enter into the resonator 85. Because the resonator is closed at the top face, the sound waves are trapped inside the resonator 85.

Figure 48:
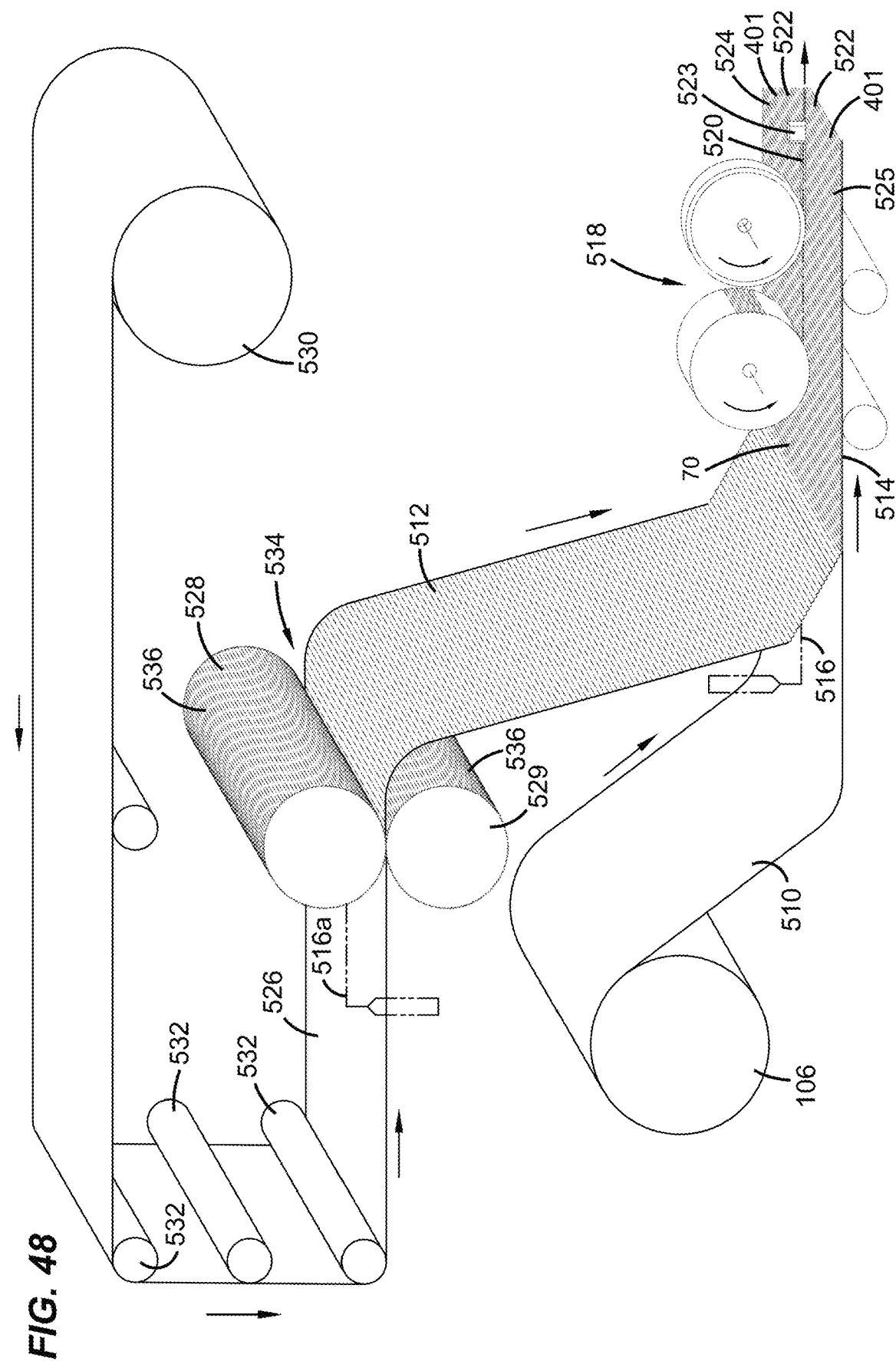
FIG. 48 is a schematic view of an example process for manufacturing 20 media of the type of FIGS. 22, 27, and 28.

In FIG. 48, one example of a manufacturing process for making a media strip (single facer) corresponding to strip 401, FIG. 1 is shown. In general, facing sheet 510 and the fluted (corrugated) sheet 512 having flutes 514 are brought together to form a media web 515, with an adhesive bead located therebetween at 516. The adhesive bead 516 will form a single facer bead 414, FIG. 1. An optional darting process occurs at station 518 to form center darted section 520 located mid-web. The z-filter media or Z-media strip 522 can be cut or slit at 523 along the bead 516 to create two pieces or strips 524, 525 of z-filter media 522, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 48 are described in PCT WO 04/007054, published Jan. 22, 2004 incorporated herein by reference.

Still in reference to FIG. 48, before the z-filter media 522 is put through the darting station 518 and eventually slit at 523, it must be formed. In the schematic shown in FIG. 48, this is done by passing a sheet of filter media 526 through a pair of corrugation rollers 528, 529. In the schematic shown in FIG. 48, the sheet of filter media 526 is unrolled from a roll 530, wound around tension rollers 532, and then passed through a nip or bite 534 between the corrugation rollers 528, 529. The corrugation rollers 528, 529 have teeth 536 that will give the general desired shape of the corrugations after the flat sheet 526 passes through the nip 534. After passing through the nip 534, the sheet 526 becomes corrugated across the machine direction and is referenced at 512 as the corrugated sheet. The corrugated sheet 512 is then secured to facing sheet 510. (The corrugation process may involve heating the media, in some instances.)

Still in reference to FIG. 48, the process also shows the facing sheet 510 being routed to the darting process station 518. The facing sheet 510 is depicted 15 as being stored on a roll 106 and then directed to the corrugated sheet 512 to form the Z-media 522. The corrugated sheet 512 and the facing sheet 510 would typically be secured together by adhesive or by other means (for example by sonic welding).

Referring to FIG. 48, an adhesive line 516 is shown used to secure corrugated sheet 512 and facing sheet 510 together, as the sealant bead. Alternatively, the sealant bead for forming the facing bead could be applied as shown as 516a. If the sealant is applied at 516a, it may be desirable to put a gap in the corrugation roller 529, and possibly in both corrugation rollers 528, 529, to accommodate the bead 516a.

Of course the equipment of FIG. 48 can be modified to provide for the beads 410, FIG. 1, if desired.

The type of corrugation provided to the corrugated media is a matter of choice, and will be dictated by the corrugation or corrugation teeth of the corrugation rollers 528, 529.

One useful corrugation pattern will be a regular curved wave pattern corrugation, of straight flutes or ridges, as defined herein above. A typical regular curved wave pattern used, would be one in which the distance D2, as defined above, in a corrugated pattern is at least 1.2 times the distance D1 as defined above. In example applications, typically D2=1.25-1.35×D1, although alternatives are possible. In some instances the techniques may be applied with curved wave patterns that are not "regular," including, for example, ones that do not use straight flutes. Also, variations from the curved wave patterns shown, are possible.

Figure 49:
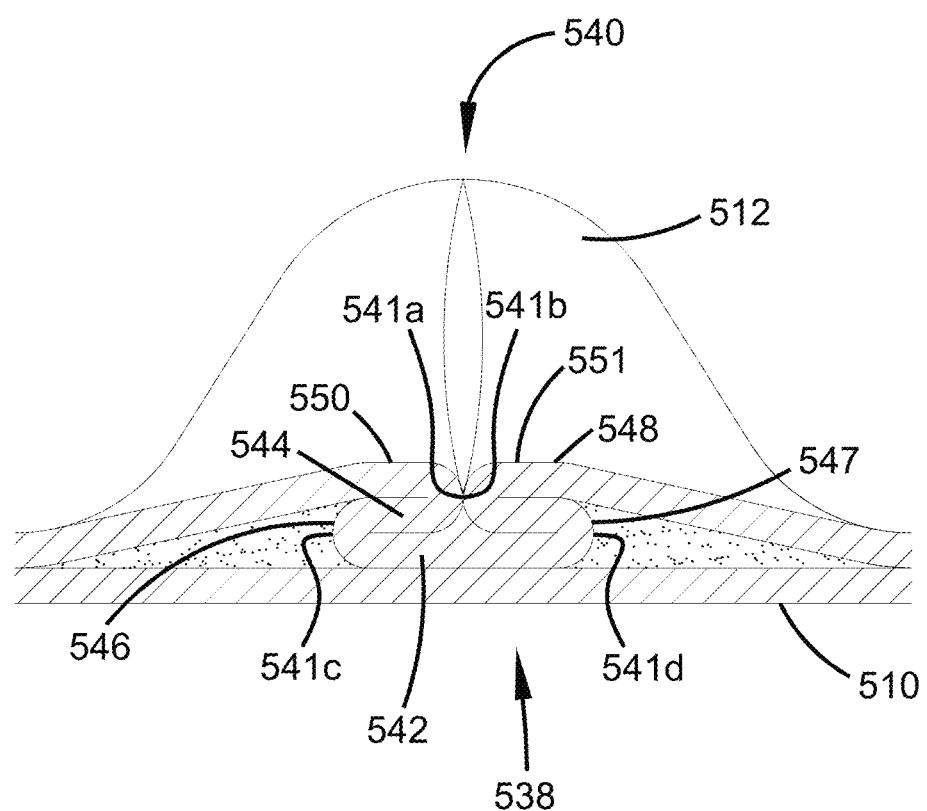
FIG. 49 is a schematic cross-sectional view of an optional end dart for media flutes of the type of FIGS. 22 and 27-29.

As described, the process shown in FIG. 48 can be used to create the center darted section 520. FIG. 49 shows, in cross-section, one of the flutes 514 after darting and slitting.

A fold arrangement 538 can be seen to form a darted flute 540 with four creases 541a, 541b, 541c, 541d. The fold arrangement 538 includes a flat first layer or portion 542 that is secured to the facing sheet 510. A second layer or portion 544 is shown pressed against the first layer or portion 542. The second layer or portion 544 is preferably formed from folding opposite outer ends 546, 547 of the first layer or portion 542.

Still referring to FIG. 49, two of the folds or creases 541a, 541b will generally be referred to herein as "upper, inwardly directed" folds or creases. The term "upper" in this context is meant to indicate that the creases lie on an upper portion of the entire fold 540, when the fold 540 is viewed in the orientation of FIG. 49. The term "inwardly directed" is meant to refer to the fact that the fold line or crease line of each crease 541a, 541b, is directed toward the other.

In FIG. 49, creases 541c, 541d, will generally be referred to herein as "lower, outwardly directed" creases. The term "lower" in this context refers to the fact that the creases 541c, 541d are not located on the top as are creases 541a, 541b, in the orientation of FIG. 49. The term "outwardly directed" is meant to indicate that the fold lines of the creases 541c, 541d are directed away from one another.

The terms "upper" and "lower" as used in this context are meant specifically to refer to the fold 540, when viewed from the orientation of FIG. 49. That is, they are not meant to be otherwise indicative of direction when the fold 540 is oriented in an actual product for use.

Based upon these characterizations and review of FIG. 49, it can be seen that a regular fold arrangement 538 according to FIG. 49 in this disclosure is one which includes at least two "upper, inwardly directed, creases." These inwardly directed creases are unique and help provide an overall arrangement in which the folding does not cause a significant encroachment on adjacent flutes.

A third layer or portion 548 can also be seen pressed against the second layer or portion 544. The third layer or portion 548 is formed by folding from opposite inner ends 550, 551 of the third layer 548.

Another way of viewing the fold arrangement 538 is in reference to the geometry of alternating ridges and troughs of the corrugated sheet 512. The first layer or portion 542 is formed from an inverted ridge. The second layer or portion 544 corresponds to a double peak (after inverting the ridge) that is folded toward, and in preferred arrangements, folded against the inverted ridge.

Techniques for providing the optional dart described in connection with FIG. 49, in a preferred manner, are described in PCT WO 04/007054, incorporated herein by reference. Techniques for coiling the media, with application of the winding bead, are described in PCT application US 04/07927, filed Mar. 17, 2004 and published as WO 04/082795 and incorporated herein by reference.

Alternate approaches to darting the fluted ends closed are possible. Such approaches can involve, for example: darting which is not centered in each flute; and, rolling, pressing or folding over the various flutes. In general, darting involves folding or otherwise manipulating media adjacent to fluted end, to accomplish a compressed, closed, state.

Figure 50:
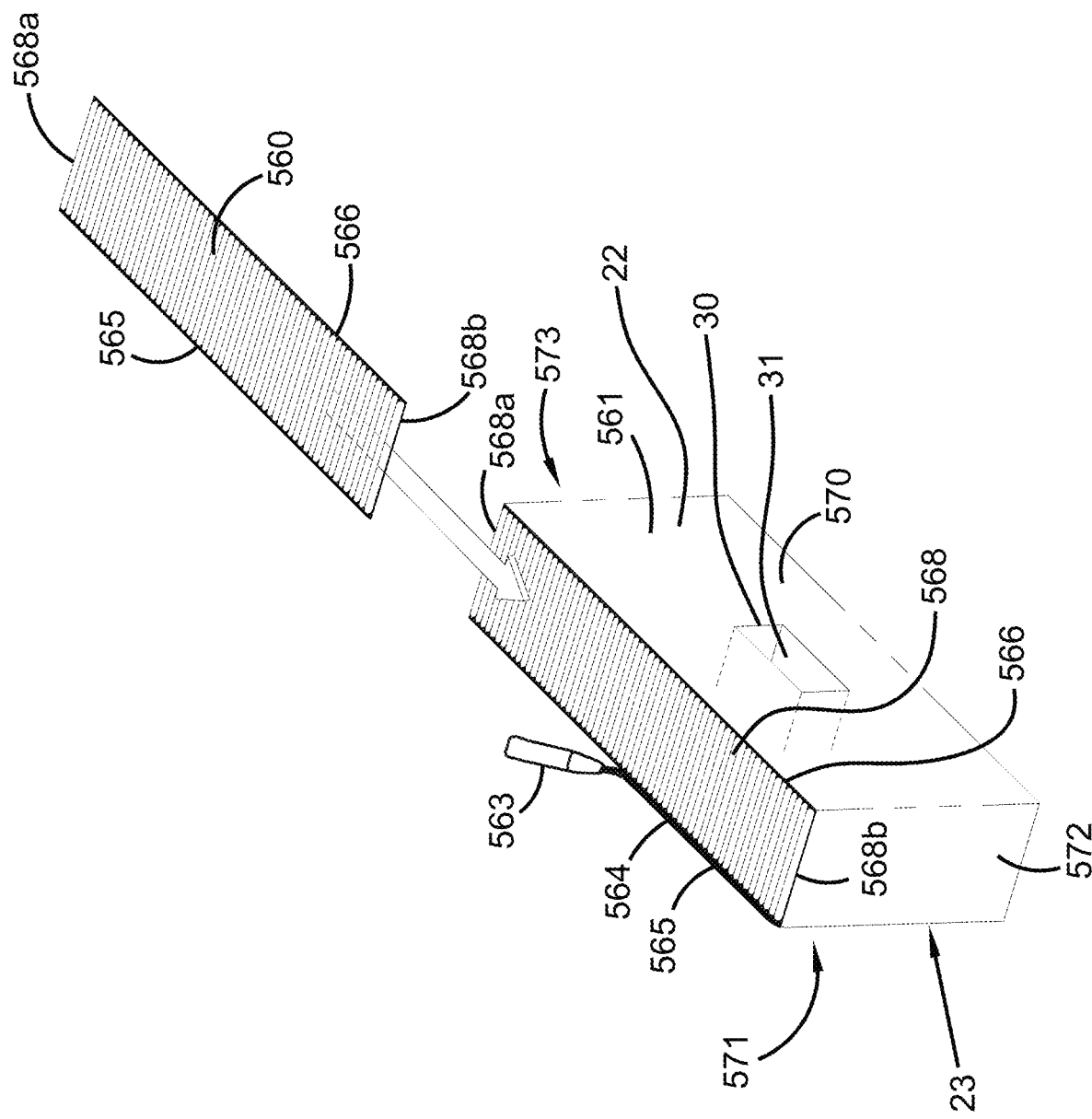
FIG. 50 is a schematic perspective view of a stacked media pack arrangement usable in a filter arrangement having selected features in accord with the present disclosure and made from a strip of media for example in accord with FIG. 1.

In FIG. 50, there is (schematically) shown a step of forming stacked z-filter media (or media pack) from strips of z-filter media, each strip being a fluted 30 sheet secured to a facing sheet. Referring to FIG. 50, single facer strip 560 is being shown added to a stack 561 of strips 562 analogous to strip 560. Strip 560 can be cut from either of strips 524, 525, FIG. 48. At 563, FIG. 50, application of a stacking bead 564 is shown, between each layer corresponding to a strip 560, 562 at an opposite edge from the single facer bead or seal. (Stacking can also be done with each layer being added to the bottom of the stack, as opposed to the top.)

Referring to FIG. 50, each strip 560, 562 has front and rear edges 565, 566 and opposite side edges 568a, 568b. Inlet and outlet flutes of the corrugated sheet/facing sheet combination comprising each strip 560, 562 generally extend between the front and rear edges 565, 566, and parallel to side edges 568a, 568b.

Still referring to FIG. 50, in the media or media pack 561 being formed, opposite flow faces are indicated at 570, 571. The selection of which one of faces 570, 571 is the inlet end face and which is the outlet end face, during filtering, is a matter of choice. In some instances the stacking bead 564 is positioned adjacent the upstream or inlet face 571; in others the opposite is true. The flow faces 570, 571, extend between opposite side faces 572, 573.

The stacked media configuration or pack 561 shown being formed in FIG. 50, is sometimes referred to herein as a "blocked" stacked media pack. The term "blocked" in this context, is an indication that the arrangement is formed to a rectangular block in which all faces are 90° relative to all adjoining wall faces. For example, in some instances the stack can be created with each strip 560 being slightly offset from alignment with an adjacent strip, to create a parallelogram or slanted block shape, with the inlet face and outlet face parallel to one another, but not perpendicular to upper and bottom surfaces.

In some instances, the media or media pack will be referenced as having a parallelogram shape in any cross-section, meaning that any two opposite side faces extend generally parallel to one another.

It is noted that a blocked, stacked arrangement corresponding to FIG. 50 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003 and published as 2004/0187689. Each of these latter references is incorporated herein by reference. It is noted that a stacked arrangement shown in U.S. Ser. No. 10/731, 504, published as 2005/0130508 is a slanted stacked arrangement.

It is also noted that, in some instances, more than one stack can be incorporated into a single media pack. Also, in some instances, the stack can be generated with one or more flow faces that have a recess therein, for example, as shown in U.S. Pat. No. 7,625,419 incorporated herein by reference.

A compact filter element (filter package) 1 of this type comprises a top face 22 towards which are directed the inlet openings of the first channels of the group of first channels. Additionally, a filter package of this type comprises a bottom face 23 towards which the outlet openings of the second channels of the group of second channels open. FIG. 3 shows an opening 30 of a through-channel 31 at the top face 22. The through-channel 31 leads through the filter pack. The through-channel 31 also has an opening 32 at the bottom face 23.

Figure 51:
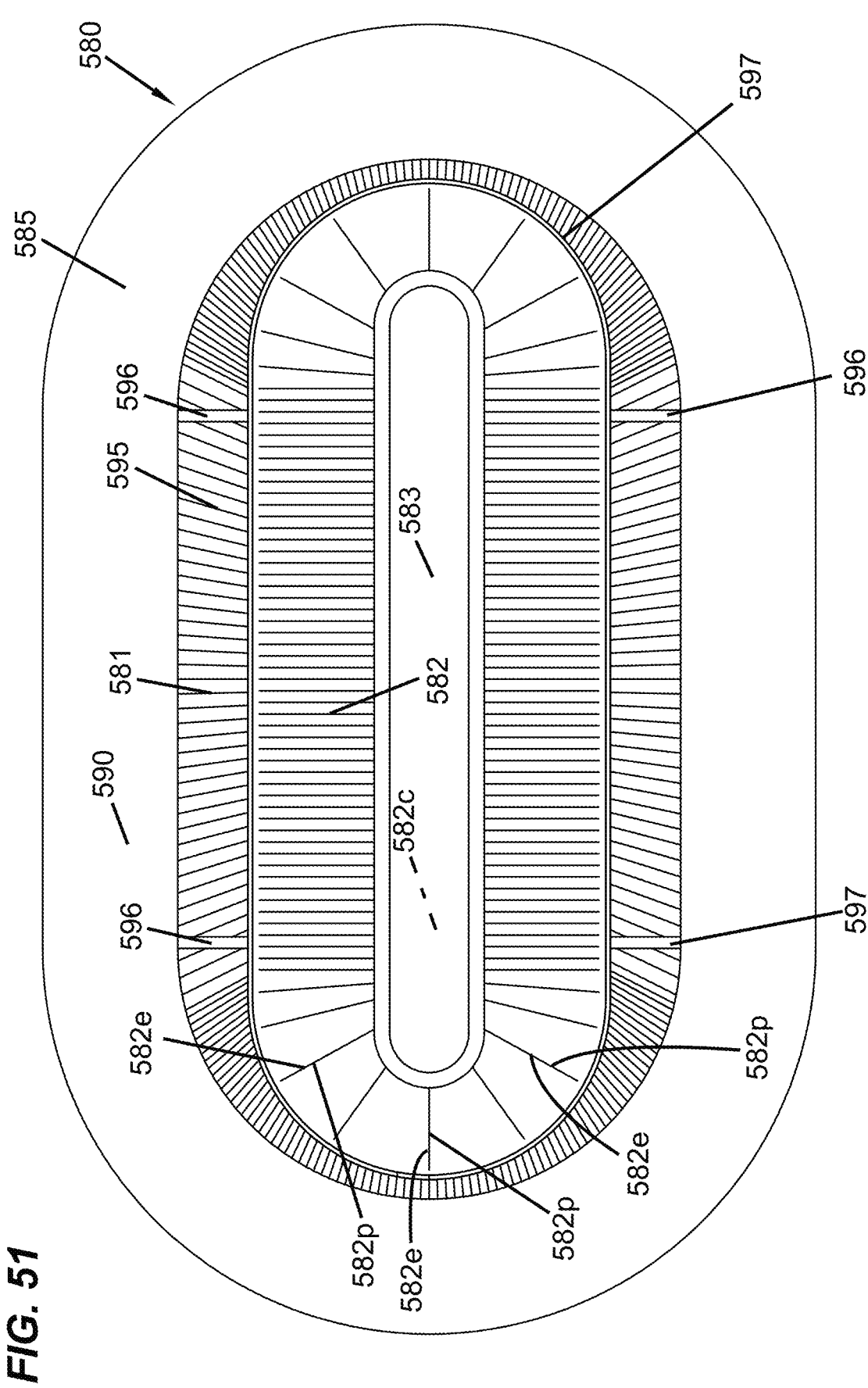
FIG. 51 is a schematic flow end view of a filter media pack using an alternate media to the media of FIG. 1, and alternately usable in selected filter cartridges in accord with the present disclosure.
Figure 52:
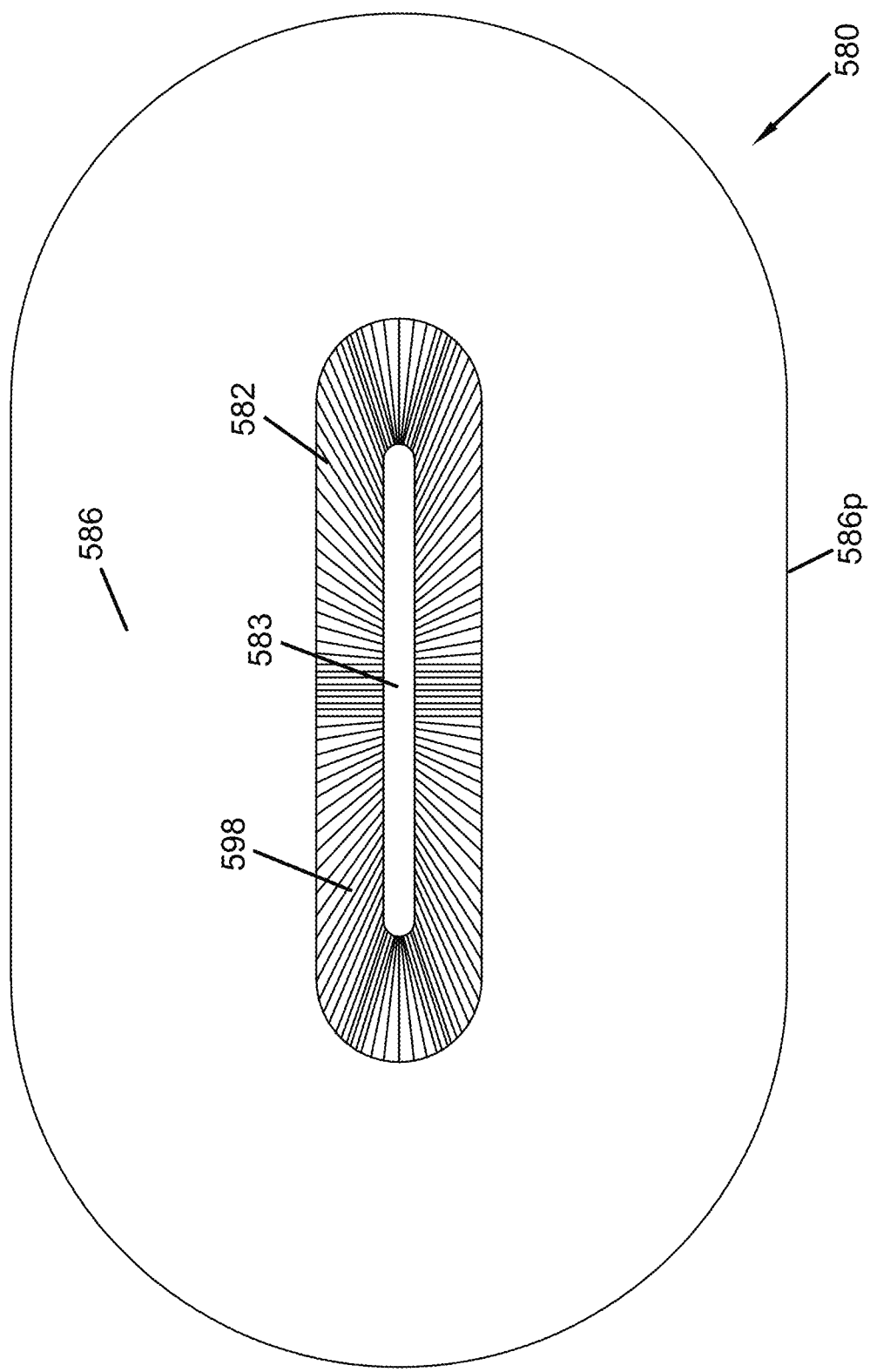
FIG. 52 is a schematic opposite flow end view to the view of FIG. 51.
Figure 53:
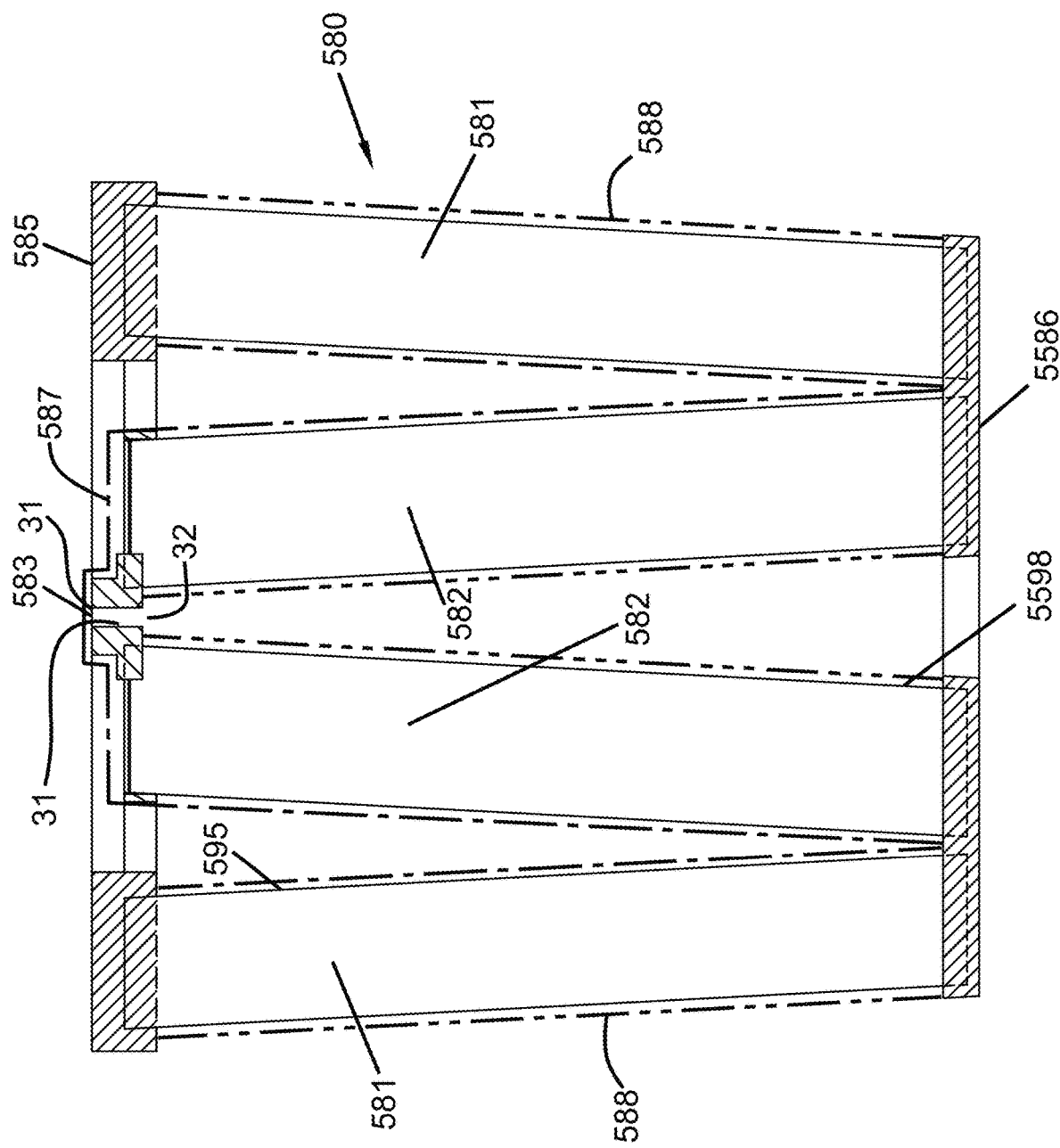
FIG. 53 is a schematic cross-sectional view of the media pack of FIGS. 33 and 34.

Alternate types of media arrangements or packs that involve flutes between opposite ends extending between can be used with selected principles according to the present disclosure. An example of such alternate media arrangement or pack is depicted in FIGS. 51-53. The media of FIGS. 51-53 is analogous to one depicted and described in DE 20 2008 017 059 U1; and as can sometimes found in arrangements available under the mark "IQORON" from Mann & Hummel.

Referring to FIG. 51, the media or media pack is indicated generally at 580. The media or media pack 580 comprises a first outer pleated (ridged) media loop 581 and a second, inner, pleated (ridged) media loop 582, each with pleat tips (or ridges) extending between opposite flow ends. The view of FIG. 51 is toward a media pack (flow) end 585. The end 585 depicted, can be an inlet (flow) end or an outlet (flow) end, depending on selected flow direction. For many arrangements using principles characterized having the media pack 580 would be configured in a filter cartridge such that end 585 is an inlet flow end.

Still referring to FIG. 51, the outer pleated (ridged) media loop 581 is configured in an oval shape, though alternatives are possible. At 590, a pleat end closure, for example molded in place, is depicted closing ends of the pleats or ridges 581 at media pack end 585.

Pleats, or ridges 582 (and the related pleat tips) are positioned surrounded by and spaced from loop 581, and thus pleated media loop 582 is also depicted in a somewhat oval configuration. In this instance, ends 582e of individual pleats or ridges 582p in a loop 582 are sealed closed. Also, loop 582 surrounds the center 582c that is closed by a center strip 583 of material, typically molded-in-place.

During filtering, when end 585 is an inlet flow end, air enters gap 595 between the two loops of media 581, 582. The air then flows either through loop 581 or loop 582, as it moves through the media pack 580, with filtering.

In the example depicted, loop 581 is configured slanting inwardly toward loop 582, in extension away from end 585. Also spacers 596 are shown supporting a centering ring 597 that surrounds an end of the loop 582, for structural integrity.

In FIG. 52, an end 586 of the cartridge 580, opposite end 585 is viewable. Here, an interior of loop 582 can be seen, surrounding an open gas flow region 598. When air is directed through cartridge 580 in a general direction toward end 586 and away from end 585, the portion of the air that passes through loop 582 will enter central region 598 and exit therefrom at end 586. Of course air that has entered media loop 581, FIG. 51 during filtering would generally pass around (over) an outer perimeter 586p of end 586.

In FIG. 53 a schematic cross sectional view of cartridge 580 is provided. Selected identified and described features are indicated by like reference numerals It will be understood from a review of FIGS. 51-53, the above description, that the cartridge 580 described, is generally a cartridge which has media tips extending in a longitudinal direction between opposite flow ends 585, 586.

In the arrangement of FIGS. 51-53, the media pack 580 is depicted with an oval, in particular racetrack, shaped perimeter. It is depicted in this manner, since the air filter cartridges in many examples below also have an oval or racetrack shaped configuration. However, the principles can be embodied in a variety of alternate peripheral shapes.

In FIG. 51 the fluid inlet face is indicated by the single-dotted line 587. The fluid inlet face is provided by the area of the pleated media that is facing towards the room provided between loop 581 and loop 582. The fluid to be filtered flows through this fluid inlet face into the individual inward facing pleats of the loop 581 and the individual inward facing pleats of loop 582; the individual inward facing pleats of the loop 581 and the individual inward facing pleats of loop 582 forming a group of first channels in which each first channel extends from a first end 585 to a second end 586 and each first channel having an inlet opening that opens into the fluid entry face (single dotted line) and through which the fluid to be filtered can flow into the respective first channel (individual inward facing pleats of loop 581 and loop 582). A first fluid exit face is indicated by the double-dotted line 588. The fluid exit face is provided by the area of the pleated media that is facing outwards of loop 581. The filtered fluid flows out of the individual, outward facing pleats of the loop 581, the individual outward facing pleats of the loop 581 forming a group of second channels in which each second channel extends from a first end 585 to a second end 586 and each first channel having an outlet opening that opens into the fluid exit face (double dotted line 588) and through which the fluid to be filtered can flow out of the respective second channel (individual outward facing pleats of loop 581). A second fluid exit face is indicated by the triple-dotted line 589. The fluid exit face is provided by the area of the pleated media that is facing towards the space inside of loop 582. The filtered fluid flows out of the individual pleats of the loop 582 into this space, the individual pleats of the loop 582 facing this space forming a group of second channels in which each second channel extends from a first end 585 to a second end 586 and each first channel having an outlet opening that opens into the fluid exit face (triple dotted line 589) and through which the fluid to be filtered can flow out of the respective second channel (individual pleats of loop 582 facing the space inside loop 582).

Herein, in FIGS. 54-61, some schematic, fragmentary, cross-sectional views are provided of still further alternate variations of media types that can be used in selected applications of the principles characterized herein. Certain examples are described in U.S. Ser. No. 62/077,749, filed Nov. 10, 2014. In general, each of the arrangements of FIGS. 54-61 represents a media type that can be stacked or coiled into an arrangement that has opposite inlet and outlet flow ends (or faces), with straight through flow.

Figure 54:
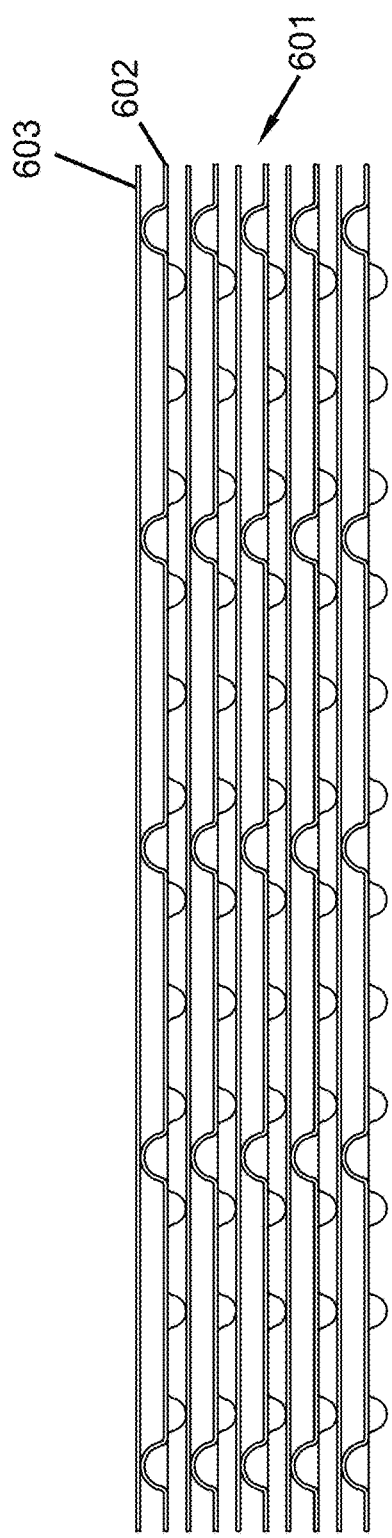
FIG. 54 is a schematic, fragmentary, cross-sectional view of a further alternate media type usable in a media pack of a filter cartridge having features in accord with the present disclosure.

In FIG. 54, an example media arrangement 601 from U.S. Ser. No. 62/077,749 is depicted, in which an embossed sheet 602 is secured to a non-embossed sheet 603, then stacked and coiled into a media pack, with seals along opposite edges of the type previously described for FIG. 1 herein.

Figure 55:
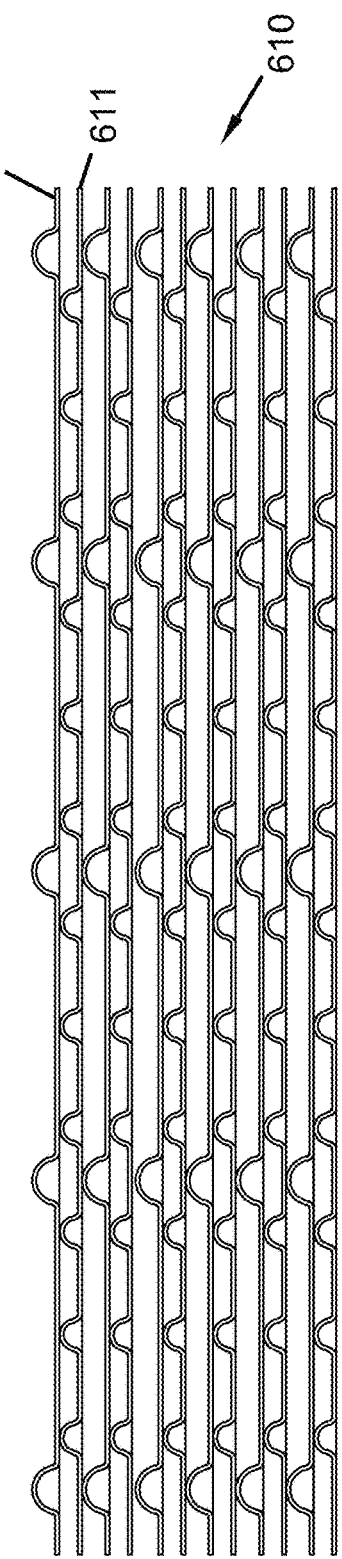
FIG. 55 is a schematic, fragmentary cross-sectional view, of a first variation of the media type of FIG. 54.

In FIG. 55, an alternate example media pack 610 from U.S. Ser. No. 62/077,749 is depicted, in which a first embossed sheet 611 is secured to a second embossed sheet 612 and then formed into a stacked or coiled media pack arrangement, having edge seals generally in accord with FIG. 1 herein.

Figure 56:
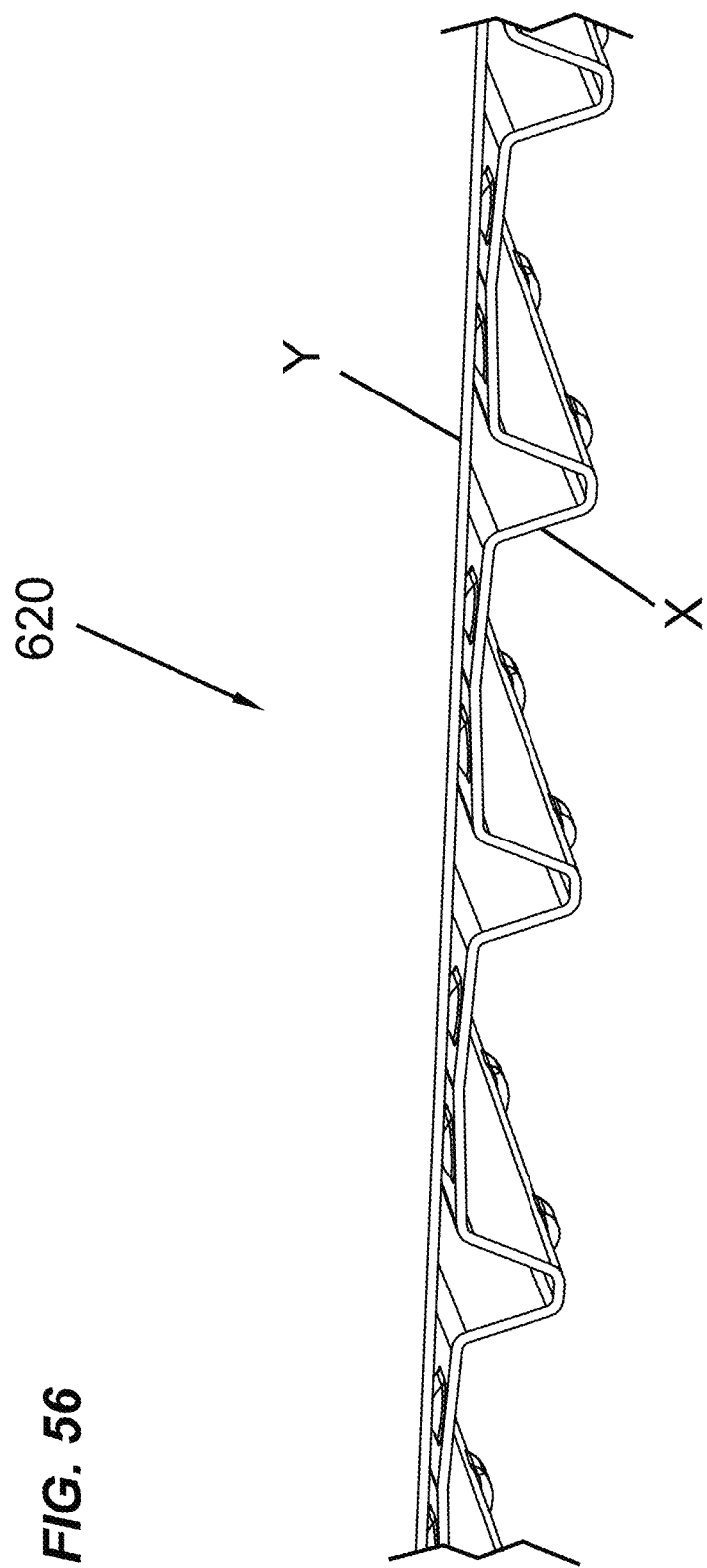
FIG. 56 is a schematic fragmentary depiction of another usable fluted sheet/facing sheet combination in accord with the present disclosure.
Figure 57:
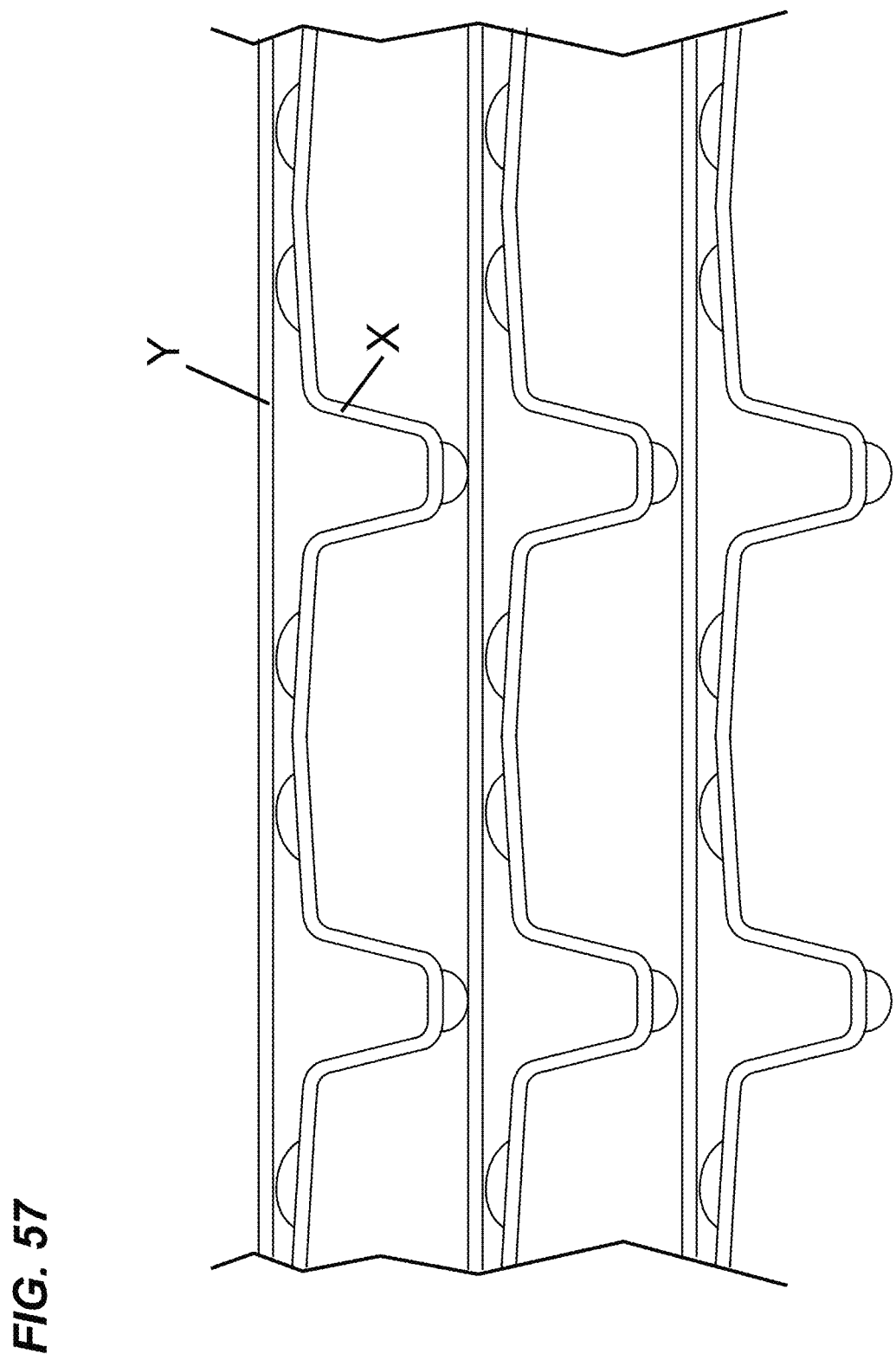
FIG. 57 is a fragmentary second schematic view of the type of media in FIG. 56 shown in a media pack.
Figure 58:
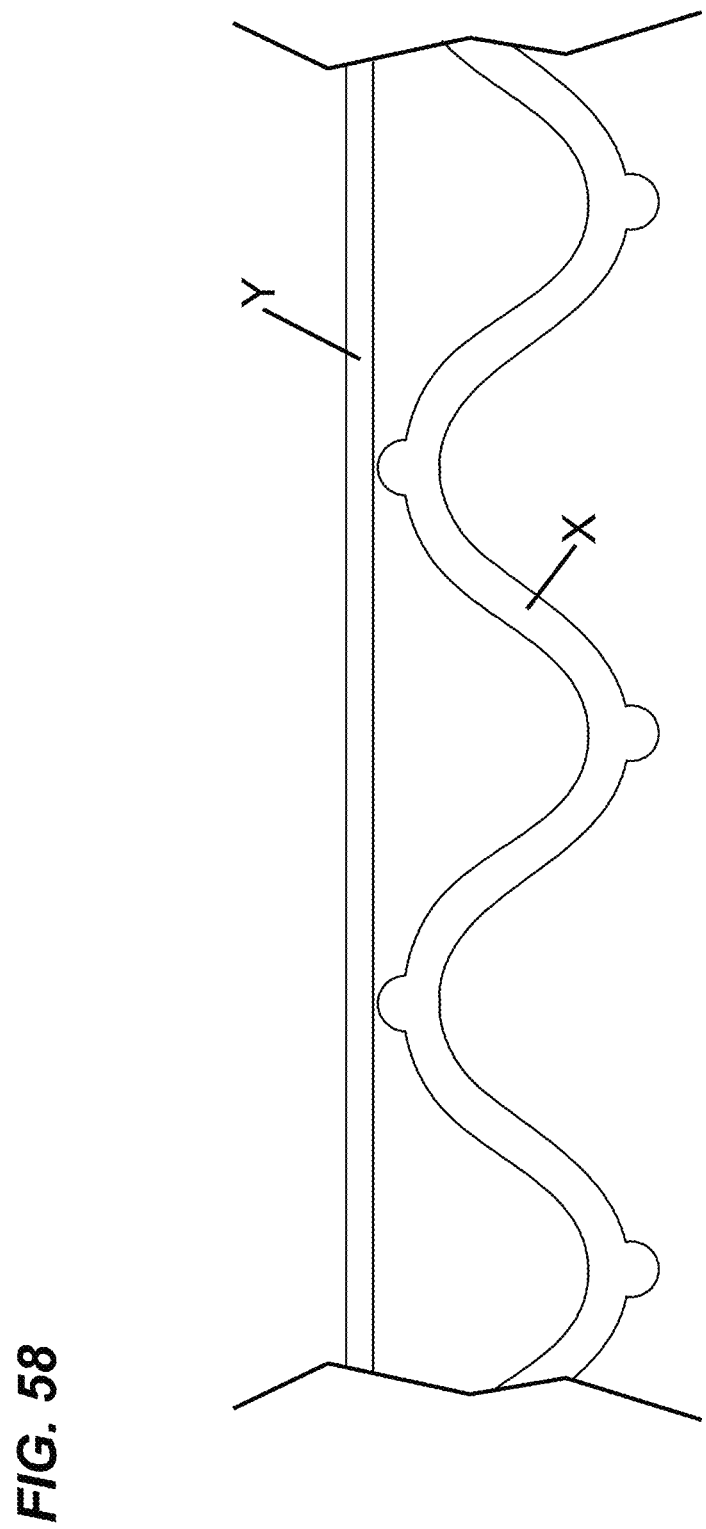
FIG. 58 is a schematic, fragmentary, plan view of still another media variation usable in arrangements according to the present disclosure.

In FIG. 56-58, a third example media arrangement 620 from U.S. Ser. No. 62/077,749 is depicted. Edge seals can be conducted in either the upstream end or the downstream end, or in some instances both. Especially when the media is likely to encounter chemical material during filtering, it may be desirable to avoid a typical adhesive or sealant.

In FIG. 56, a cross-section is depicted in which the fluted sheet X has various embossments on it for engagement with the facing sheet Y. Again these can be separate, or sections of the same media sheet.

In FIG. 57, a schematic depiction of such an arrangement between the fluted sheet X and facing sheet Y is also shown.

In FIG. 58, a still further variation of such a principle is shown between a fluted sheet X and a facing sheet Y. These are meant to help understand how a wide variety of approaches are possible.

Figure 59:
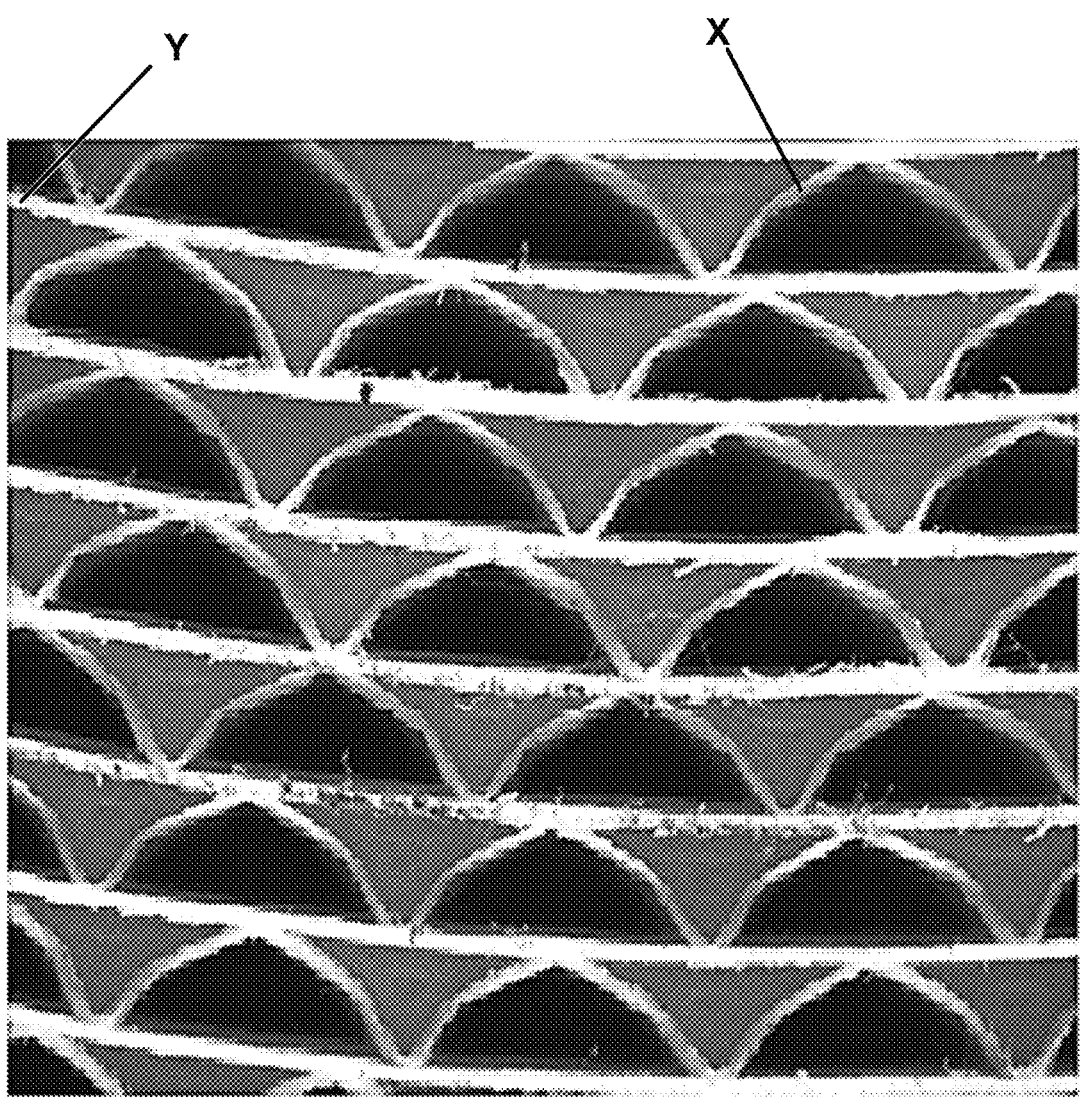
FIG. 59 is a schematic view of another variation of usable media in accord with the present disclosure.

In FIG. 59-61, still another possible variation in fluted sheet X and facing sheet Y is shown.

In FIGS. 59-61, an example media arrangement 640 is depicted, in which a fluted sheet 642 is secured to a facing sheet 643. The facing sheet 643 may be a flat sheet. The media arrangement 640 can then be stacked or coiled into a media pack, with seals along opposite edges of the type previously described for FIG. 1 herein. In the embodiment shown, the flutes 644 of fluted sheet 642 have an undulating ridgeline including a series of peaks 645 and saddles 646. The peaks 645 of adjacent flutes 644 can be either aligned as shown in FIGS. 60 and 61 or offset. Further the peak height and/or density can increase, decrease, or remain constant along the length of the flutes 644. The ratio of the peak flute height to saddle flute height can vary from about 1.5, typically from 1.1 to about 1.

The examples of FIGS. 54-61, are meant to indicate generally that a variety alternate media packs can be used in accord with the principles herein. Attention is also directed to U.S. Ser. No. 62/077,749 incorporated herein by reference, with respect to the general principles of construction and application of some alternates media types.

Additional examples of alternative types of media arrangements or packs that involve filtration media having flutes extending between opposite ends or flow faces in a straight through flow configuration are depicted in FIGS. 62-65. The flutes can be considered inlet flutes when they are arranged to receive dirty air via an inlet flow face, and they can be considered outlet flutes when they are arranged to permit filtered air to flow out via an outlet flow face.

Figure 62:
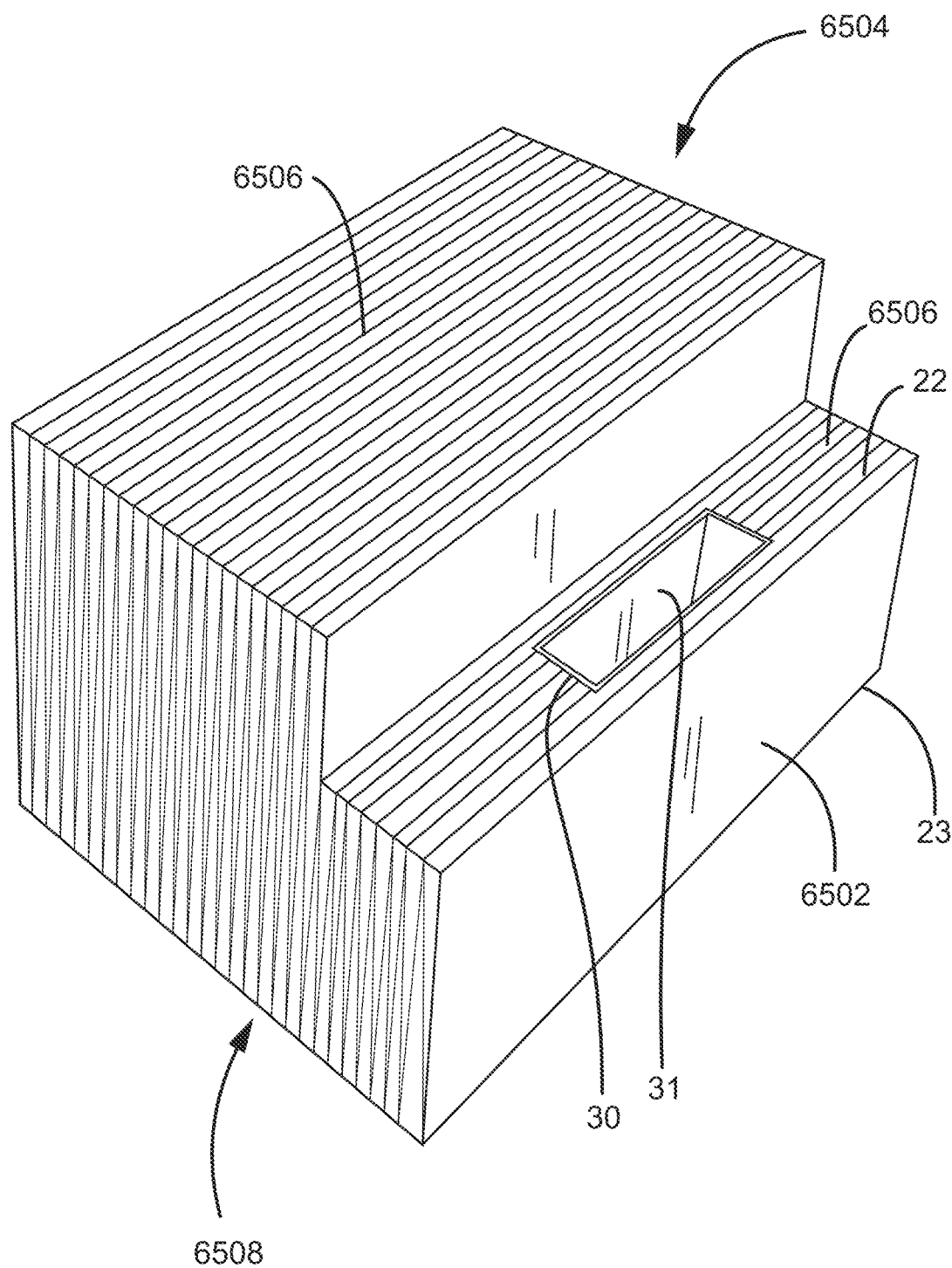
FIG. 62 is a perspective view of another media variation useable in arrangements according to the present disclosure.
Figure 63:
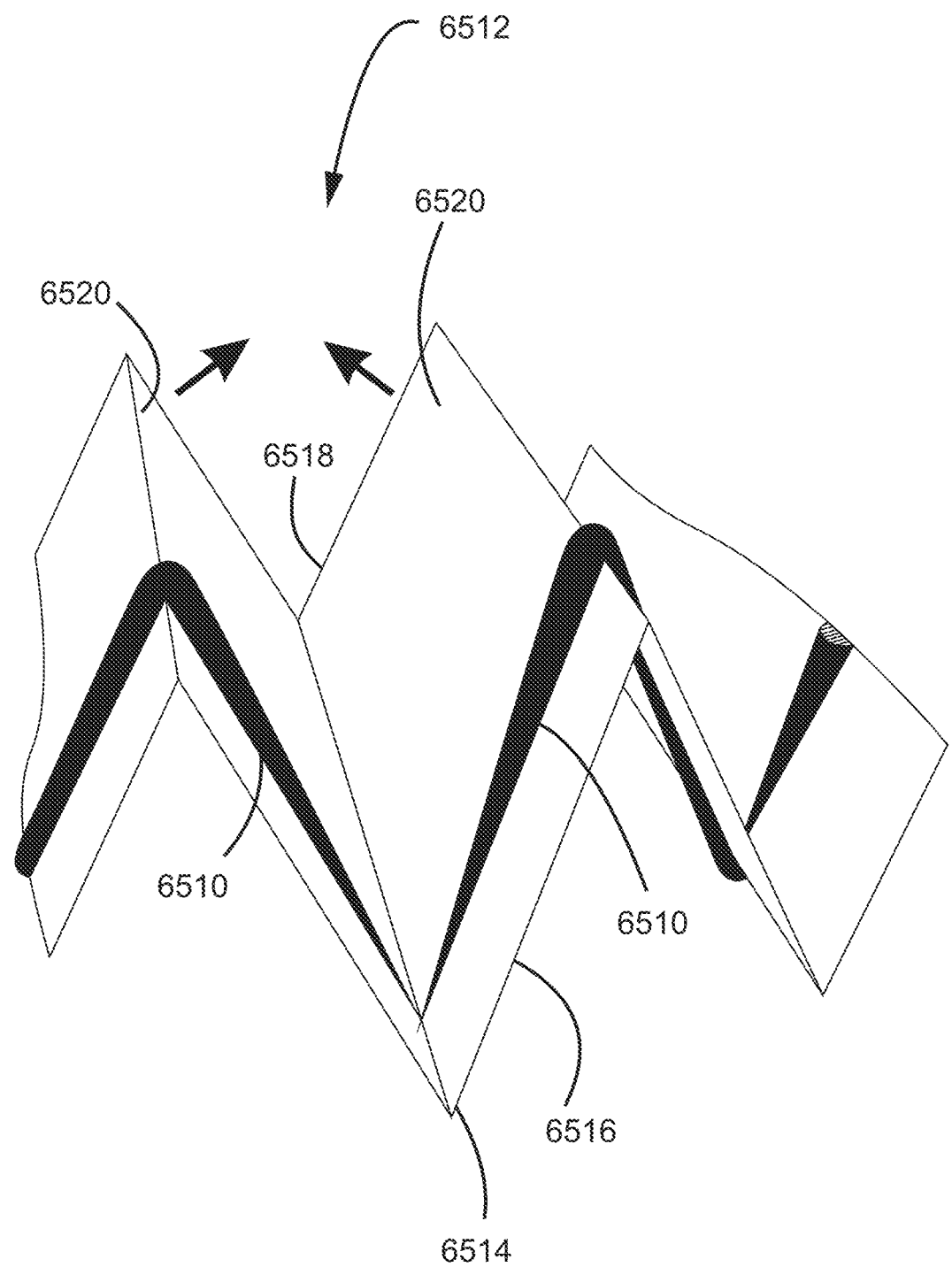
FIG. 63 is a schematic, perspective view of a portion of a support section of the filter media of FIG. 62, illustrated in a folded configuration but expanded or separated for illustrative purposes.
Figure 64:
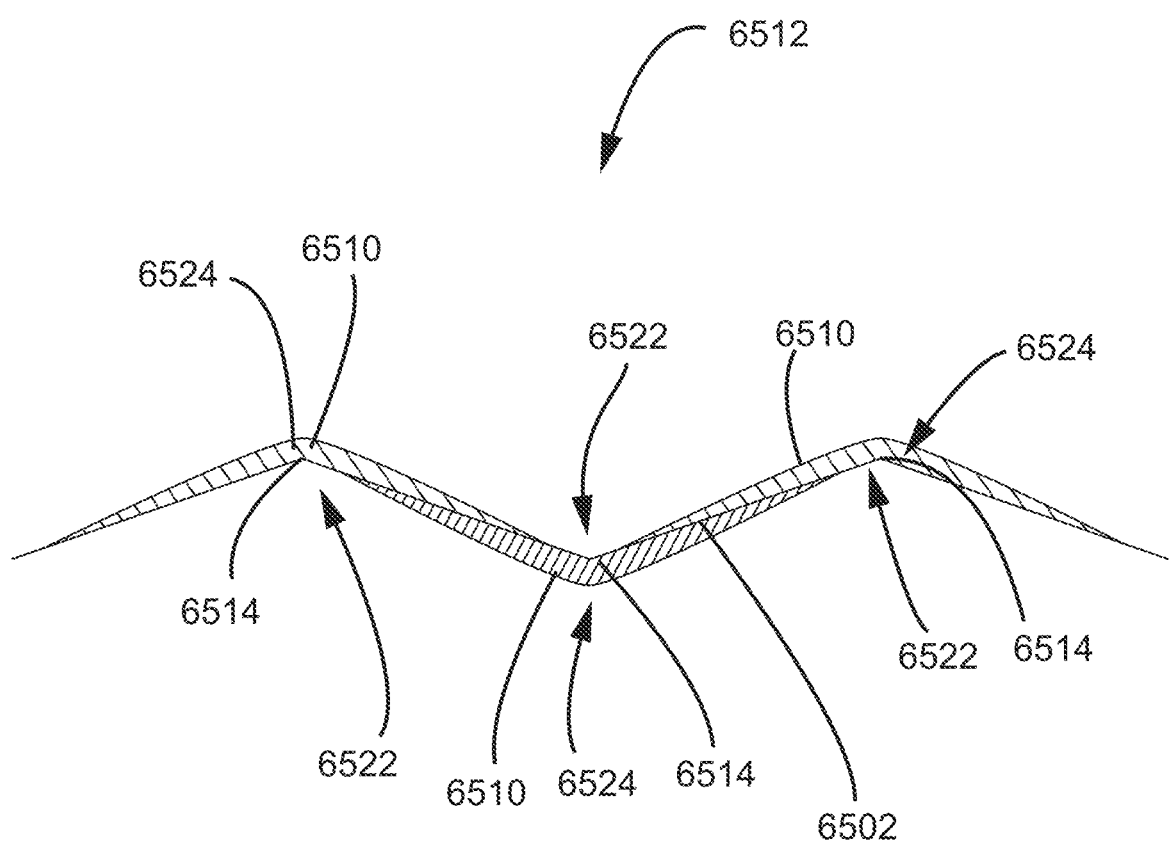
FIG. 64 is a schematic, cross-sectional view of a portion of the support section of the filter media of FIG. 62, illustrated in a folded configuration but expanded or separated for illustrative purposes.
Figure 65:
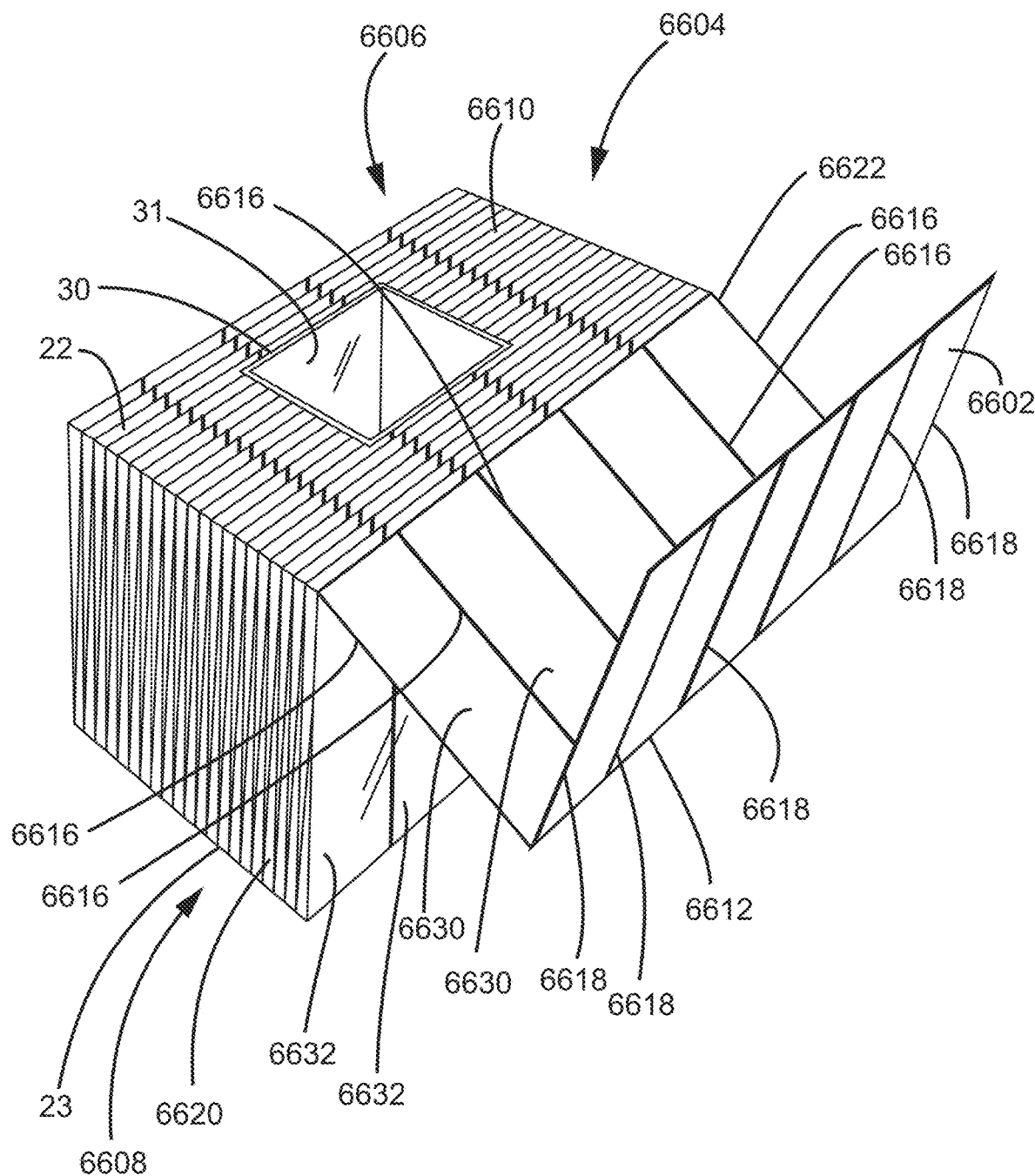
FIG. 65 is a perspective view of another media variation useable in arrangements according to the present disclosure.

The filtration media 6502 depicted in FIGS. 62-64, which is analogous to ones depicted in U.S. Pat. Nos. 8,479,924 and 9,919,256 assigned to Mann+Hummel GmbH, is illustrated in an arrangement that shows how the filtration media 6502 can be formed into a media pack arrangement 6504.

The media pack arrangement 6504 can be considered as having relatively long or deep pleats from an inlet flow face 6506 to an outlet flow face 6508, and can also have varying pleat depths as illustrated. As the depth of pleats of a media pack increases, there is a tendency of the filtration media to collapse on each other thereby causing masking. Masking is undesirable because masked filtration media tends to no longer be available for filtration thereby decreasing dust holding capacity and flow through the media pack, and also potentially increasing pressure drop across the media pack. In order to reduce masking and to help the filtration media retain its shape, support structures are known to be applied to pleated media. In FIGS. 63 and 64, support sections or spacers 6510 are provided. It should be appreciated that FIGS. 63 and 64 are illustrated in a folded configuration 6512 having pleat folds 6514, but are expanded or separated to show how the filtration media 6502 and the support sections or spacers 6510 can be arranged.

Figure 44:
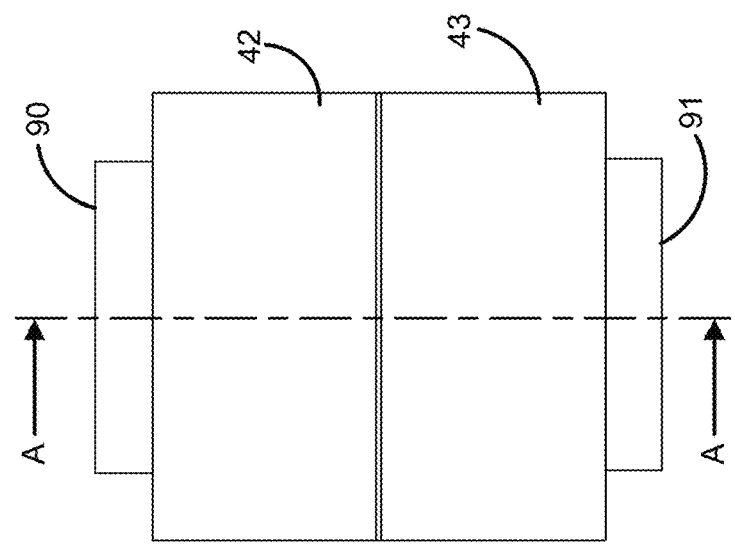
FIG. 44 shows a schematic side view of the filter arrangement of FIG. 42.
Figure 47:
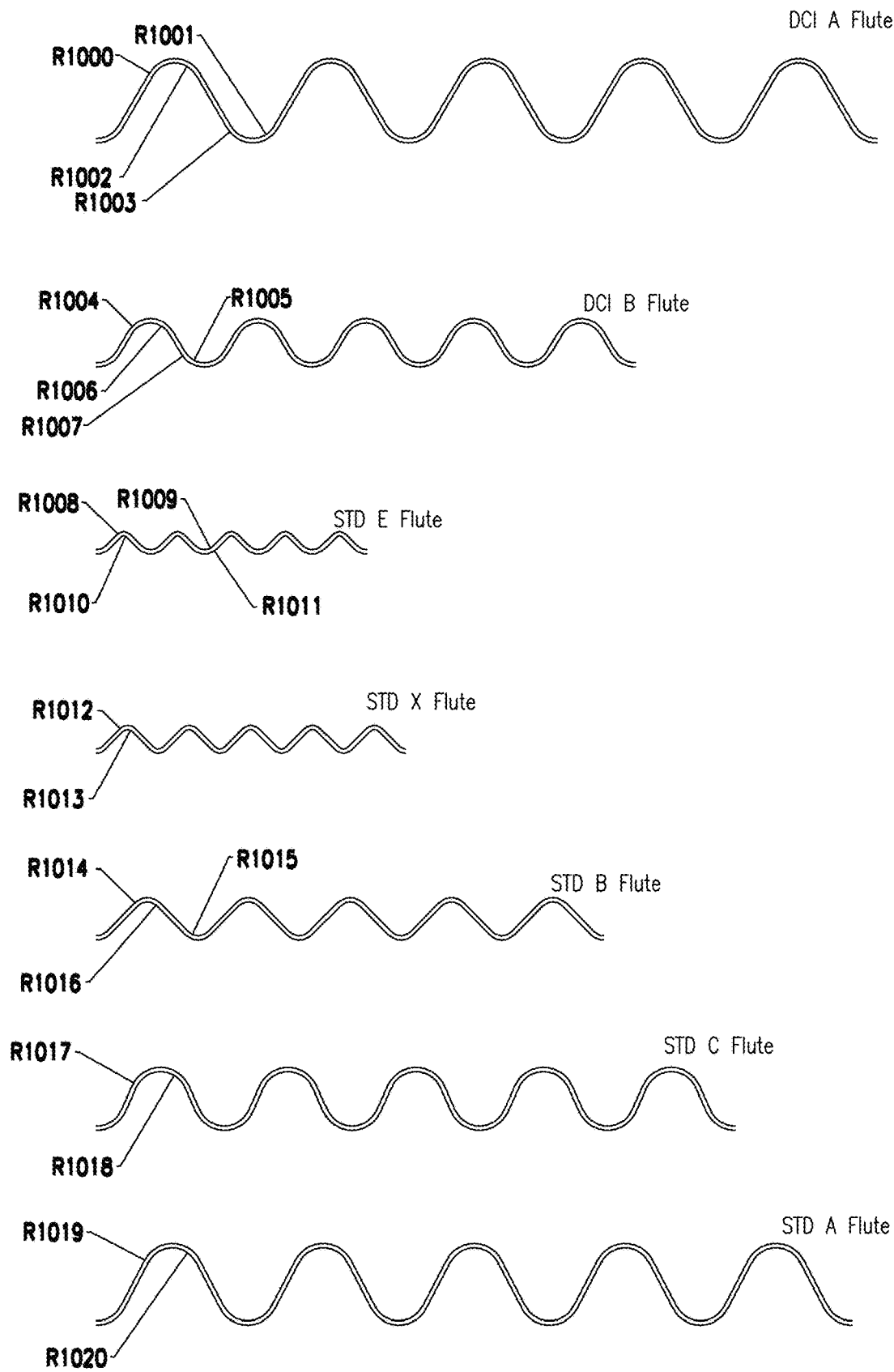
FIG. 47 includes schematic views of examples of various fluted media definitions, for media of the type of FIGS. 22 and 27.

As illustrated in FIGS. 63-64, the filtration media 6502 extends between a first side 6516 and a second side 6518. Although only one support section 6510 is shown on each pleat face 6520, it should be appreciated that multiple support sections 6510 can be arranged along each pleat face 6520 so that when the filtration media 6502 is arranged into a media pack as illustrated in FIG. 44 as media pack 604, the volume between each of the support sections 6510 can be considered flutes extending between the inlet flow face 6506 and the outlet flow face 6508. The support sections 6510 can be arranged on each flow face 6520 so that opposite support sections 6510 contact or engage each other to help maintain the media pack shape while also limiting the amount of filtration media that would be contacted by the support sections 6510, as illustrated in FIG. 63.

Furthermore, by providing that the support sections 6510 have adhesive properties, the support sections 6510 can be provided so that opposing support sections 6510 can adhere to each other when the filtration media 6502 is arranged into the media pack 6504.

The support sections 6510 can be arranged in a tapered configuration where support sections 6510 have a cross section at an interior fold 6522 and wherein the cross section increases toward an exterior fold 6524. In this context, the phrase "interior fold" refers to the side of the media that forms an acute angle, and the phrase "exterior fold" refers to the side of the media that forms an obtuse angle when the media is arranged into a media pack. Furthermore, the reference to changing the cross section of the support sections 6510 can refer to one or both of the height that the support section extends away from the media to which it is adhered and also to the width along the media to which it is adhered to in a direction toward or away from other support sections across adjacent flutes. Changing the shape of the support sections 6510 can help maintain the shape of the media pack and the resulting flutes, and can help reduce the amount of media that would otherwise be contacted by the support sections 6510 if they were not arranged in a tapered configuration. In addition, the support sections 6510 can be arranged in a non-tapered configuration. As illustrated in FIG. 64, the support sections 6510 can be provided so that they extend over the exterior folds 6524 although it is not necessary for the support sections 6510 to extend over the exterior folds. In addition, it is not necessary for the support sections 6510 to extend into the interior folds 6522, although, if desired, the support sections 6510 can be provided so that they extend into the interior folds 6522.

The support sections 6510 can be applied to the filtration media 6502 as adhesive extruded onto the filtration media 6502 where the adhesive forms the support sections 6510. Before the adhesive has a chance to fully cure, the filtration media 6502 can be folded into the media pack arrangement 6504, which may or may not have varying pleat depths. By forming the media pack arrangement 6504 before the adhesive has fully cured, the opposing support sections 6510 can become bonded or adhered to each other thereby forming flutes extending between the inlet flow face 6506 and the outlet flow face 6508.

It should be appreciated that the filtration media 6502 can be provided with deformation, such as corrugations, extending across the media. The direction of deformation, such as corrugation, can be parallel or perpendicular to the pleat fold direction.

Figure 46:
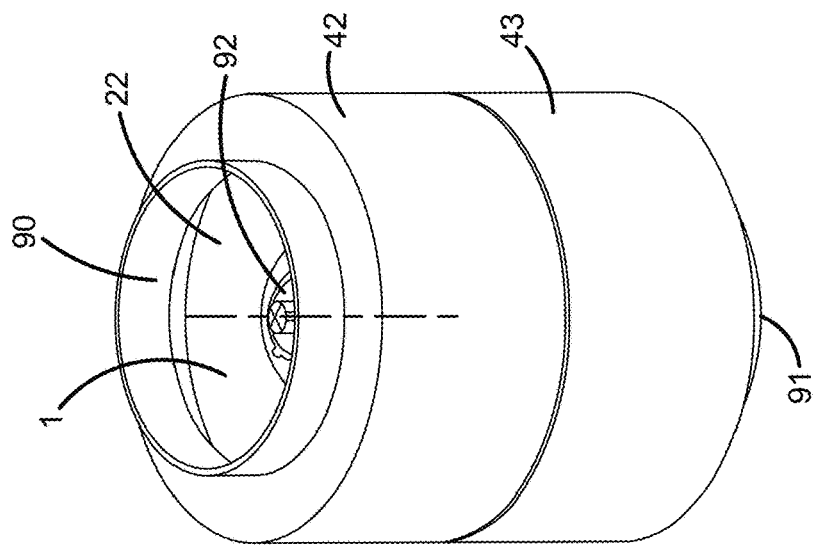
FIG. 46 shows a perspective view of the filter arrangement of FIG. 42.
Figure 45:
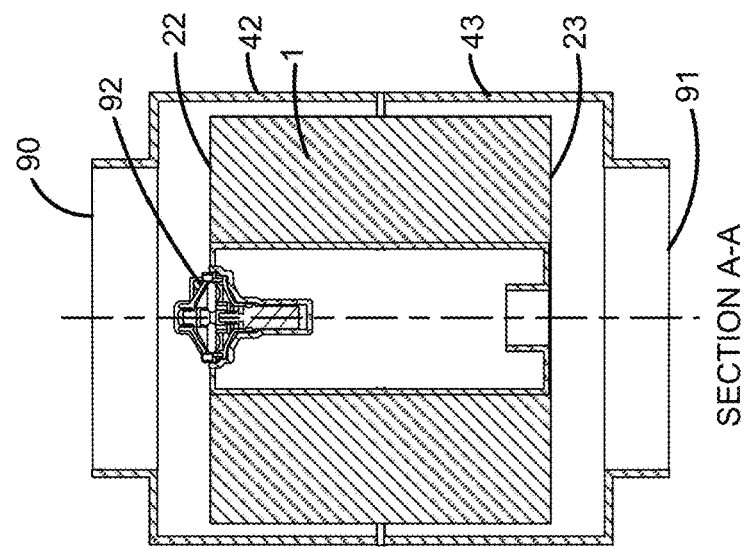
FIG. 45 shows a schematic side view of the filter arrangement of FIG. 42 in cross section.

The filtration media 6602 depicted in FIG. 46 is analogous to filtration media depicted in US 2018/0207566 assigned to Champion Laboratories, Inc., as another example of a media pack arrangement 6604 having inlet and outlet flutes in a straight through flow arrangement.

The filtration media pack arrangement 6604 can be formed by folding 20 the filtration media 6602 to form an inlet flow face 6606 and an outlet flow face 6608. The pleat tips 6610 form the inlet flow face 6606, and the pleat tips 6612 form the outlet flow face 6608. Adhesive beads 6616 and 6618, which may be continuous or discontinuous, extend along the filtration media 6602 in multiple lines across the filtration media 6602 from a media first side 6620 to a media second side 6622. The adhesive beads 6616 and 6618 along the media first side 6620 and along the media second side 6620 can be thickened, if desired, and can be arranged to provide an edge seal along the media first side 6620 and the media second side 6622. By providing that the adhesive beads 6616 and 6618 adhere to each other as the filtration media 6602 is folded, inlet flutes 6630 and outlet flutes 6632 can be formed in the straight through media pack arrangement 6604.

A similar type of filtration media pack arrangement is commercially available under the name Enduracube from Baldwin Filters, Inc. The filtration media pack available under the name Enduracube from Baldwin Filters, Inc. is arranged in a pleated configuration forming inlet flutes and outlet flutes extending between an inlet flow face and an outlet flow face.

Figure 66:
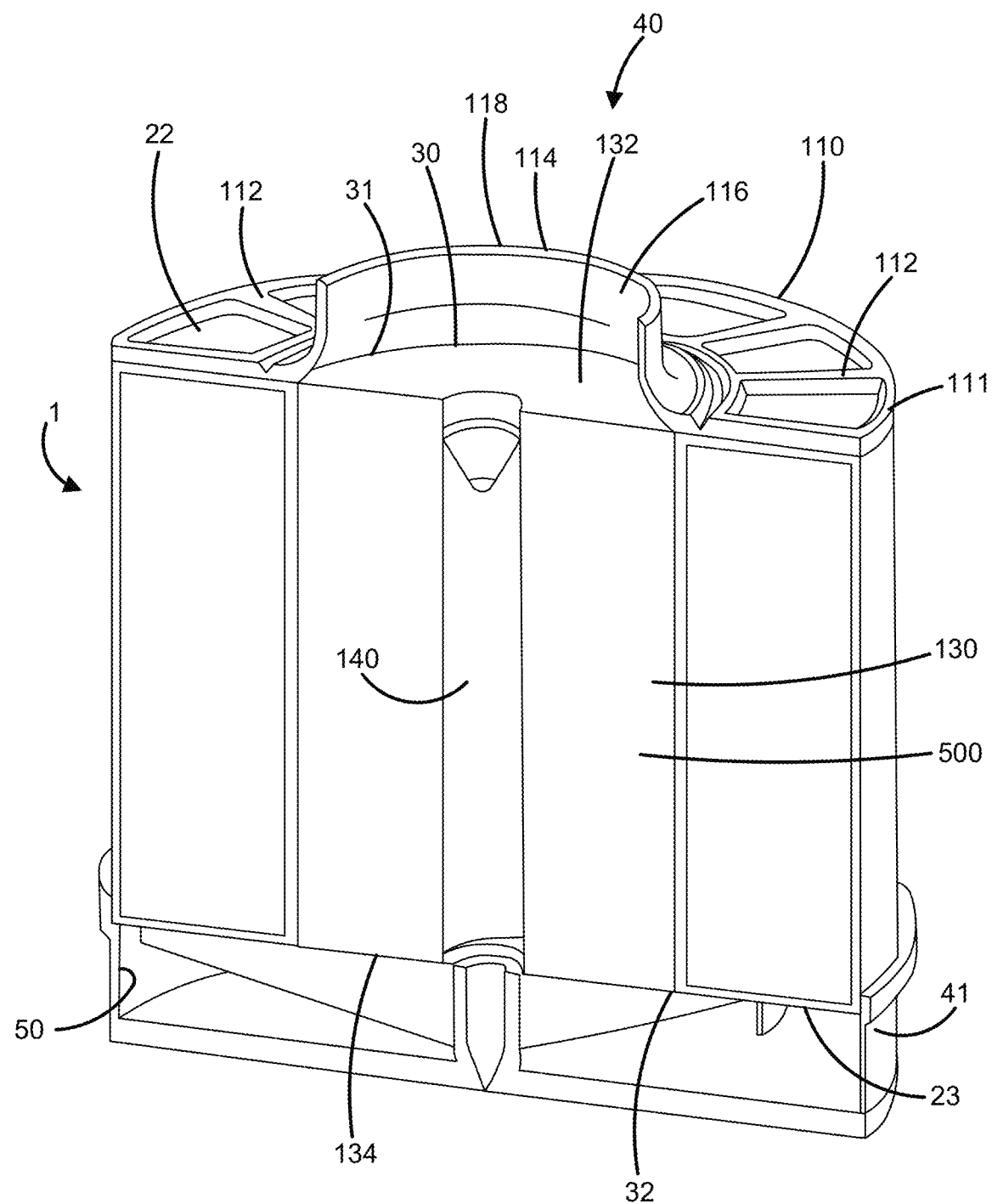
FIG. 66 is a schematic, perspective view of another embodiment of a filter arrangement according to the disclosure.
Figure 67:
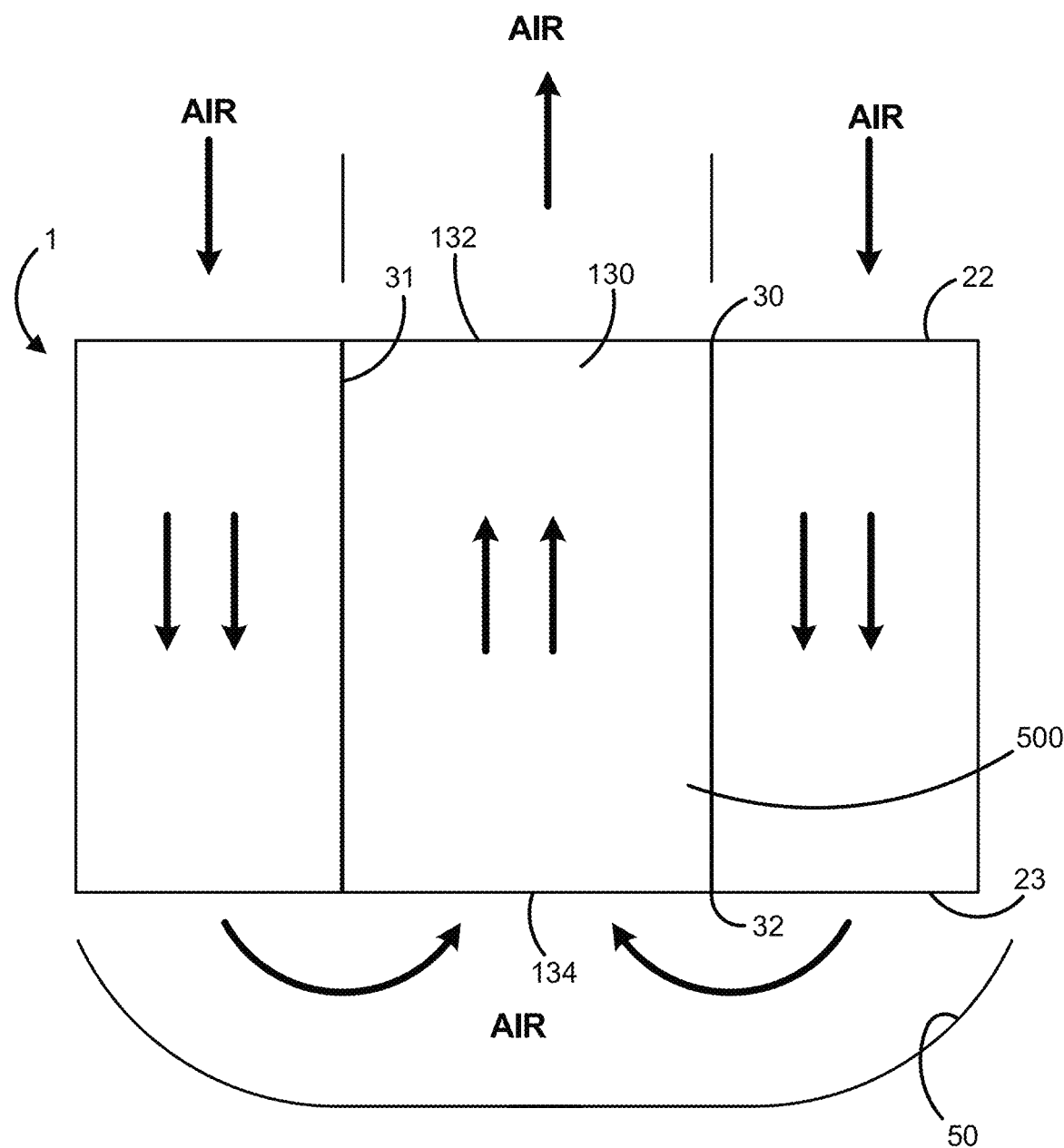
FIG. 67 is a schematic, cross-sectional view of the filter arrangement of FIG. 66 showing the air flow path through the arrangement.

Referring now to FIGS. 66 and 67, another embodiment of the filter arrangement 40 is presented. In FIG. 66, the filter element 1 has top face 22 towards which are directed the inlet openings of the first channels of the group of first channels. Additionally, the filter element 1 has bottom face 23 towards which the outlet openings of the second channels of the group of second channels open. Passing through the center of the element 1 is through channel 31 having opening 30 at the top face 22. The through-channel 31 leads through the filter pack. The through-channel 31 also has opening 32 at the bottom face 23.

Depicted in FIG. 66 is housing 41 holding the element 1. The element 1 includes a face grid 110 with an outer rim 111 circumscribing a perimeter of the top face 22 and with a plurality of spokes 112. The spokes 112 extend between rim 111 to a central hub 114. The central hub 114 includes a surrounding wall 116 defining an opening 118. The opening 118 is in communication with the opening 30 of the channel 31. The surrounding wall 116 can be in communication with an outlet tube for engine air intake. Also shown in FIGS. 66 and 67 is collection chamber 50, arranged below the bottom face 23, that collects the fluid flowing out of the filter element 1 at the bottom face 23.

Fluid enters the filter arrangement 40 at the top face 22 between the spokes 112 of the face grid 110 and passes through the media of the filter element 1 and exits through the bottom face 23. The housing 41 then guides the fluid flow to the opening 32 of the through-channel 31 at the bottom face 23 of the filter element 1. As such, the fluid flow turns 180° to the opening 32 in the through channel 31.

Inside the through-channel 31 is a second filter element 130. The second filter element 130 can be constructed of z-filter media 500, as described in FIGS. 1-3, or as presented or modified according to FIGS. 47-65. The second filter element 130 can have an outer perimeter in a shape that fills the volume of the through channel 31. The second filter element 130 has a top face 132 and an opposite bottom face 134. This particular embodiment also shows the top face 132 as generally co-planar with the top face 22 of element 1, and the bottom face 134 as generally co-planar with the bottom face 23, although other embodiments are possible in which the faces 132, 22 and 134, 23 are not co-planar. The second filter element 130 can also include an optional central core 140 (FIG. 66).

In use, fluid enters the filter arrangement 40 at the top face between the spokes 112 of the face grid 110 and passes through the media of the filter element 1 and exits through the bottom face 23. The collection chamber 50 then guides the fluid flow to the opening 32 of the through-channel 31 at the bottom face 23 of the filter element 1. As such, the fluid flow turns 180° (i.e., the direction of flow is reversed) to the opening 32 in the through channel 31. From there, the fluid flows through the bottom face 134 of the second filter element 130 and through the filter media 500 of the second filter element 130, before exiting through the top face 132. From there, the filtered fluid flows through the opening 118 of the hub 114 and flows to downstream equipment (e.g., engine air intake). Many alternatives are possible, including many possibilities for creating the flowpaths through the element 1 (i.e., first filter element 1) and second filter element 130.

The above represents example principles. Many embodiments can be made using these principles.

The invention claimed is:

1. A filter element for filtering a fluid passing through the filter element comprising: a filter pack having a fluid entry face and a fluid exit face and is provided with:
   a group of first channels in which each first channel extends from a first end toward a second end and each first channel has an inlet opening that opens into the fluid entry face and through which the fluid to be filtered can flow into the respective first channel;
   a group of second channels, in which each second channel extends from the second end toward the first end and each second channel has an outlet opening that opens into the fluid exit face and through which the filtered fluid can flow out of the respective second channel;
   wherein the respective first channel is separated from the second channel, that is arranged next to it, by a partition wall, wherein the partition wall is formed of a filter medium through which the fluid to be filtered can flow from the respective first channel into the second channel, that is arranged next to it; and wherein a through-channel leads through the filter pack from the fluid entry face to the fluid exit face, which through-channel has an opening at the fluid entry face and/or has an opening at the fluid exit face, wherein an element closes a flow of fluid through through-channel, while leaving a volume open inside the through-channel that is at least 10% of the volume that the through-channel would have without the element, and wherein the element closing the flow of fluid through the through channel is one of a support for a sensor; or a resonator and is removable and replaceable from the through-channel.

2. The filter element according to claim 1, wherein:

the first end of each first channel is arranged at the fluid entry face and each first channel has at its first end an inlet opening through which the fluid to be filtered can flow into the respective first channel and each first channel is closed at its second end and;

the second end of each second channel is arranged at the fluid exit face and each second channel has at its second end an opening through which the fluid to be filtered can flow out of the respective second channel and each second channel is closed at its first end.

3. The filter element according to claim 1, wherein a tube is arranged at least partially in the through-channel.

4. The filter element according to claim 1, wherein the filter pack of the filter element has a closed circumferential surface, and a circumferential seal is arranged on the circumferential surface.

5. A filter arrangement for filtering a fluid having a filter housing and a filter element according to claim 1, arranged inside the filter housing.

6. The filter arrangement according to claim 5, wherein the housing has a chamber, the chamber having a top end and a bottom end, wherein the filter element is arranged in the chamber and wherein the fluid entry face of the filter element is arranged closer to the top end and the fluid exit face of the filter element is arranged closer to the bottom end, wherein the housing has a fluid inlet and fluid connection between the fluid inlet and the opening of the through-channel at the fluid exit face or a fluid connection between the fluid inlet and the opening of the through-channel at the fluid entry face.

7. The filter arrangement according to claim 6, wherein the top end of the chamber has a form of a dissected torus.

8. The filter arrangement according to claim 5, wherein the housing is openable and reclosable.

9. The filter arrangement according to claim 5, wherein the housing has an inlet, whereby the inlet is a tube or an opening closed by a mesh, or whereby the housing is perforated providing the inlet.

10. Method of producing a filter element according to claim 1, wherein the filter media is wound around a tube that forms the through-channel.

11. A filter element for filtering a fluid passing through the filter element comprising: a filter pack having a fluid entry face and a fluid exit face and is provided with:

a group of first channels in which each first channel extends from a first end toward a second end and each first channel has an inlet opening that opens into the fluid entry face and through which the fluid to be filtered can flow into the respective first channel;

a group of second channels, in which each second channel extends from the second end toward the first end and each second channel has an outlet opening that opens into the fluid exit face and through which the filtered fluid can flow out of the respective second channel;

wherein the respective first channel is separated from the second channel, that is arranged next to it, by a partition wall, wherein the partition wall is formed of a filter medium through which the fluid to be filtered can flow from the respective first channel into the second channel, that is arranged next to it;

wherein a through-channel leads through the filter pack from the fluid entry face to the fluid exit face, which through-channel has an opening at the fluid entry face and/or has an opening at the fluid exit face, and a filter media is arranged inside the through-channel;

wherein an element closes a flow of fluid through through-channel, while leaving a volume open inside the through-channel that is at least 10% of the volume that the through-channel would have without the element, and wherein the element closing the flow of fluid through the through channel is one of a support for a sensor; or a resonator.

12. The filter element according to claim 11, wherein the element that interacts with a flow of fluid is fixed to the filter pack.

13. The filter element according to claim 11, wherein:

the first end of each first channel is arranged at the fluid entry face and each first channel has at its first end an inlet opening through which the fluid to be filtered can flow into the respective first channel and each first channel is closed at its second end and;

the second end of each second channel is arranged at the fluid exit face and each second channel has at its second end an opening through which the fluid to be filtered can flow out of the respective second channel and each second channel is closed at its first end.

14. The filter element according to claim 11, wherein the filter pack of the filter element has a closed circumferential surface, and a circumferential seal is arranged on the circumferential surface.

15. A filter arrangement for filtering a fluid having a filter housing and a filter element according to claim 11, arranged inside the filter housing.

16. The filter arrangement according to claim 15, wherein the housing is openable and reclosable.

17. The filter arrangement according to claim 15, wherein the housing has an inlet, whereby the inlet is a tube or an opening closed by a mesh, or whereby the housing is perforated providing the inlet.

* * * * *